(12) United States Patent
Jinnouchi et al.

(10) Patent No.: US 12,192,332 B2
(45) Date of Patent: Jan. 7, 2025

(54) FILE PROCESSING DEVICE AND FILE PROCESSING METHOD INCLUDING FILE THAT STORES ENCRYPTED IMAGE

(71) Applicant: Sony Group Corporation, Tokyo (JP)

(72) Inventors: Ryo Jinnouchi, Kanagawa (JP); Ryogo Ito, Tokyo (JP); Daisuke Funamoto, Tokyo (JP)

(73) Assignee: Sony Group Corporation, Tokyo (JP)

( * ) Notice: Subject to any disclaimer, the term of this patent is extended or adjusted under 35 U.S.C. 154(b) by 255 days.

(21) Appl. No.: 17/773,958

(22) PCT Filed: Nov. 6, 2020

(86) PCT No.: PCT/JP2020/041495
§ 371 (c)(1),
(2) Date: May 3, 2022

(87) PCT Pub. No.: WO2021/100491
PCT Pub. Date: May 27, 2021

(65) Prior Publication Data
US 2023/0006818 A1    Jan. 5, 2023

(30) Foreign Application Priority Data

Nov. 21, 2019 (JP) ................................. 2019-210539

(51) Int. Cl.
*H04L 9/08* (2006.01)
*G06F 21/10* (2013.01)
*H04L 9/06* (2006.01)

(52) U.S. Cl.
CPC ............ *H04L 9/0825* (2013.01); *G06F 21/10* (2013.01); *H04L 9/0618* (2013.01); *H04L 9/0822* (2013.01)

(58) Field of Classification Search
CPC ... H04L 9/0825; H04L 9/0618; H04L 9/0822; H04L 9/0894; H04L 9/14; H04L 9/08;
(Continued)

(56) References Cited

U.S. PATENT DOCUMENTS 11,706,382 B2 * 7/2023 Davidson ............ G06F 12/1408
                                                                       713/193
2008/0013718 A1 * 1/2008 Okamoto ............... H04L 9/0825
                                                                       380/30
(Continued)

FOREIGN PATENT DOCUMENTS

| EP | 2154815 A1 | 2/2010 |
|---|---|---|
| JP | 2008-118606 A | 5/2008 |
| JP | 2014-131124 A | 7/2014 |

OTHER PUBLICATIONS

International Search Report (PCT/ISA/210), International Application No. PCT/JP2020/041495, dated Feb. 9, 2021.
(Continued)

*Primary Examiner* — Quazi Farooqui
(74) *Attorney, Agent, or Firm* — Michael Best & Friedrich LLP

(57) ABSTRACT

The present technology relates to a file processing device and a file processing method for enabling restriction of viewing of an image.
A file control unit generates a file that stores an encrypted image obtained by encrypting an image with a first encryption key, and an encrypted encryption key obtained by encrypting the first encryption key with a second encryption key, the encrypted image and the encrypted encryption key being associated with each other in the file. The file control unit also decrypts the encrypted encryption key in the file into the first encryption key, and, with the first encryption key obtained by the decryption, decrypts the encrypted
(Continued)

image into the image. The present technology can be applied to a digital camera and the like that capture images, for example.

18 Claims, 59 Drawing Sheets

(58) Field of Classification Search
CPC .......... G06F 21/10; G06F 21/62; G06F 21/60; H04N 2005/91364; H04N 23/60; H04N 23/661; H04N 5/913; G01C 1/00
See application file for complete search history.

(56) References Cited

U.S. PATENT DOCUMENTS

| | | | |
|---|---|---|---|
| 2015/0035999 A1 | 2/2015 | Shehane | |
| 2018/0160156 A1* | 6/2018 | Hannuksela | ....... H04N 21/8456 |
| 2019/0238795 A1* | 8/2019 | Chen | .................... H04N 7/1675 |
| 2020/0244448 A1* | 7/2020 | Binz Vallevik | ....... H04L 9/0825 |

OTHER PUBLICATIONS

Windows 10 Fast techniques of almost standard function 2019, Oct. 1, 2018, p. 77, ISBN: 978-4-86545-625-7, in particular, description "Supports iPhone HEIF images and HEVC videos with adding extensions", (Hayase, Atsushi, EIWA Publishing Inc.).

ISO/IEC 23008-12: 2017, Information technology—High efficiency coding and media delivery in heterogeneous environments, Part 12: Image File Format.

Cyril Bergeron et al: "Committee Draft for Visual Identity Management AF", 122. MPEG Meeting; Apr. 16, 2018-Apr. 20, 2018; San Diego; (Motion Picture Expert Group or ISO/IEC JTC1/SC29/WG11), XP030070786.

* cited by examiner

FILE PROCESSING DEVICE AND FILE PROCESSING METHOD INCLUDING FILE THAT STORES ENCRYPTED IMAGE

TECHNICAL FIELD

The present technology relates to file processing devices and file processing methods, and more particularly, to a file processing device and a file processing method for enabling restriction of viewing of an image, for example.

BACKGROUND ART

As a file format for efficiently storing images, there is a high efficiency image file format (HEIF) (see Non-Patent Document 1).

CITATION LIST

Non-Patent Document

Non-Patent Document 1: ISO/IEC 23008-12: 2017, Information technology—High efficiency coding and media delivery in heterogeneous environments—Part 12: Image File Format

SUMMARY OF THE INVENTION

Problems to be Solved by the Invention

With an HEIF file or a some other file that stores images, it would be user-friendly if viewing of images stored in the file can be restricted so as to protect so-called copyrights, portrait rights, and the like.

The present technology has been made in view of such circumstances, and aims to enable restriction of viewing of an image stored in a file.

Solutions to Problems

A first file processing device of the present technology is a file processing device that includes a file control unit that generates a file storing an encrypted image obtained by encrypting an image with a first encryption key, and an encrypted encryption key obtained by encrypting the first encryption key with a second encryption key, the encrypted image and the encrypted encryption key being associated with each other in the file.

A first file processing method of the present technology is a file processing method that includes generating a file storing an encrypted image obtained by encrypting an image with a first encryption key, and an encrypted encryption key obtained by encrypting the first encryption key with a second encryption key, the encrypted image and the encrypted encryption key being associated with each other in the file.

In the first file processing device and file processing method of the present technology, a file storing an encrypted image obtained by encrypting an image with a first encryption key, and an encrypted encryption key obtained by encrypting the first encryption key with a second encryption key is generated, the encrypted image and the encrypted encryption key being associated with each other in the file.

A second file processing device of the present technology is a file processing device that includes a file control unit that decrypts an encrypted image into an image with a first encryption key, the first encryption key being obtained by decrypting an encrypted encryption key in a file, the file storing the encrypted image obtained by encrypting the image with the first encryption key and the encrypted encryption key obtained by encrypting the first encryption key with a second encryption key, the encrypted image and the encrypted encryption key being associated with each other in the file.

A second file processing method of the present technology is a file processing method that includes decrypting an encrypted image into an image with a first encryption key, the first encryption key being obtained by decrypting an encrypted encryption key in a file, the file storing the encrypted image obtained by encrypting the image with the first encryption key and the encrypted encryption key obtained by encrypting the first encryption key with a second encryption key, the encrypted image and the encrypted encryption key being associated with each other in the file.

In the second file processing device and file processing method of the present technology, an encrypted image is decrypted into an image with a first encryption key, the first encryption key being obtained by decrypting an encrypted encryption key in a file, the file storing the encrypted image obtained by encrypting the image with the first encryption key and the encrypted encryption key obtained by encrypting the first encryption key with a second encryption key, the encrypted image and the encrypted encryption key being associated with each other in the file.

Note that the first and second file processing devices may be independent devices, or may be internal blocks in a single device.

Alternatively, the first and second file processing devices can also be formed by causing a computer to execute a program. The program for causing the computer to function as the first and second file processing devices may be recorded on a recording medium and provided, or be transmitted and provided via a transmission medium.

MODES FOR CARRYING OUT THE INVENTION

<Embodiment of a Digital Camera to which the Present Technology is Applied>

Figure 1:
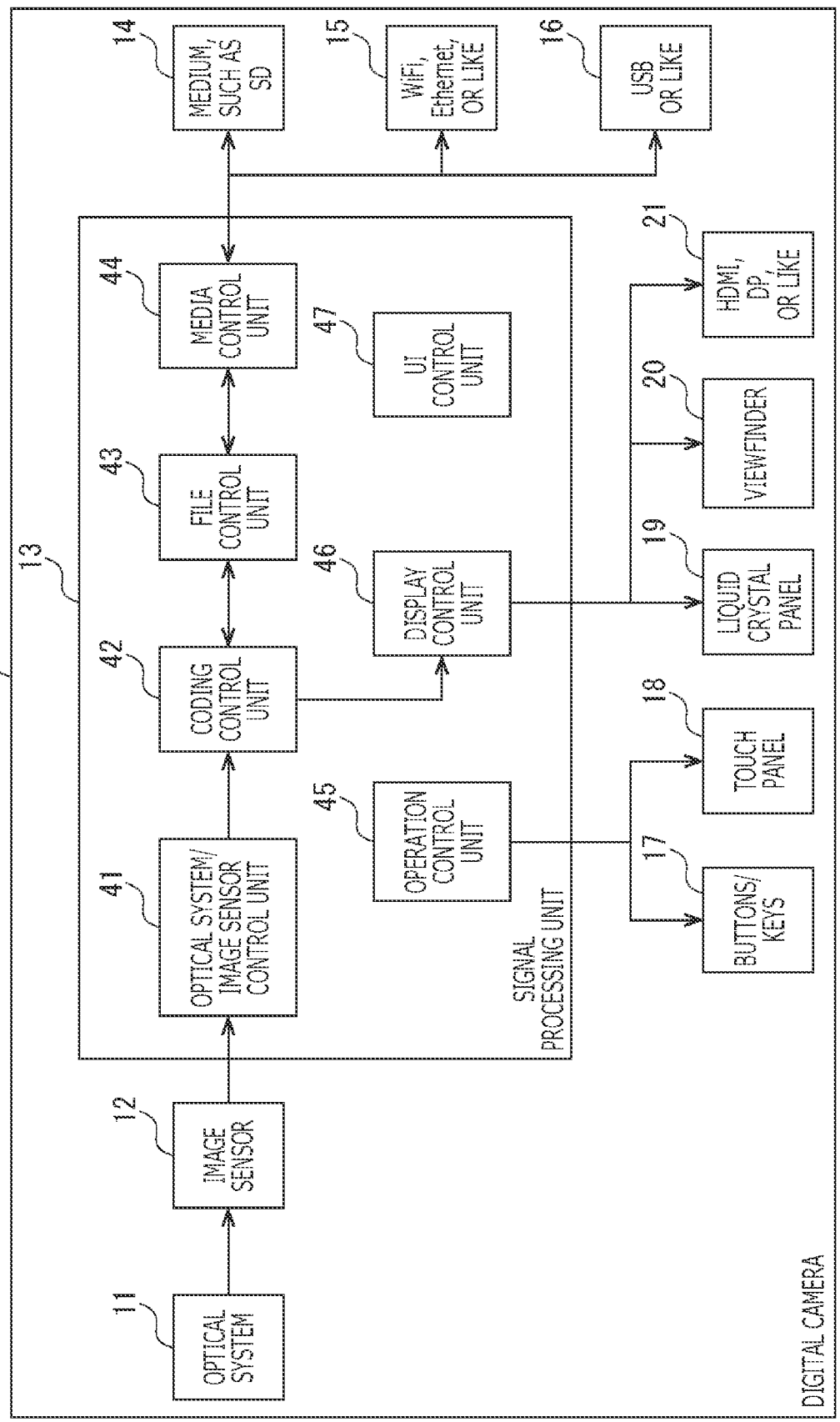
FIG. 1 is a block diagram showing an example configuration of an embodiment of a digital camera to which the present technology is applied.

FIG. 1 is a block diagram showing an example configuration of an embodiment of a digital camera to which the present technology is applied.

A digital camera 10 includes an optical system 11, an image sensor 12, a signal processing unit 13, a medium 14, interfaces 15 and 16, buttons/keys 17, a touch panel 18, a liquid crystal panel 19, a viewfinder 20, an interface 21, and the like.

The optical system 11 condenses light from the object onto the image sensor 12.

The image sensor 12 generates image data as an electrical signal by receiving light from the optical system 11 and performing imaging that involves photoelectric conversion, and supplies the image data to the signal processing unit 13.

The signal processing unit 13 includes an optical system/image sensor control unit 41, a coding control unit 42, a file control unit 43, a media control unit 44, an operation control unit 45, a display control unit 46, and a UI control unit 47.

The optical system/image sensor control unit 41 controls the optical system 11 and the image sensor 12, and supplies the coding control unit 42 with (data of) the image obtained by the imaging performed in accordance with the control.

The coding control unit 42 supplies the image from the optical system/image sensor control unit 41 to the display control unit 46, and encodes the image as necessary and supplies the encoded image to the file control unit 43. The coding control unit 42 also decodes an image supplied from the file control unit 43 as necessary, and supplies the decoded image to the display control unit 46.

The file control unit 43 generates a file that stores the image supplied from the coding control unit 42, and supplies the file to the media control unit 44. The file control unit 43 also reproduces the file supplied from the media control unit 44. That is, the file control unit 43 performs readout of data such as the image stored in the file, and the like. For example, the image read from the file is supplied from the file control unit 43 to the coding control unit 42.

The media control unit 44 controls exchange of files between the medium 14 and the interfaces 15 and 16. For example, the media control unit 44 causes the medium 14 to record the file supplied from the file control unit 43, or causes the interfaces 15 and 16 to transmit the file supplied from the file control unit 43. The media control unit 44 also reads a file from the medium 14 or causes the interfaces 15 and 16 to receive a file, and supplies the file to the file control unit 43.

In accordance with an operation performed on the buttons/keys 17 or the touch panel 18 by the user, the operation control unit 45 supplies an operation signal corresponding to the operation to the required block.

The display control unit 46 performs display control and the like to supply the image and the like supplied from the coding control unit 42 to the liquid crystal panel 19, the viewfinder 20, and the interface 21, and have the image and the like be displayed.

The UI control unit 47 manages user interface (UI) control.

The medium 14 is a storage medium such as an SD card, for example. The interface 15 is an interface of a local area network (LAN) such as WiFi (registered trademark) or Ethernet (registered trademark), for example. The interface 16 is an interface of a universal serial bus (USB), for example. The buttons/keys 17 and the touch panel 18 are operated by the user to input a command or other information to the digital camera 10. The touch panel 18 can be formed integrally with the liquid crystal panel 19. The liquid crystal panel 19 and the viewfinder 20 display an image and the like supplied from the display control unit 46. The interface 21 is an interface that transmits at least an image, such as high-definition multimedia interface (HDMI (registered trademark)) or a display port (DP).

In the digital camera 10 designed as described above, the optical system/image sensor control unit 41 generates an image of YUV as a master image of an HEIF file, for example, and supplies the image of YUV to the coding control unit 42, the image of YUV being generated from an image of RAW data obtained by imaging performed by the image sensor 12 (this image will be hereinafter also referred to as the RAW image), the image of YUV having the same resolution (the same number of pixels) as the RAW image.

The coding control unit 42 generates, from the master image of YUV, an image of YUV having a lower resolution than that of the master image (this image of YUV will be hereinafter also referred to as the screen nail image), for example, as a first other image based on the master image, for use in display on the liquid crystal panel 19 or an external display. The coding control unit 42 also generates an image of YUV having a lower resolution than that of the screen nail image (this image of YUV will be hereinafter also referred to as the thumbnail image), for example, as a second other image based on the master image, for use in index display (list display). For example, the coding control unit 42 supplies the screen nail image to the liquid crystal panel 19 via the display control unit 46, to have the screen nail image be displayed as a so-called through-lens image. As the thumbnail image, an image having a size of 320 pixels or smaller on the long side can be adopted, for example. The ratio of the size (the number of pixels) between the master image and the screen nail image as the first other image based on the master image or the thumbnail image as the second other image based on the master image can be 200 or lower, for example. Likewise, the ratio of the size between the screen nail image as the first other image based on the master image and the thumbnail image as the second other image based on the master image can be 200 or lower. As the screen nail image, an image having a resolution of 4K or higher can be adopted, for example. Also, as the screen nail image, a 4K (QFHD) or FHD image can be adopted according to the user's selection, for example. Further, images having the same resolution can be adopted as the master image and the screen nail image. In a case where images having the same resolution are adopted as the master image and the screen nail image, both the master image and the screen nail image can be stored in the HEIF file, or the master image can be stored in the HEIF file but the screen nail image is not. In a case where the master image is stored in the HEIF file but the screen nail image is not, the master image can be resized, and be used as the screen nail image.

The coding control unit 42 also encodes the master image, the screen nail image, and the thumbnail image corresponding to the RAW image (the master image, the screen nail image, and the thumbnail image that are generated from the same RAW image) as necessary, and supplies the encoded images, as well as the RAW image, to the file control unit 43.

The file control unit 43 generates a RAW file in which the RAW image is stored, generates an HEIF file, a JPEG file, or the like in which the corresponding master image, screen nail image, and thumbnail image (the master image, the screen nail image, and the thumbnail image that are generated from the same RAW image) are stored, and supplies the files to the media control unit 44. An HEIF file is a file compliant with High Efficiency Image File Format (HEIF), and a JPEG file is a file compliant with Joint Photographic Experts Group (JPEG).

The media control unit 44 records the RAW file and the HEIF file or the JPEG file supplied from the file control unit 43 on the medium 14, or transmits the RAW file and the HEIF file or the JPEG file from the interface 15 or 16.

The file control unit 43 can choose an HEIF file or a JPEG file as a file to be generated, according to the user's operation, for example. Further, as will be described later, an HEIF file is in an image item format and an image sequence format. The image item format or the image sequence format can be adopted according to the user's operation, for example. Further, the file control unit 43 can perform mutual conversion between an HEIF file and a JPEG file according to the user's operation.

Further, in generating an HEIF file, the file control unit 43 can associate the internal data in the HEIF file (the data stored in the HEIF file) associated with external data outside the HEIF file (data not stored in the HEIF file), with specific information for specifying the external data, and store the internal data and the specific information into the HEIF file. The HEIF file in which the internal data and the specific information regarding the external data associated with the internal data are associated with each other and are stored is also referred to as an associating HEIF file. An associating HEIF file can store the internal data and the specific information associated with each other, by storing association information for associating the internal data with the specific information or the like, for example.

<JPEG File>

Figure 2:
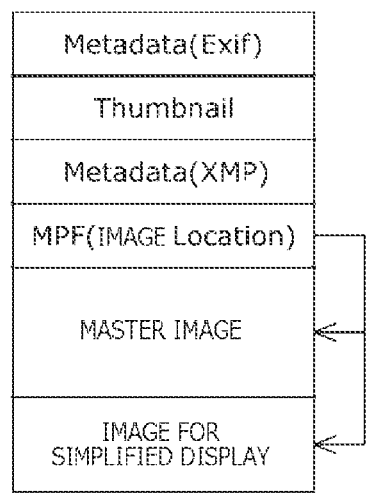
FIG. 2 is a diagram showing an example format of a JPEG file compliant with Joint Photographic Experts Group (JPEG).

FIG. 2 is a diagram showing an example format of a JPEG file compliant with Joint Photographic Experts Group (JPEG).

A JPEG file is designed to store Exif metadata, a thumbnail image, Extensible Metadata Platform (XMP, registered trademark) metadata, an MPF indicating the storage locations (positions) of a master image and an image for simplified display and the like, the master image, and the image for simplified display, for example. As the image for simplified display, a screen nail image can be adopted, for example.

<ISO Base Media File Format>

Figure 3:
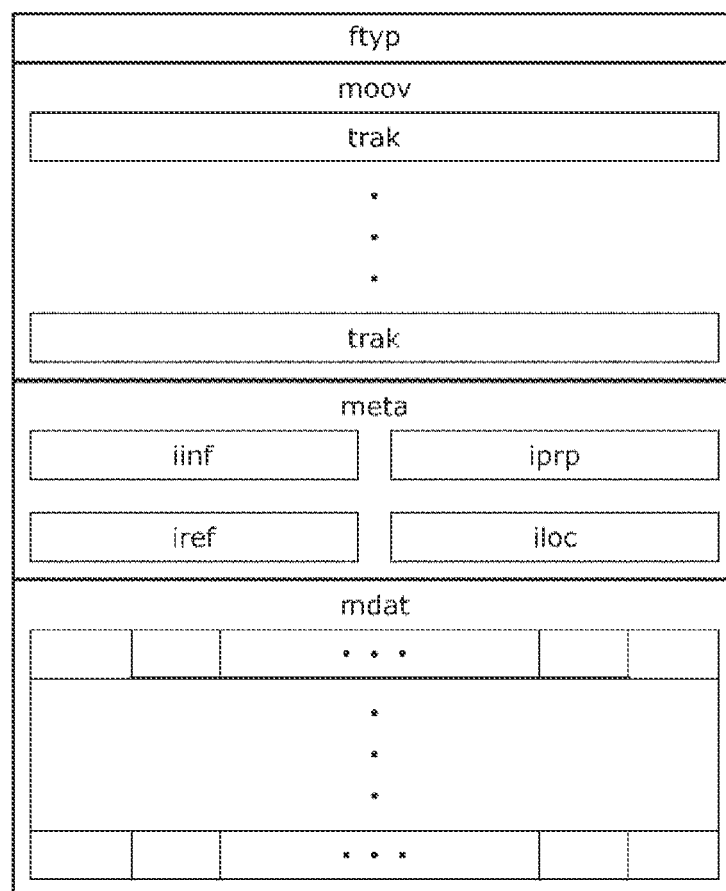
FIG. 3 is a diagram showing an example of an ISO base media file format.

FIG. 3 is a diagram showing an example of an ISO base media file format.

HEIF (ISO/IEC 23008-12) is a file format compliant with an ISO base media file format (ISO/IEC 14496-12), and accordingly, an HEIF file is compliant with the ISO base media file format.

The ISO base media file format includes units called boxes as containers for storing data, and has a structure called a box structure.

A box includes a type (a box type), actual data (data), and the like. The type indicates the type of the actual data in the box. The actual data can be reproducible media data such as an image (a still image or a video image), audio, and subtitles, attribute names (field names and the attribute values (field values) of (the variables represented by) the attribute names, and various kinds of other data.

Further, boxes can be adopted as the actual data. That is, a box can have boxes as actual data, and thus, can have a hierarchical structure.

A base media file compliant with the ISO base media file format can include an ftyp box, a moov box (MovieBox), a meta box (MetaBox), an mdat box (MediaDataBox), and the like. The ftyp box stores identification information for identifying the file format. The moov box can store a trak box and the like. The meta box can store an iinf box, an iprp box, an iref box, an iloc box, and the like. The mdat box can store media data (AV data) and other desired data.

HEIF is compliant with the ISO base media file format described above.

<HEIF File>

Figure 4:
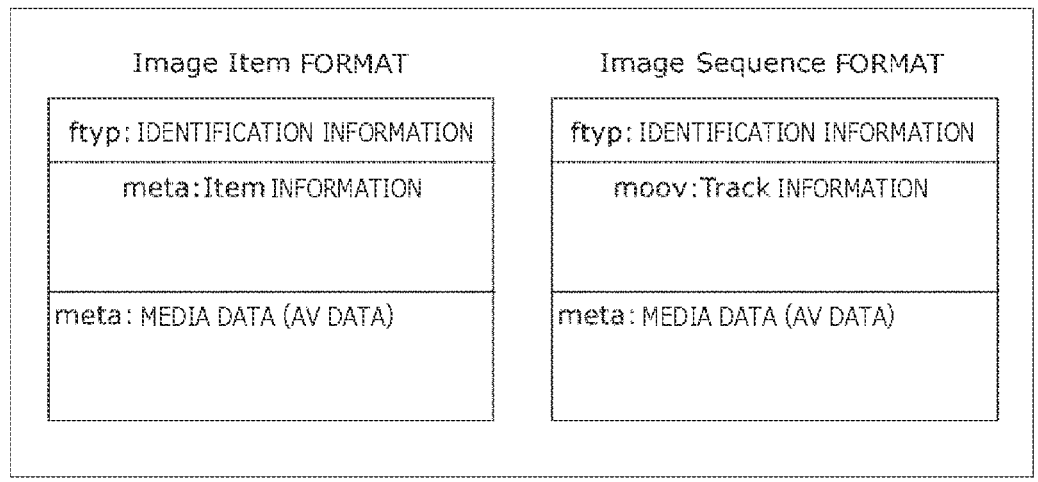
FIG. 4 is a diagram showing an example format of an HEIF file compliant with HEIF.

FIG. 4 is a diagram showing an example format of an HEIF file compliant with HEIF.

HEIF files are roughly classified into those in image item formats and those in image sequence formats. Further, the image item formats include a single-mage format containing only one item as described later, and an image collection format containing a plurality of items.

An HEIF file in an image item format includes an ftyp box, a meta box, and an mdat box.

An HEIF file in an image sequence format includes an ftyp box, a moov box, and an mdat box.

Note that an HEIF file can include not only either a meta box or a moov box, but both of the boxes.

The ftyp box stores identification information for identifying the file format, such as information indicating that the file is an HEIF file in an image item format or an image sequence format, for example.

The meta box and the moov box store metadata necessary for reproduction, management, and the like of the media data stored in the mdat box, such as metadata indicating the storage location of the media data, for example.

The mdat box stores media data (AV data) and the like.

In the digital camera 10, generation of an HEIF file in an image item format or an HEIF file in an image sequence format can be selected according to the user's operation, for example. Further, in a case where an image is encoded and stored in the mdat box of an HEIF file, only intra encoding is permitted for an image item format, and intra encoding and inter encoding are permitted for an image sequence format. Accordingly, in a case where priority is put on high-speed access to the data stored in an HEIF file, for example, generation of an HEIF file in an image item format can be selected. In a case where priority is put on reduction of the size (data amount) of an HEIF file, generation of an HEIF file in an image sequence format can be selected.

Figure 5:
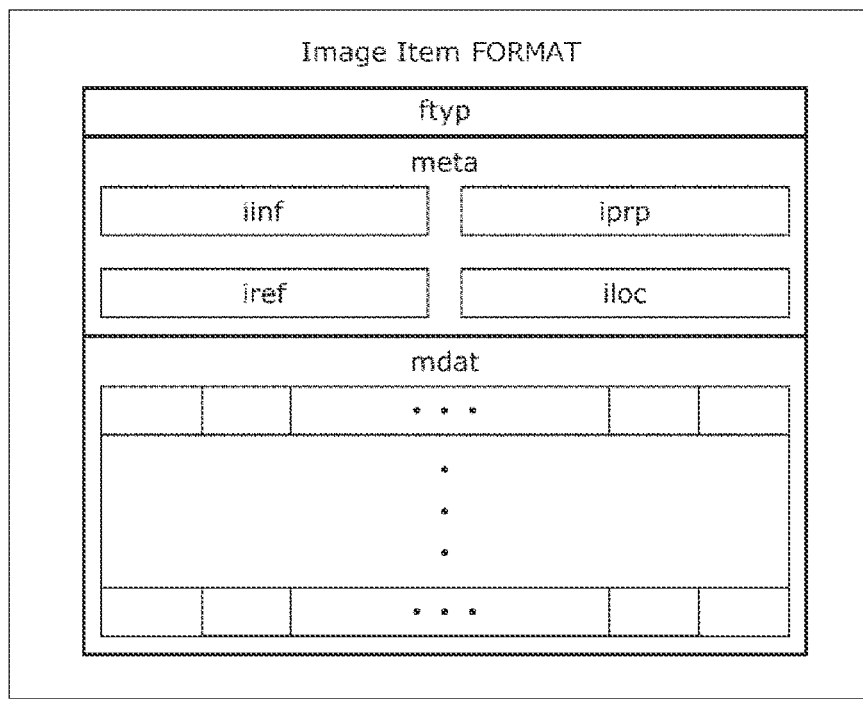
FIG. 5 is a diagram showing an example format of an HEIF file in an image item format.

FIG. 5 is a diagram showing an example format of an HEIF file in an image item format.

In an HEIF file in an image item format, information indicating that the HEIF file is in an image item format, such as that mif1, for example, is stored (as an attribute value) in the ftyp box.

The meta box stores an iinf box, an iref box, an iprp box, and an iloc box.

The iinf box stores (an attribute name and an attribute value indicating) the number of items that are the media data (AV data) stored in the mdat box, and the like. An item is one piece of data stored in the mdat box of an HEIF file in an image item format, and one image (screen) is one item, for example. In this specification, one image that is a still image or a video image is also referred to as a frame. One frame is one item.

The iref box stores information indicating the relationship between the items. For example, in the mdat box, the corresponding master image, screen nail image, and thumbnail image can be stored as items. In a case where an item I1 as the master image, an item I2 as the screen nail image, and an item I3 as the thumbnail image are stored in the mdat box, information indicating that the item I2 is the screen nail image of the master image as the item I1, and information indicating that the item I3 is the thumbnail image of the master image as the item I1 are stored in the iref box.

The iprp box stores information regarding the properties of the items.

The iloc box stores information regarding the storage locations of the items stored in the mdat box.

For example, the frame of an image as an item is stored in the mdat box (of an HEIF file) in an image item format. One or more items can be stored in the mdat box. Also, an encoded frame as an item can be stored in the mdat box. However, encoding of a frame as an item to be stored in the mdat box in an image item format is limited to intra encoding. As an encoding method (codec) for encoding a frame as an item, HEVC or the like can be adopted, for example.

Figure 6:
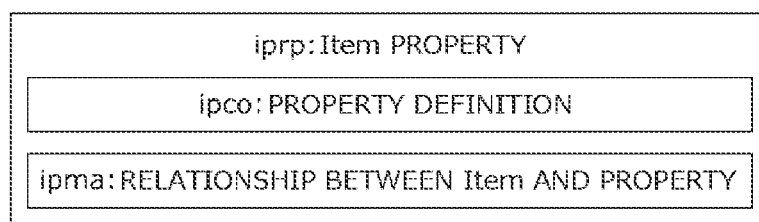
FIG. 6 is a diagram showing an example of an iprp box.

FIG. 6 is a diagram showing an example of the iprp box shown in FIG. 5.

The iprp box stores an ipco box and an ipma box regarding the properties of the items. The ipco box stores the properties of the items stored in the mdat box, such as codec information regarding the codec of images as the items and image size information regarding the size, for example. The ipma box stores the index (pointers) of the properties stored in the ipco box regarding the items stored in the mdat box.

Figure 7:
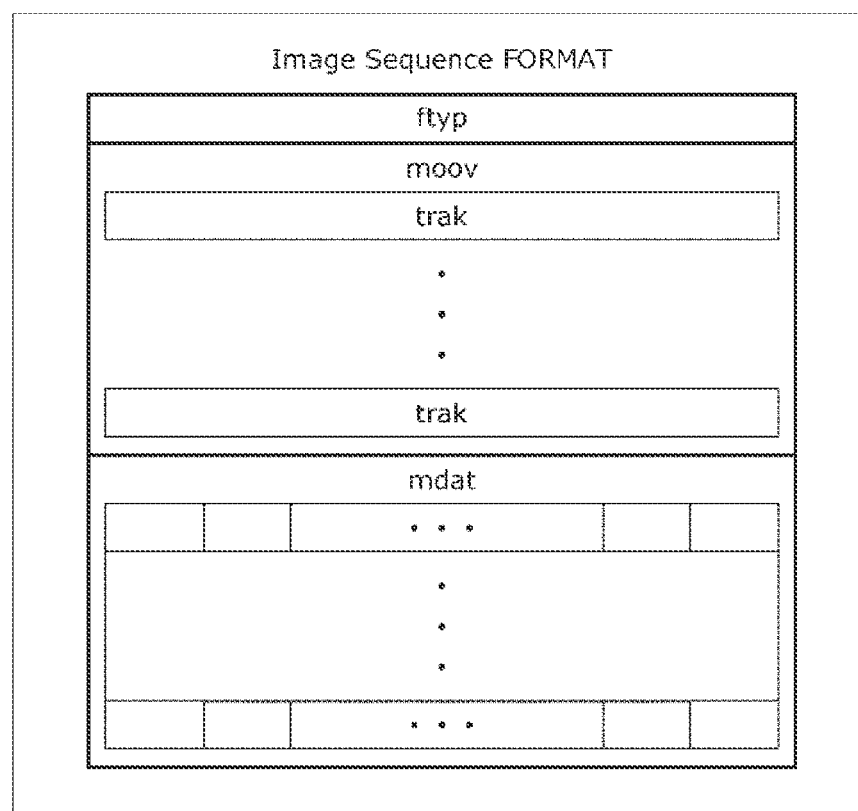
FIG. 7 is a diagram showing an example format of an HEIF file in an image sequence format.

FIG. 7 is a diagram showing an example format of an HEIF file in an image sequence format.

In an HEIF file in an image sequence format, information indicating that the HEIF file is in an image sequence format, such as msf1, is stored in the ftyp box, for example.

The moov box stores a trak box. The trak box stores information regarding the tracks stored in the mdat box.

A track is formed with one independent piece of media data to be reproduced according to a timeline, such as an image or sound. For example, a track is formed with one or more frames of images to be an elementary stream. As for the tracks stored in the mdat box, a plurality of tracks, such as the respective tracks of an image and sound recorded at the same time, can be reproduced at the same time, for example.

The media data of the tracks is formed with units called samples. A sample is a minimum unit (access unit) in a case where the media data in the HEIF file is to be accessed. Therefore, the media data in the HEIF file cannot be accessed by a smaller unit than a sample.

In the media data of an image, one frame or the like is one sample, for example. Also, in the media data of sound, one audio frame or the like defined in the standard of the media data of the sound is one sample, for example.

In the mdat box (of an HEIF file) in an image sequence format, the media data of tracks is placed in units called chunks. A chunk is a set of one or more samples placed at logically continuous addresses.

In a case where a plurality of tracks as media data is stored in the mdat box, the plurality of tracks is interleaved and placed in chunks.

As described above, in the mdat box in an image sequence format, one or more tracks formed with media data such as an image and sound are stored.

In the mdat box, encoded frames of images constituting a track can be stored. In the encoding of the frames constituting a track stored in the mdat box in an image sequence format, a long GOP can be adopted as a group of picture (GOP), and both intra encoding and inter encoding can be adopted. As a codec that encodes the frames constituting a track, HEVC or the like can be adopted, for example.

Figure 8:
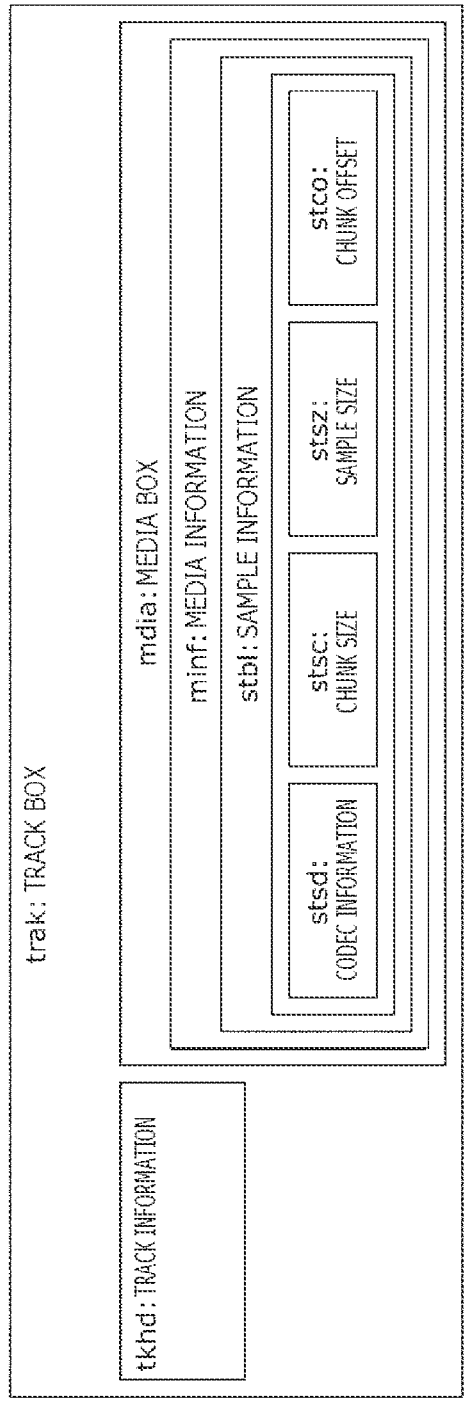
FIG. 8 is a diagram showing an example of a trak box.

FIG. 8 is a diagram showing an example of the trak box.

The trak box can store a tkhd box and an mdia box. The tkhd box stores header information regarding tracks, such as the creation dates and times of the tracks being managed by the trak box. The mdia box stores a minf box and the like. The minf box stores an stbl box. The stbl box stores an stsd box, an stsc box, an stsz box, and an stco box that store samples of the tracks, which are information for accessing the chunks. The stsd box stores codec information regarding the codec of the tracks. The stsc box stores the chunk size (the number of samples of one chunk). The stsz box stores the sample size. The stco box stores the chunk offset, which is the offset of the placement position of each chunk of the tracks stored in the mdat box.

Here, an HEIF file in an image item format is also called a collection file, and an HEIF file in an image sequence format is also called a sequence file. Further, an associating HEIF file in an image item format is also called an associating collection file, and an associating HEIF file in an image sequence format is also called an associating sequence file.

In the digital camera 10, it is possible to generate an HEIF file (including an associating HEIF file) in which a master image, and further, a screen nail image and/or a thumbnail image that are required are stored.

<Collection File>

Figure 9:
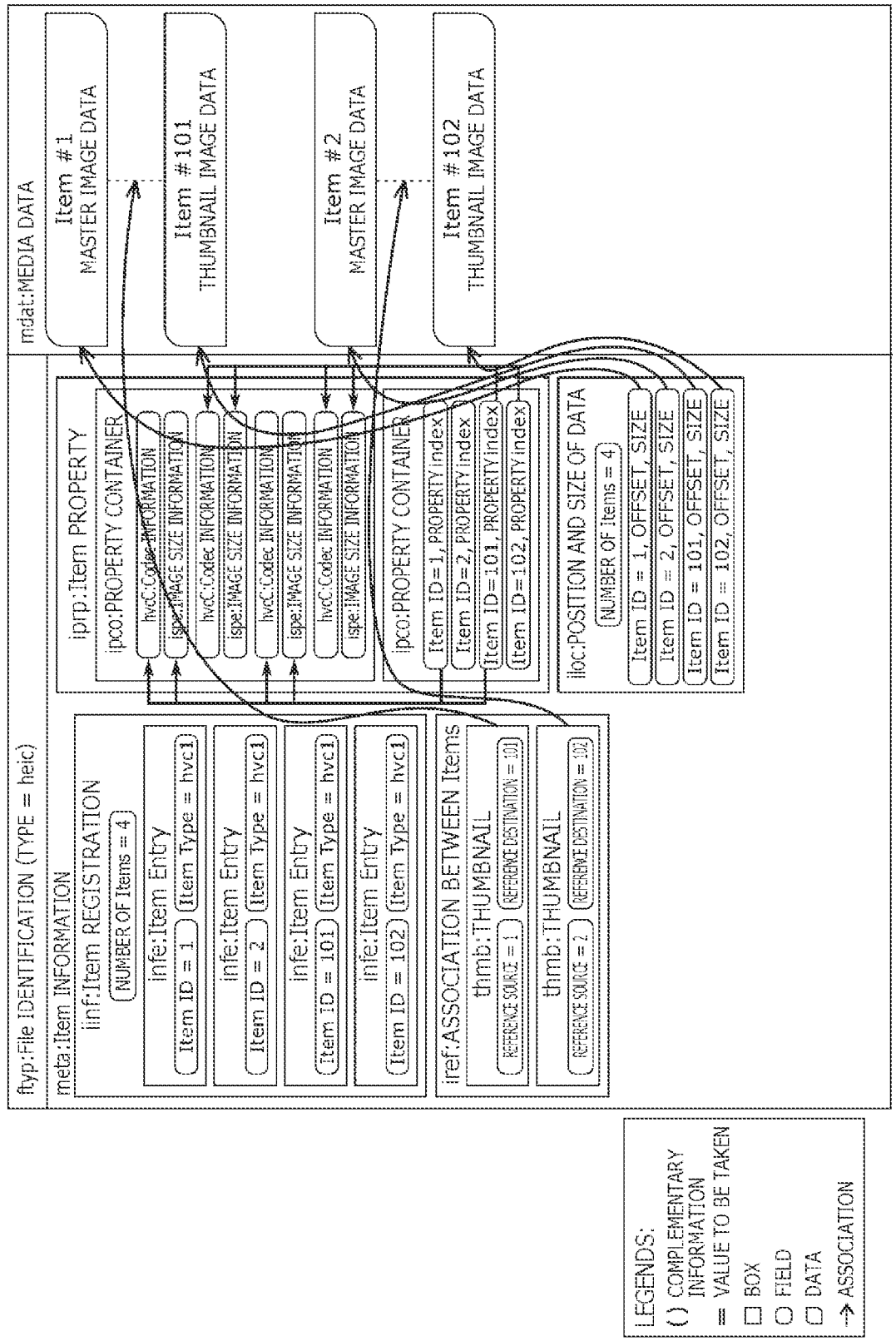
FIG. 9 is a diagram showing an example of a conventional collection file storing master images and thumbnail images.

FIG. 9 is a diagram showing an example of a conventional collection file storing master images and thumbnail images.

Here, a conventional collection file means a collection file in which the internal data in the collection file is not associated with specific information about external data.

Here, frames (items) encoded by HEVC are stored in the mdat box of the collection file.

In the ftyp box, heic indicating that the format is an image item format and that the codec is HEVC is stored as identification information for identifying the file format.

The iinf box stores the number of items (item number) stored in the mdat box. In FIG. 9, a total of four items (frames) that are the master image specified by an item ID #1 (this master image will be hereinafter also written as the master image Item #1), a master image Item #2, the thumbnail image specified by an item ID #101 (this thumbnail image will be hereinafter also written as the thumbnail image Item #101), and a thumbnail image Item #102 are stored in the mdat box. Accordingly, the number of items is four. Note that the thumbnail image Item #101 is the thumbnail image of the master image Item #1, and the thumbnail image Item #102 is the thumbnail image of the master image Item #2.

The iinf box further stores an infe box for each item stored in the mdat box, for example. In an infe box, an item ID for specifying an item, and an item type are registered. In FIG. 9, there are the respective infe boxes of the master images Item #1 and Item #2 and the thumbnail images Item #101 and Item #102.

The iref box stores thmb boxes as information for associating the items stored in the mdat box with each other, for example. In a thmb box, a reference source and a reference destination associated with each other are stored as information for associating a master image with the thumbnail image of the master image. In the thmb box, the reference source indicates the item ID of the master image, and the reference destination indicates the item ID of the thumbnail image of the master image specified by the item ID of the reference source. Accordingly, with the reference destination associated with the reference source, the item ID of the thumbnail image of the master image specified by the item ID indicated by the reference source can be recognized. Also, with the reference source associated with the reference destination, the item ID of the master image of the thumbnail image specified by the item ID indicated by the reference destination can be recognized.

As described above with reference to FIG. 6, the iprp box stores an ipco box and an ipma box. As described above with reference to FIG. 6, the ipco box stores the properties of the frames as the items stored in the mdat box, such as codec information regarding the codec and image size information regarding the size, for example. As described above with reference to FIG. 6, the ipma box stores the index of the properties stored in the ipco box regarding the items stored in the mdat box.

As described above with reference to FIG. 6, the iloc box stores information regarding the storage locations of the items in the mdat box. In FIG. 9, the information stored in the iloc box indicates that the number of items is four. Further, in the iloc box, offsets for the respective storage locations and the sizes of the master images Item #1 and Item #2 and the thumbnail images Item #101 and Item #102 stored in the mdat box are associated with the item IDs and are stored.

In the description below, an associating collection file in which internal data and specific information about external data that are associated with each other are stored in the conventional collection file in FIG. 9 is explained.

Figure 10:
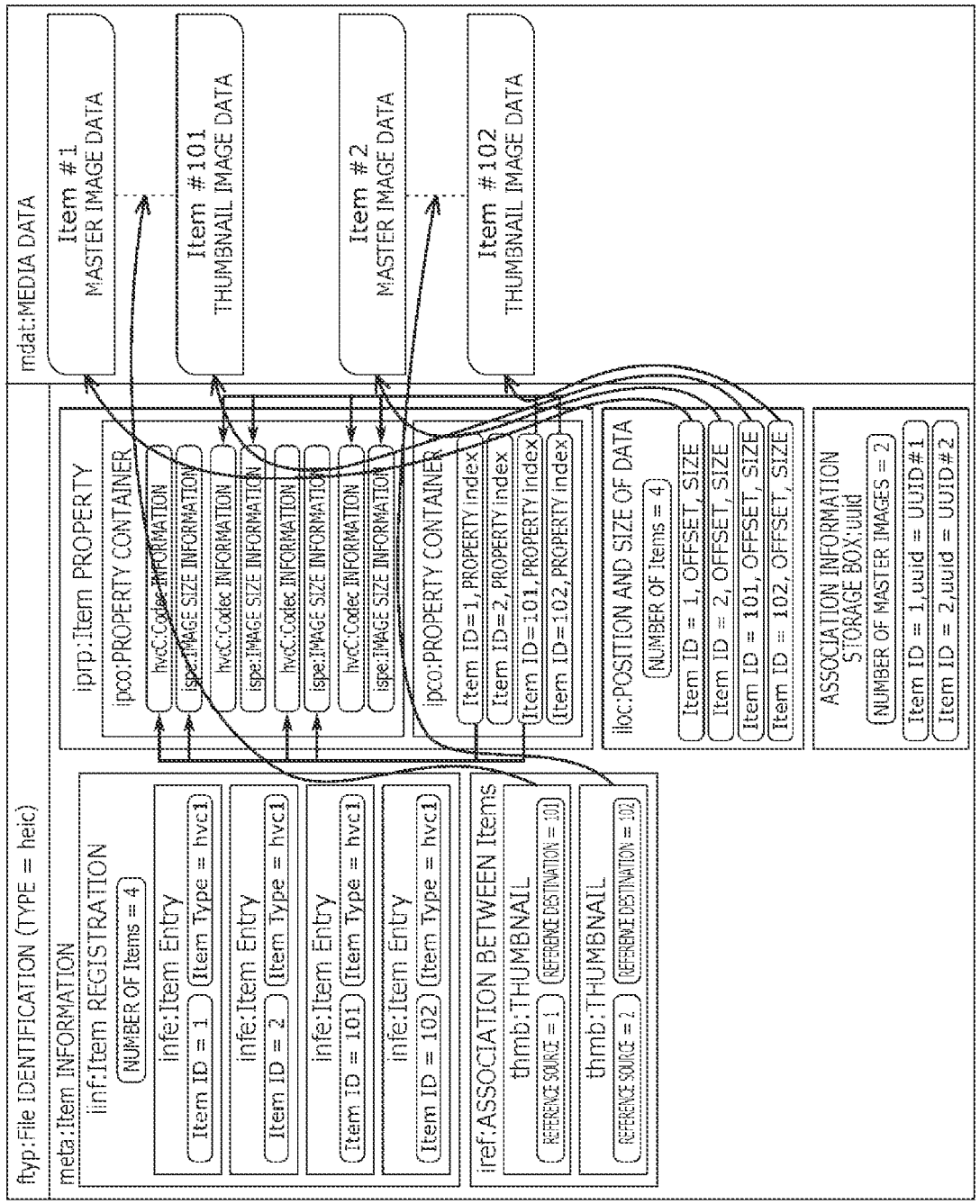
FIG. 10 is a diagram showing an example of a first associating collection file.

FIG. 10 is a diagram showing an example of a first associating collection file.

Here, (a RAW file storing) the RAW image of a master image is adopted as the external data associated with the master image as internal data in the HEIF file, for example.

In the first associating collection file, association information for associating the master images as the internal data with the specific information regarding (the RAW images stored in) the RAW files storing the RAW images as the external data, so that the master images and the specific information regarding the RAW files storing the RAW images are associated and stored. Further, in the first associating collection file, the association information is stored in the meta box.

As the specific information regarding a RAW files storing a RAW image as external data, any information from which it is possible to specify (the RAW image stored in) the RAW file, such as the file name of the RAW file, the universally unique identifier (uuid) issued to the RAW file, or the uniform resource locator (URL), can be adopted.

In the first associating collection file, an association information storage box in which the association information is stored is defined as a new box to be stored in the meta box, and is stored in the meta box. The association information storage box of the first associating collection file stores the association information in which the item ID for specifying a master image is associated with the uuid as the specific information for specifying (the RAW image stored in) the RAW file (storing the RAW image) associated with the master image, for example. Further, the association information storage box stores the number of the master images (the master image number) associated with (the RAW images stored in) the RAW files. Being the number of the master images associated with the RAW files, the number of the master images stored in the association information storage box is equal to or smaller than the number of the master images stored in the mdat box.

In FIG. 10, the uuid of the RAW file of the master image Item #1 (the uuid of the RAW image associated with the master image Item #1) is UUID #1, and the uuid of the RAW file of the master image Item #2 is UUID #2. Where a RAW file whose uuid is UUID #i is written as the RAW file UUID #i, association information in which the item ID #1 of the master image Item #1 is associated with the uuid of the RAW file UUID #1, and the item ID #2 of the master image Item #2 is associated with the uuid of the RAW file UUID #2 is stored in the association information storage box in FIG. 10.

Figure 11:
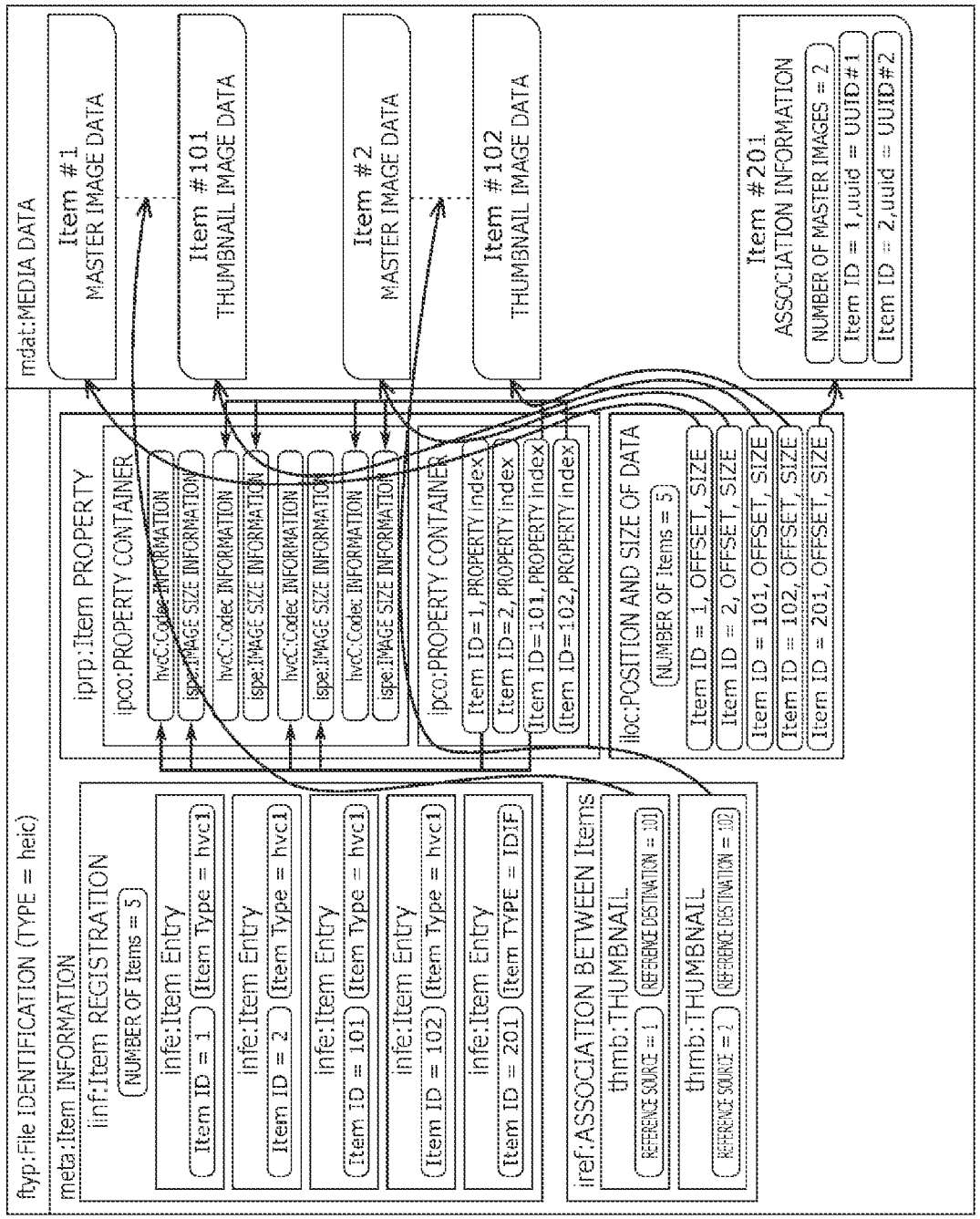
FIG. 11 is a diagram showing an example of a second associating collection file.

FIG. 11 is a diagram showing an example of a second associating collection file.

In the second associating collection file, association information for associating the master images as the internal data with the specific information regarding the RAW files as the external data, so that the master images and the specific information regarding the RAW files are associated and stored, as in the first associating collection file. However, in the second associating collection file, the association information is stored in the mdat box.

In the second associating collection file, association information similar to that in the case of the first associating collection file is stored as an item in the mdat box, for example. In FIG. 11, the association information is stored as an item that is an item ID #201 in the mdat box.

As described above, in the second associating collection file, the information stored in the meta box is different from that in the case of the conventional collection file in FIG. 9, as the association information is stored as the item Item #201 in the mdat box. In the second associating collection file, metadata of the association information as the item Item #201 is stored in the meta box.

Specifically, in the second associating collection file, the number of the items stored in the iinf box and the iloc box is five, increasing from four in the case in FIG. 9, the item Item #201 being added as one to four. Further, the infe box for the item Item #201 is added to the iinf box, and the offset for the storage location and the size of the item Item #201 are added to the iloc box. The infe box for the item Item #201 stores the item ID #201 of the item Item #201, and an item type IDIF (identifying data info) indicating that the item Item #201 is the association information. The IDIF is a newly defined attribute value (field value) indicating that the item is the association information.

Figure 12:
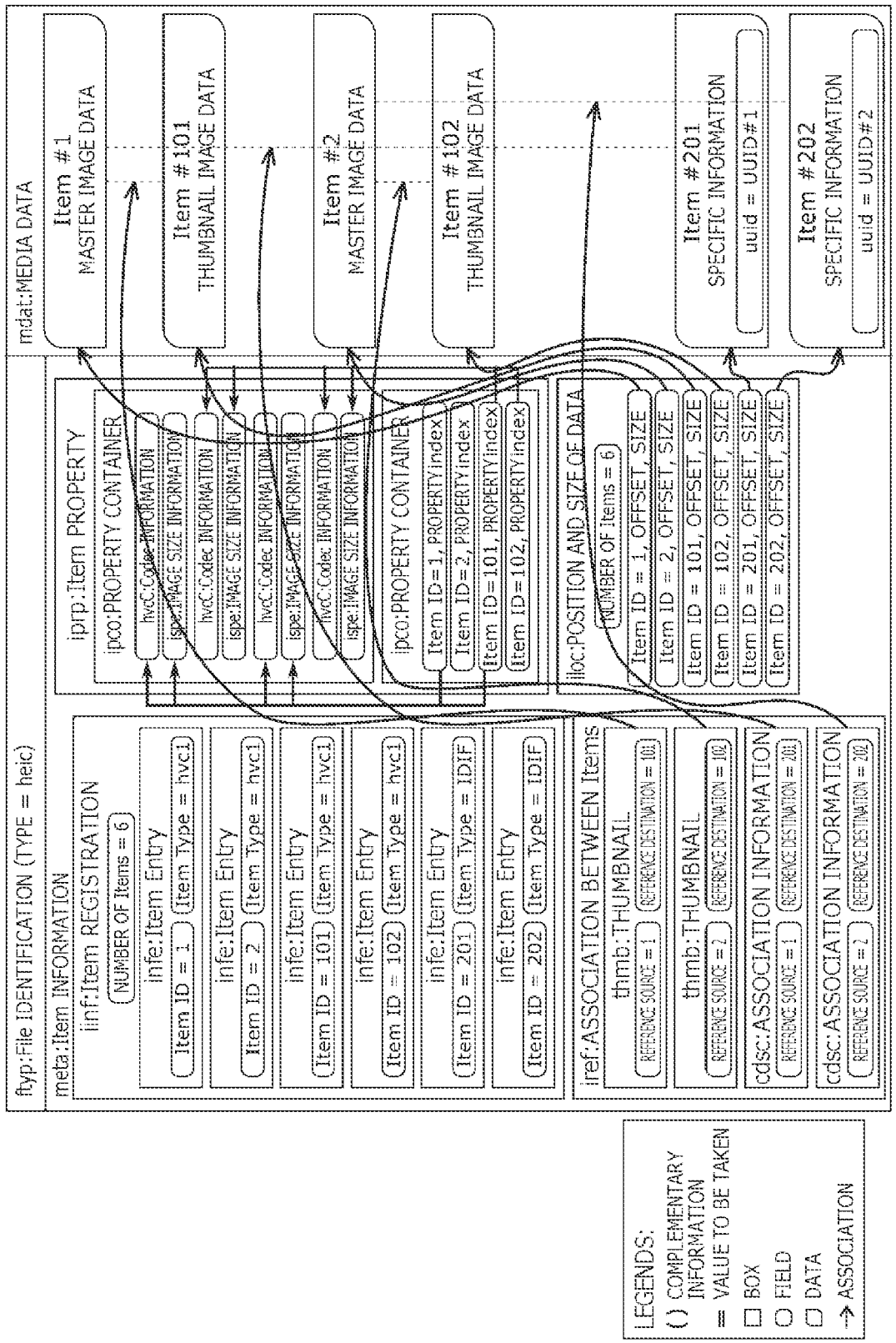
FIG. 12 is a diagram showing an example of a third associating collection file.

FIG. 12 is a diagram showing an example of a third associating collection file.

In the third associating collection file, the specific information regarding the RAW files as external data is stored as an item for each piece of specific information in the mdat box, and association information for associating the master images as the internal data with the specific information regarding the RAW files as the external data is stored in the meta box, so that the master images and the specific information regarding the RAW files are associated and stored. However, in the third associating collection file, the association information is information in which the item IDs of the master images as items are associated with the item IDs of the specific information (about the RAW files) as items, and is stored in cdsc boxes stored in the iref box in the meta box.

In a cdsc box, a reference source and a reference destination that are associated with each other can be stored as information for associating items with each other, the items being a master image and the specific information about the RAW file of the master image. In the cdsc box, the reference source indicates the item ID of the master image, and the reference destination indicates the item ID of the specific information as an item of the RAW file of the master image specified by the item ID of the reference source.

In FIG. 12, UUID #1, which is the uuid as the specific information about the RAW file of the master image Item #1, is stored as the item Item #201 in the mdat box, and UUID #2, which is the uuid as the specific information about the RAW file of the master image Item #2, is stored as an item Item #202 in the mdat box. Further, a cdsc box storing the association information in which the item ID #1 of the master image Item #1 and the item ID #201 of the specific information UUID #1 are associated with each other as a reference source and a reference destination is stored in the iref box, and a cdsc box storing the association information in which the item ID #2 of the master image Item #2 and the item ID #202 of the specific information UUID #2 are associated with each other as a reference source and a reference destination is stored in the iref box.

<Sequence File>

Figure 13:
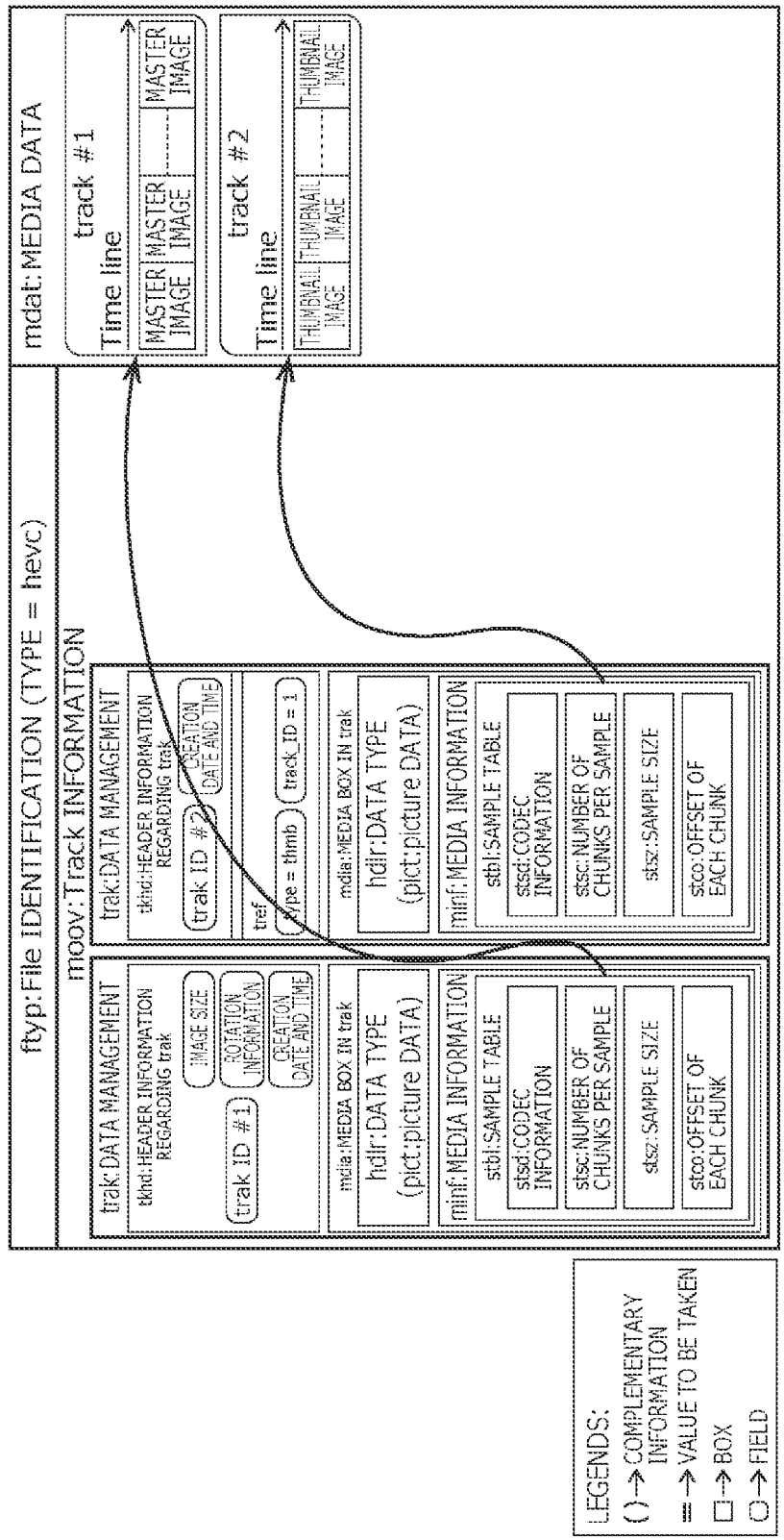
FIG. 13 is a diagram showing an example of a conventional sequence file in which a track of master images and a track of the thumbnail images of the master images are stored.

FIG. 13 is a diagram showing an example of a conventional sequence file in which a track of master images and a track of the thumbnail images of the master images are stored.

Here, a conventional sequence means a sequence file in which the internal data in the sequence file is not associated with specific information about external data.

Here, frames encoded by HEVC are stored in the mdat box of the sequence file.

In the ftyp box, hevc indicating that the format is an image sequence format and that the codec is HEVC is stored as identification information for identifying the file format.

The moov box stores trak boxes that manage the respective tracks stored in the mdat box, as described above with reference to FIG. 7. In FIG. 13, the track of master images specified by a track ID #1 (this track will be hereinafter also written as the track #1), and a track #2 of the thumbnail images of the master images of the track #1 are stored in the mdat box. Accordingly, the moov box stores a trak box that manages the track #1, and a trak box that manages the track #2. (The frame of) the nth thumbnail image (from the top) of the track #2 is the thumbnail image of the nth master image of the track #1.

A sequence file is useful in cases, such as a case where continuous shooting is performed by the digital camera 10, and a case where master images of a plurality of frames obtained by the continuous shooting are recorded as one track while the thumbnail images of the master images are also recorded as one track, for example.

The tkhd box of the trak box that manages the track #1 of the master images stores the track ID #1 for specifying the track #1, the image size of the master images constituting the track #1, rotation information indicating the orientation of the digital camera 10 when the master images were captured, and the creation date and time of the track #1. The tkhd box of the trak box that manages the track #2 of the thumbnail images stores the track ID #2 for specifying the track #2, and the creation date and time of the track #2.

In a trak box, a tref box can be stored in addition to the tkhd box and the mdia box described above with reference to FIG. 7. A tref box stores a track ID for specifying another track associated with the track being managed by the trak box storing the tref box, information indicating the contents of the track, and the like. In FIG. 13, a tref box is provided in the trak box that manages the track #2. Further, the tref box stores information indicating that another track associated with the track #2 is the track #1 (track ID=1), and that the data constituting the track #2 is thumbnail images (the track #2 is a track of thumbnail images) (type=thmb).

In the mdia box in a trak box, an hdlr box can be stored in addition to the minf box described above with reference to FIG. 8. An hdlr box stores information indicating the type of the data constituting the track being managed by the trak box storing the hdlr box. Information (pict) indicating that the data constituting the track #1 is pictures (frames) is stored in the hdlr box stored (in the mdia box stored) in the trak box that manages the track #1 of the master images, and information indicating that the data constituting the track #2 is pictures is stored in the hdlr box stored in the trak box that manages the track #2 of the thumbnail images.

The minf box is as described above with reference to FIG. 8.

In the description below, an associating sequence file in which internal data and specific information about external data that are associated with each other are stored in the conventional sequence file in FIG. 13 is explained.

Figure 14:
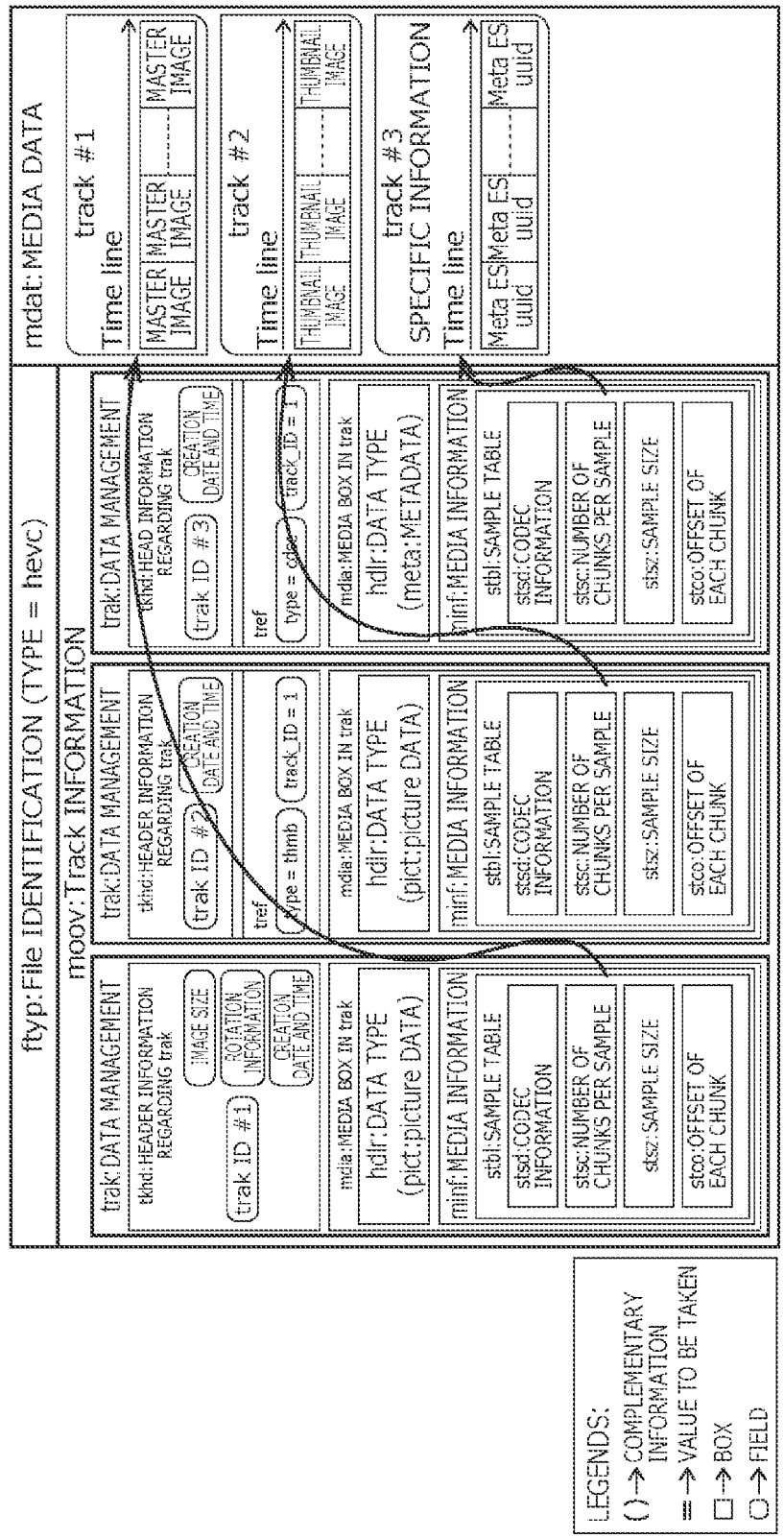
FIG. 14 is a diagram showing an example of an associating sequence file.

FIG. 14 is a diagram showing an example of an associating sequence file.

In an associating sequence file, a track #3 of the (elementary) stream (Meta ES) of a uuid as the specific information about RAW files as external data is added to the mdat box, and a trak box that manages the track #3 is added to the moov box.

Here, the track #1 is a time series of one or more frames of master images arranged on the timeline, and the track #3 is a time series of the uuids of the RAW files of the respective frames of the master images arranged on the timeline.

The nth uuid (from the top) of the track #3 is the specific information about the RAW file of the frame of the nth master image in the track #1. Further, (the data of) the plurality of tracks stored in the mdat box can be synchronously reproduced according to the time information on one timeline. Therefore, the track #1 of the master images and the track #3 of (the stream of) the uuids of the RAW files of the respective frames of the master images constituting the track #1 are stored in the mdat box, so that the frame of the nth master image of the track #1 and the uuid of the RAW file of (the frame of) the master image are associated with each other and stored. In this case, the frame of a master image of the track #1 and the uuid of the RAW file of (the frame of) the master image can be associated with each other by the time information on the timeline.

Note that the nth uuid (from the top) of the track #3 is the specific information about the RAW file of the nth frame of the track #1, and it can be understood that (the frames of) the master images constituting the track #1 and the uuids constituting the track #3 are associated with each other by the arrangement sequences in the tracks.

In the associating sequence file, a trak box that manages the track #3 is added to the moov box, because the track #3 of the uuids of the RAW files is added to the mdat box.

The trak box that manages the track #3 of the uuids of the RAW files stores a tkhd box, a tref box, an mdia box, and the like.

The tkhd box of the trak box that manages the track #3 stores the track ID #3 for specifying the track #3, and the creation date and time of the track #3.

The tref box of the trak box that manages the track #3 stores a track ID for specifying another track associated with the track #3 being managed by the trak box storing the tref box, information indicating the contents of the track #3, and the like. Since the uuids constituting the track #3 is the specific information about the RAW files of the master images constituting the track #1, and the track #3 is associated with the track #1, information indicating that another track associated with the track #3 is the track #1 (track ID=1) and that the track #3 is a track of metadata (specific information herein) (type=cdsc) is stored in the tref box of the trak box that manages the track #3 in FIG. 14.

The mdia box of the trak box that manages the track #3 stores an hdlr box and a minf box. In the trak box that manages the track #3, information indicating that the data constituting the track #3 is metadata (of the master images) is stored in the hdlr box, and an stsc box, an stsc box, an stsz box, and an stco box for the track #3 are stored in the minf box.

<Generation and Reproduction of an HEIF File>

Figure 15:
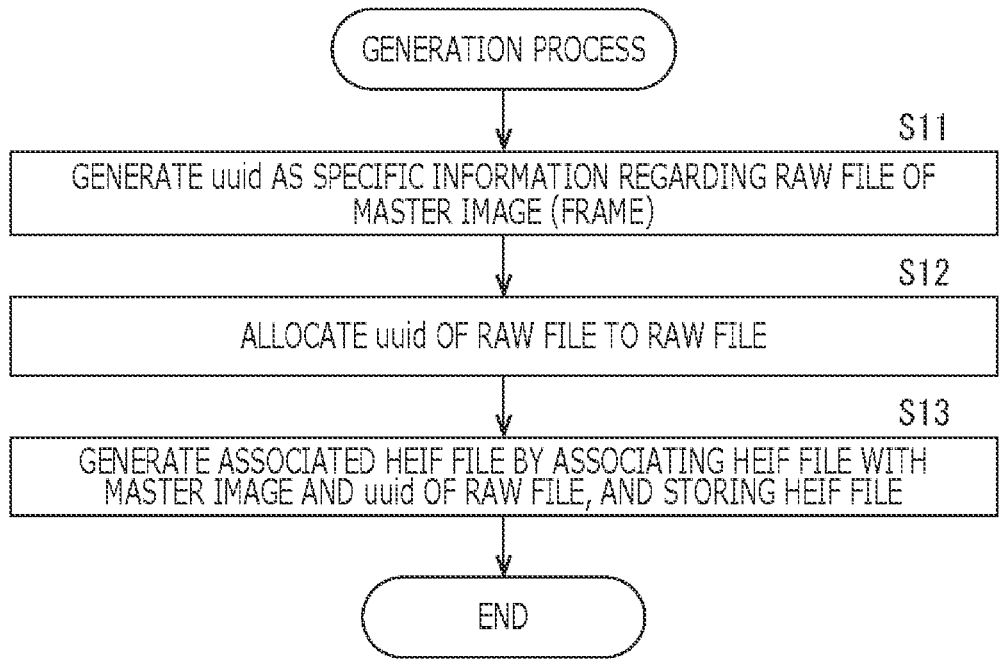
FIG. 15 is a flowchart for explaining an outline of an example of a generation process for generating an associating HEIF file.

FIG. 15 is a flowchart for explaining an outline of an example of a generation process for generating an associating HEIF file.

In the generation process, in step S11, the file control unit 43 generates a uuid as specific information about the RAW file (RAW image) of the frame of a master image, and the process then moves on to step 312.

In step 312, the file control unit 43 allocates the uuid generated in step S11 to the RAW file (RAW image) of the frame of the master image, and the process then moves on to step S13.

In step 313, the file control unit 43 generates an associating HEIF file in which the frame of the master image and the uuid of the RAW file of the frame that are associated with each other are stored in an HEIF file, and then ends the generation process.

Figure 16:
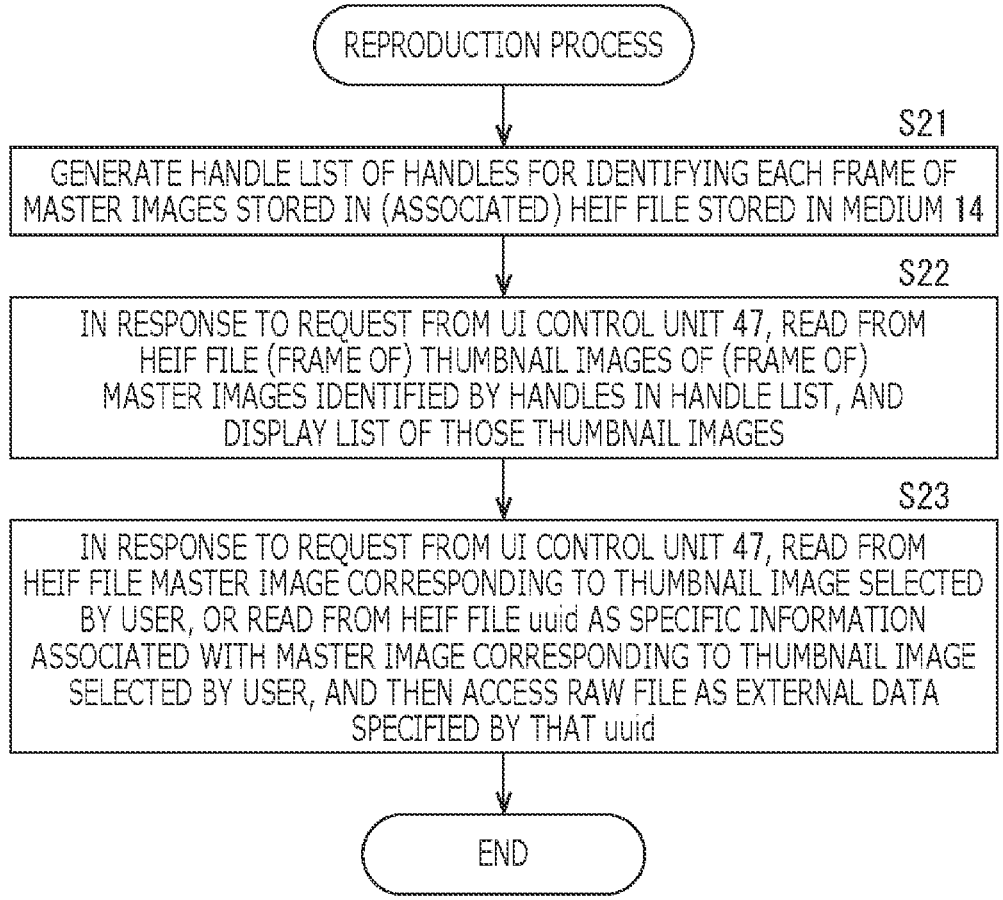
FIG. 16 is a flowchart for explaining an outline of an example of a reproduction process for reproducing an associating HEIF file.

FIG. 16 is a flowchart for explaining an outline of an example of a reproduction process for reproducing an associating HEIF file.

In the reproduction process, in step S21, the file control unit 43 generates a handle list of handles for identifying each of the frames of the master images stored in an HEIF file stored in the medium 14, for example, and the process then moves on to step S22.

Here, the handle of the frame of a master image includes the file name of the HEIF file in which the frame is stored. The handle of the frame (item) of a master image stored in a collection file further includes the item ID of the frame. The handle of the frame of a master image stored in a sequence file further includes time information about the frame. With the handle of the frame of a master image, the frame corresponding to the handle can be uniquely identified (specified).

Note that the handle of the frame of a master image stored in the sequence file can include the track ID of the track including the frame, and the order of the frame (what the order of the frame is) in the track, instead of the time information about the frame.

The time information about each frame is unique, regardless of whether the number of the tracks formed with the frames of master images stored in the sequence file is one or plural. Accordingly, with the time information about the frames, even if a plurality of tracks is stored in the sequence file, the frame of the time information included in the handle can be uniquely specified from the frames constituting each track of the plurality of tracks. Thus, in a case where the time information about the frame is included in the handle of the frame of a master image, the frame corresponding to the time information can be uniquely specified even if there is no track ID of the track in which the frame exists.

The handle list can be generated for all the frames of the master images stored in the HEIF file stored in the medium 14, or can be generated for only frames narrowed down under a specific condition, such as the frames of a specific creation date and time.

After generating the handle list, the file control unit 43 accesses the HEIF file by referring to the handle list as necessary.

In step S22, after waiting for the user to operate the digital camera 10 so as to display a thumbnail image or the like, for example, the UI control unit 47 requests the file control unit 43 to display the thumbnail image. In response to the thumbnail image display request from the UI control unit 47, the file control unit 43 reads, from the HEIF file, (the frames of) the thumbnail images of the frames of the master images identified by the handles in the handle list. The file control unit 43 then causes the liquid crystal panel 19 (FIG. 1), for example, to display a list of the thumbnail images read from the HEIF file, and the process moves from step S22 on to step S23.

In step S23, after waiting for the user to select (the frame of) a desired thumbnail from the list of the thumbnail images or the like, for example, the UI control unit 47 requests the file control unit 43 to display the master image corresponding to the thumbnail image selected by the user. In response to the request for the master image from the UI control unit 47, the file control unit 43 reads the master image from the HEIF file. The file control unit 43 can cause the liquid crystal panel 19 to display the master image read from the HEIF file, as necessary.

Alternatively, the UI control unit 47 requests the file control unit 43 to supply the uuid of the RAW file of the master image corresponding to the thumbnail image selected by the user. In response to the uuid request from the UI control unit 47, the file control unit 43 reads the uuid from the associating HEIF file. The file control unit 43 can access the RAW file specified by the uuid read from the associating HEIF file, as necessary.

Figure 17:
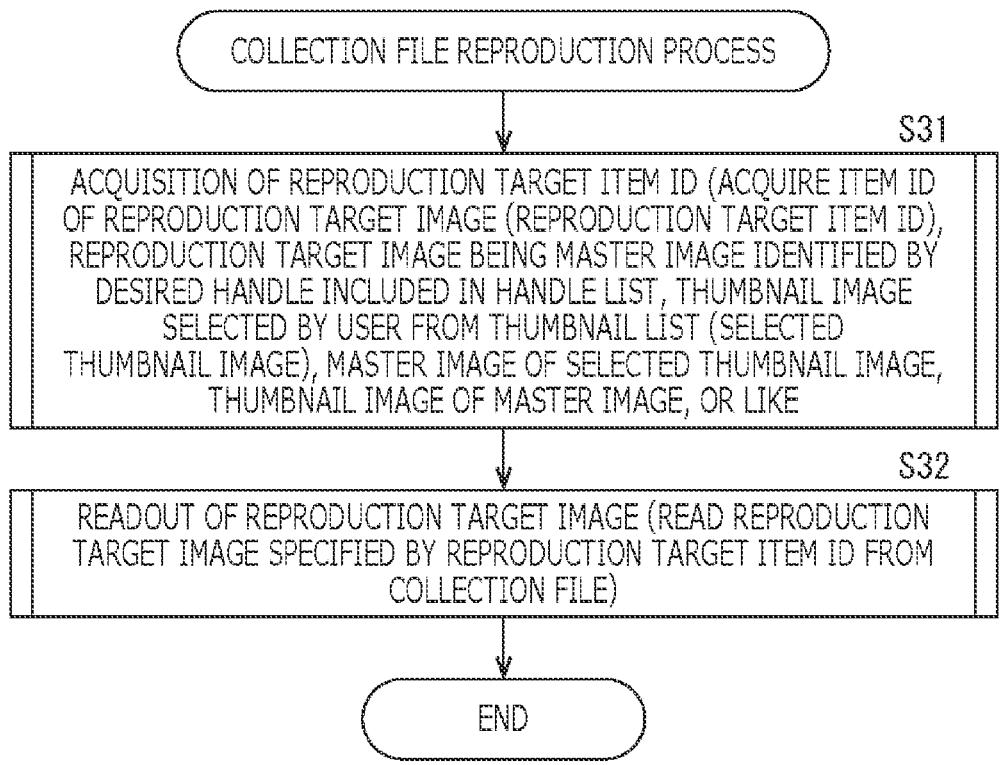
FIG. 17 is a flowchart for explaining an example of a reproduction process for reproducing a collection file.

FIG. 17 is a flowchart for explaining an example of a reproduction process for reproducing a collection file.

In step S31, the file control unit 43 acquires the item ID of the reproduction target image that is the image (item) to be reproduced (this ID will be hereinafter also referred to as the reproduction target item ID), and the process then moves on to step S32.

In the acquisition of the reproduction target item ID, the item ID of the reproduction target image (the reproduction target item ID) is acquired, the reproduction target image being the master image identified by a certain handle in the handle list, the thumbnail image of the master image, a thumbnail image selected by the user from the list of the thumbnail images (this thumbnail image will be hereinafter also referred to as the selected thumbnail image), the master image of the selected thumbnail image, or the like, for example.

In step S32, the file control unit 43 reads the reproduction target image, in accordance with the reproduction target item ID acquired in step S31.

In the reading of the reproduction target image, the reproduction target image specified by the reproduction target item ID is read from the collection file.

Figure 18:
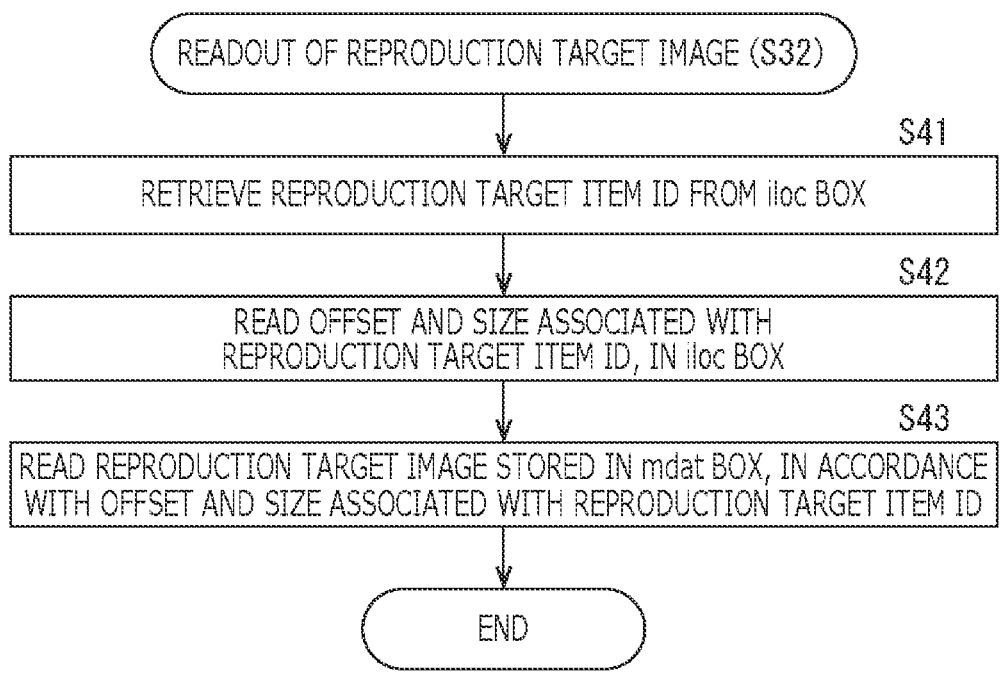
FIG. 18 is a flowchart for explaining an example of the process of reading the reproduction target image in step S32.

FIG. 18 is a flowchart for explaining an example of the process of reading the reproduction target image in step S32 in FIG. 17.

In step S41, the file control unit 43 retrieves the reproduction target item ID from the iloc box in the collection file (FIGS. 9 to 12), and the process then moves on to step S42.

In step S42, the file control unit 43 reads the offset and the size associated with the reproduction target item ID retrieved in step S41 in the iloc box, and the process then moves on to step S43.

In step S43, in accordance with the offset and the size associated with the reproduction target item ID, the file control unit 43 reads the reproduction target image stored in the mdat box in the collection file, and the process comes to an end.

Figure 19:
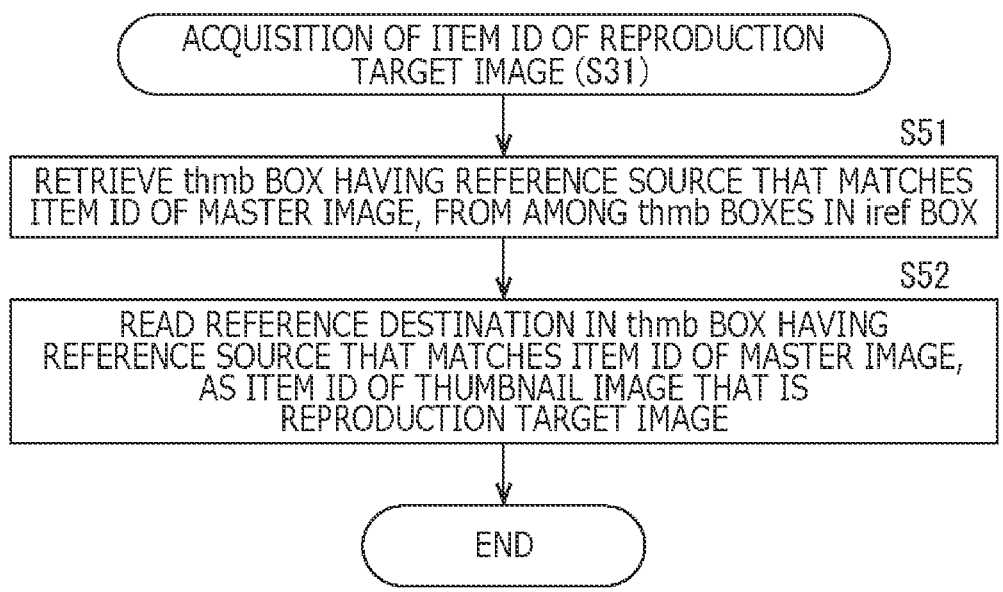
FIG. 19 is a flowchart for explaining a first example of the process of acquiring the reproduction target item ID in step S31.

FIG. 19 is a flowchart for explaining a first example of the process of acquiring the reproduction target item ID in step S31 in FIG. 17.

That is, FIG. 19 shows an example of acquisition of the item ID of a thumbnail image as the reproduction target image in a case where the reproduction target image is a thumbnail image.

Note that, in FIG. 19, the file control unit 43 recognizes the item ID of the master image of the thumbnail image as the reproduction target image, from its handle, for example.

In step S51, the file control unit 43 retrieves the thmb box whose reference source matches the item ID of the master image from among the thmb boxes in the iref box in the collection file (FIGS. 9 to 12), and the process then moves on to step S52.

In step S52, the file control unit 43 reads the reference destination in the thmb box, which was retrieved in step S51 and has the reference source matching the item ID of the master image, as the item ID of the thumbnail image as the reproduction target image, and the process comes to an end.

Figure 20:
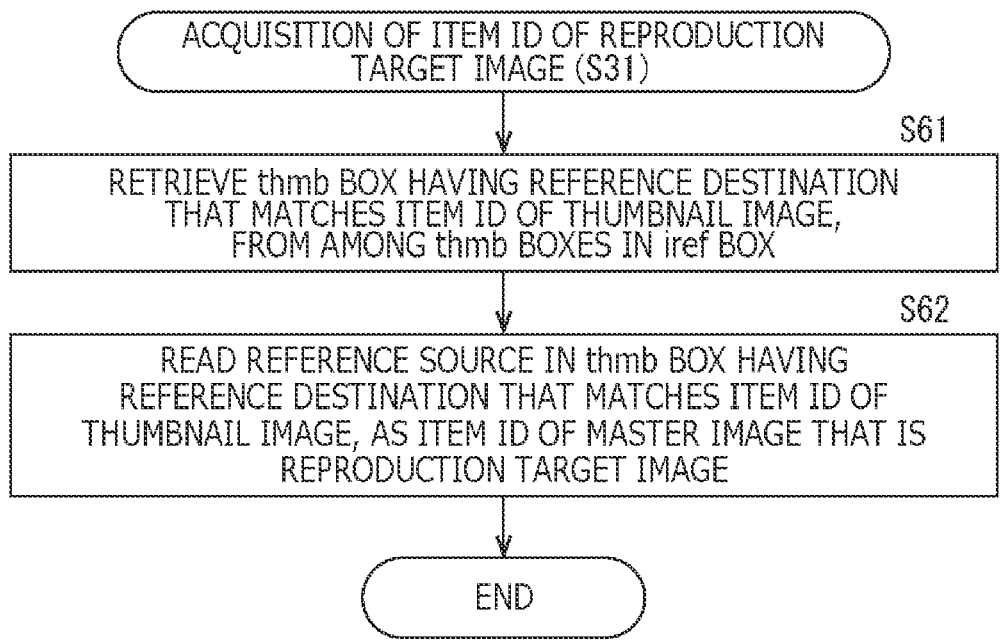
FIG. 20 is a flowchart for explaining a second example of the process of acquiring the reproduction target item ID in step S31.

FIG. 20 is a flowchart for explaining a second example of the process of acquiring the reproduction target item ID in step S31 in FIG. 17.

That is, FIG. 20 shows an example of acquisition of the item ID of a master image as the reproduction target image in a case where the reproduction target image is a master image.

Note that, in FIG. 20, the user selects a thumbnail image (a selected thumbnail image) from the list of thumbnail images, and the file control unit 43 recognizes the item ID of the selected thumbnail image, for example.

In step S61, the file control unit 43 retrieves the thmb box whose reference destination matches the item ID of the selected thumbnail image from among the thmb boxes in the iref box in the collection file (FIGS. 9 to 12), and the process then moves on to step S62.

In step S62, the file control unit 43 reads the reference source in the thmb box, which was retrieved in step 361 and has the reference destination matching the item ID of the selected thumbnail image, as the item ID of the master image as the reproduction target image, and the process comes to an end.

Figure 21:
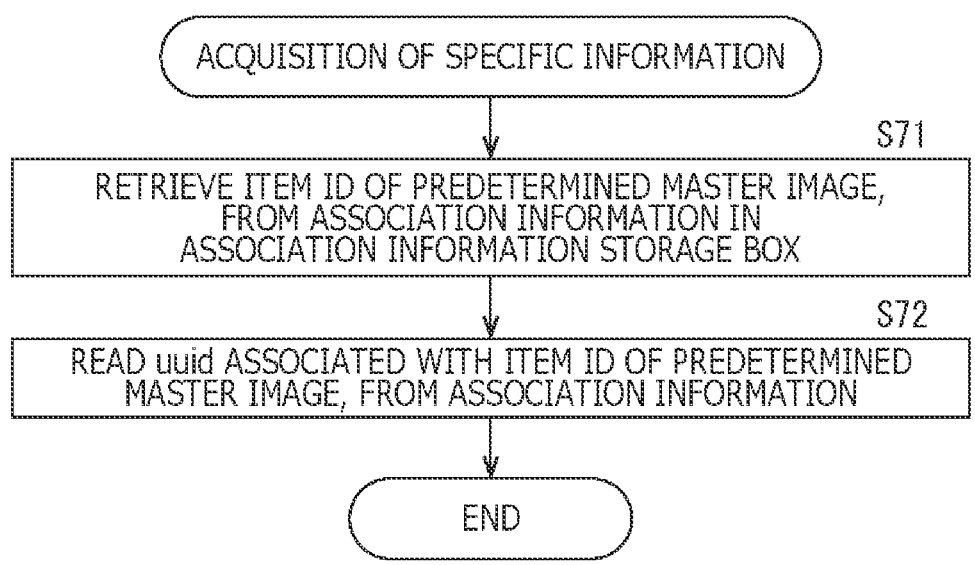
FIG. 21 is a flowchart for explaining an example of a process of acquiring a uuid as the specific information about the RAW file of a predetermined master image from a first associating collection file.

FIG. 21 is a flowchart for explaining an example of a process of acquiring a uuid as the specific information about the RAW file of a predetermined master image from the first associating collection file shown in FIG. 10.

Note that, in FIG. 21, the file control unit 43 recognizes the item ID of the predetermined master image from the handle list or the like, for example.

In step S71, the file control unit 43 retrieves the item ID of the predetermined master image from the association information in the association information storage box in the first associating collection file (FIG. 10), and the process then moves on to step S72.

In step S72, the file control unit 43 reads the uuid associated with the item ID of the predetermined master image retrieved in step S71 in the association information, and the process comes to an end.

With the uuid read in the above manner, the file control unit 43 can access the RAW file of the predetermined master image.

Figure 22:
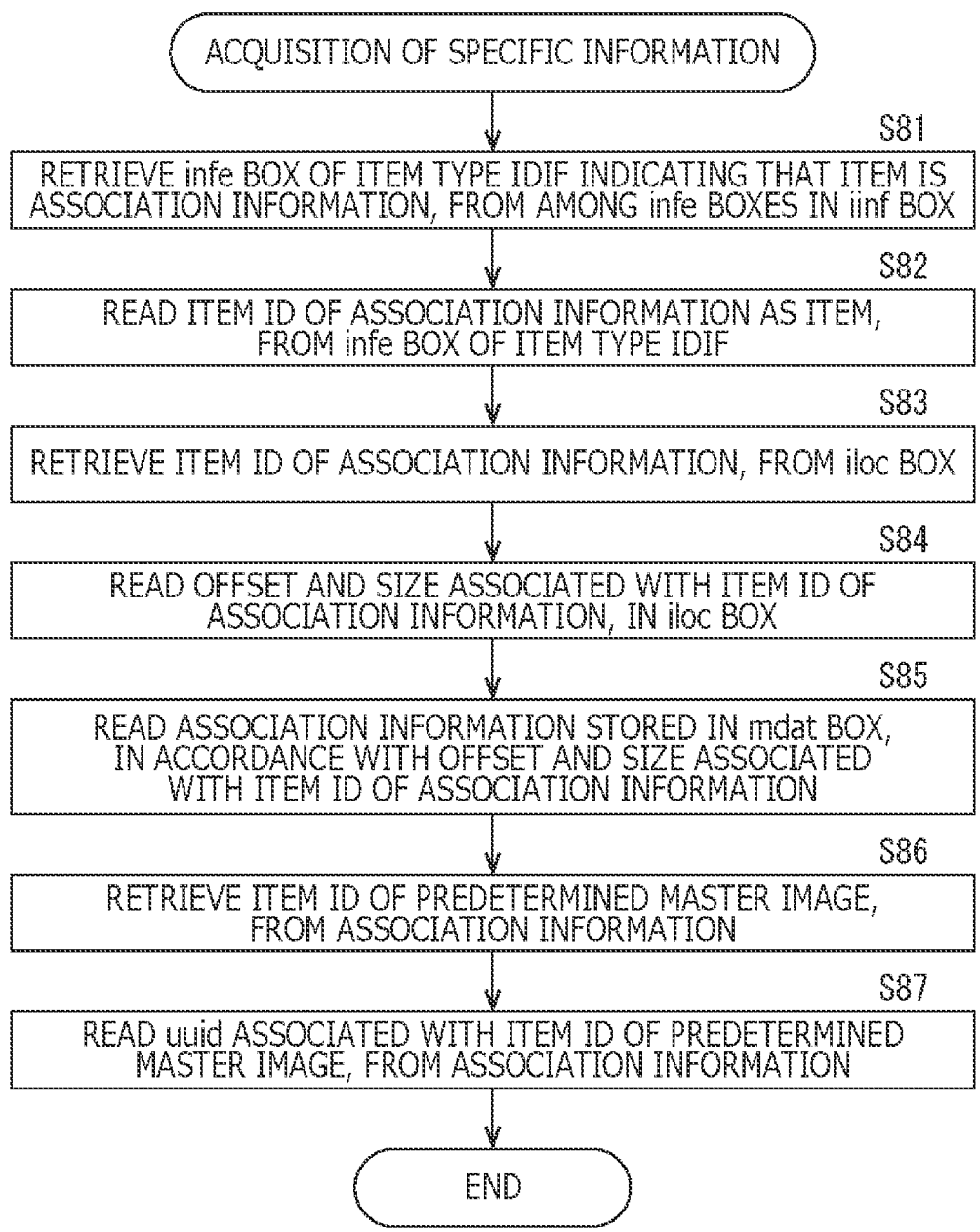
FIG. 22 is a flowchart for explaining an example of a process of acquiring a uuid as the specific information about the RAW file of a predetermined master image from a second associating collection file.

FIG. 22 is a flowchart for explaining an example of a process of acquiring a uuid as the specific information about the RAW file of a predetermined master image from the second associating collection file shown in FIG. 11.

Note that, in FIG. 22, the file control unit 43 recognizes the item ID of the predetermined master image from the handle list or the like, for example.

In step S81, the file control unit 43 retrieves the infe box of an item type IDIF indicating that the item is association information from among the infe boxes in the iinf box in the second associating collection file (FIG. 11), and the process then moves on to step S82.

In step S82, the file control unit 43 reads the item ID of the association information as an item from the infe box of the item type IDIF retrieved in step S81, and the process then moves on to step S83.

In step S83, the file control unit 43 retrieves the item ID of the association information read in step S82, from the iloc box in the second associating collection file, and the process then moves on to step S84.

In step S84, the file control unit 43 reads the offset and the size associated with the item ID of the association information retrieved in step S83 in the iloc box, and the process then moves on to step S85.

In step S85, in accordance with the offset and the size associated with the item ID of the association information read in step S84, the file control unit 43 reads the association information as an item stored in the mdat box in the second associating collection file, and the process then moves on to step S86.

In step S86, the file control unit 43 retrieves the item ID of the predetermined master image from the association information read in step S85, and the process then moves on to step S87.

In step S87, the file control unit 43 reads the uuid associated with the item ID of the predetermined master image retrieved in step S86 in the association information, and the process comes to an end.

With the uuid read in the above manner, the file control unit 43 can access the RAW file of the predetermined master image.

Figure 23:
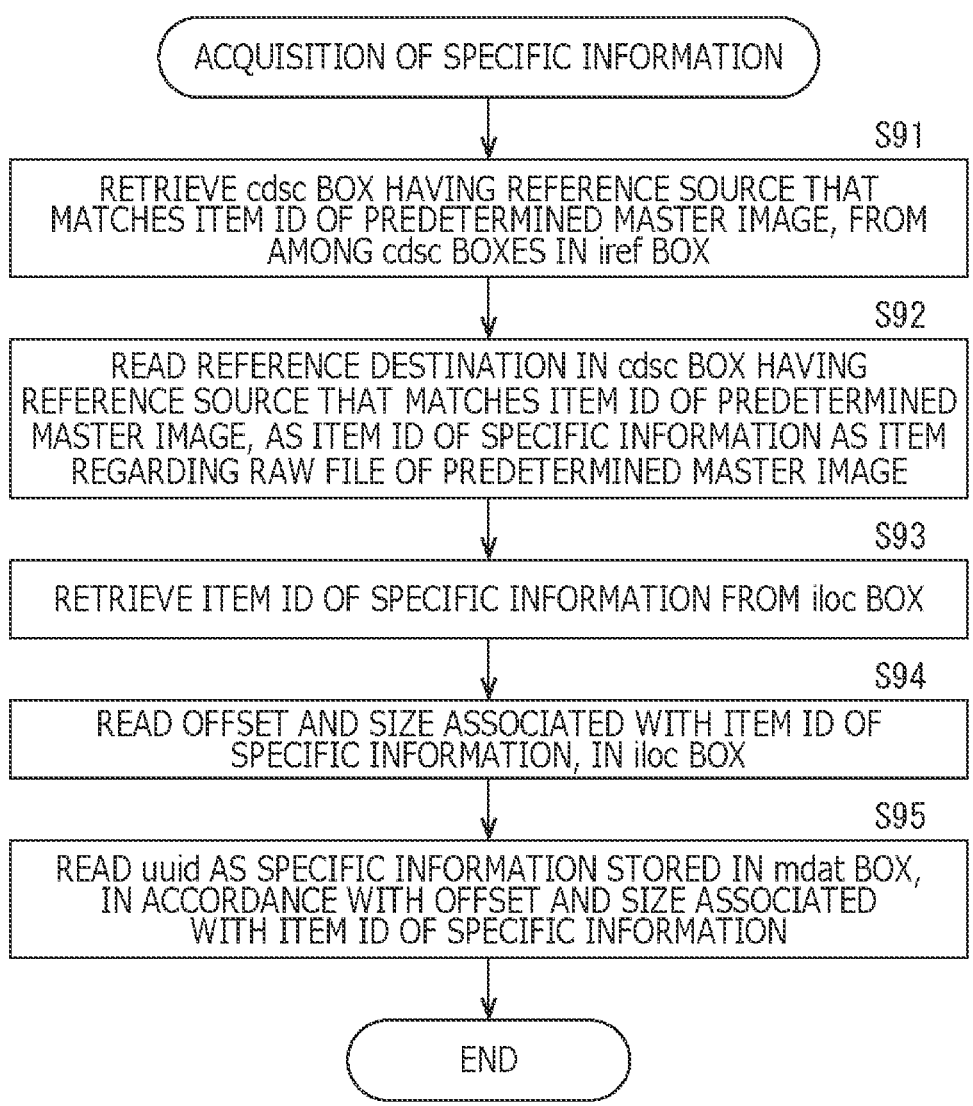
FIG. 23 is a flowchart for explaining an example of a process of acquiring a uuid as the specific information about the RAW file of a predetermined master image from a third associating collection file.

FIG. 23 is a flowchart for explaining an example of a process of acquiring a uuid as the specific information about the RAW file of a predetermined master image from the third associating collection file shown in FIG. 12.

Note that, in FIG. 23, the file control unit 43 recognizes the item ID of the predetermined master image from the handle list or the like, for example.

In step S91, the file control unit 43 retrieves the cdsc box having the reference source matching the item ID of the predetermined master image from among the cdsc boxes in the iref box in the third associating collection file (FIG. 12), and the process then moves on to step S92.

In step S92, the file control unit 43 reads the reference destination in the cdsc box, which was retrieved in step S91 and has the reference source matching the item ID of the predetermined master image, as the item ID of the specific information about the RAW file of the predetermined master image as an item, and the process then moves on to step S93.

In step S93, the file control unit 43 retrieves the item ID of the specific information as an item read in step S92, from the iloc box in the third associating collection file, and the process then moves on to step S94.

In step S94, the file control unit 43 reads the offset and the size associated with the item ID of the specific information retrieved in step S93 in the iloc box, and the process then moves on to step S95.

In step S95, in accordance with the offset and the size associated with the item ID of the specific information read in step S94, the file control unit 43 reads the uuid as the specific information about the RAW file of the predetermined master image stored in the mdat box in the third associating collection file, and the process comes to an end.

With the uuid read in the above manner, the file control unit 43 can access the RAW file of the predetermined master image.

Figure 24:
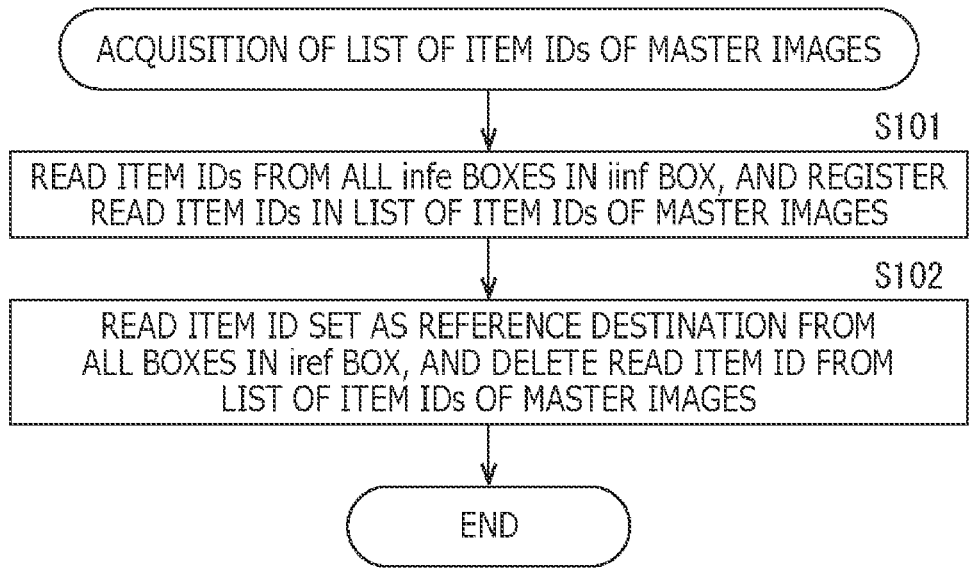
FIG. 24 is a flowchart for explaining an example of a process of acquiring a list of the item IDs of master images from a collection file.

FIG. 24 is a flowchart for explaining an example of a process of acquiring a list of the item IDs of master images from a collection file.

The process of acquiring the list of the item IDs of master images from a collection file is performed in a case where a handle list is to be generated, or the like, for example.

In step S101, the file control unit 43 reads item IDs from all the infe boxes in the iinf box in the collection file (FIGS. 9 to 12), and registers the item IDs in a list of the item IDs of master images (this list will be hereinafter also referred to as the master image list). The process then moves on to step S102.

In step S102, the file control unit 43 reads the item IDs that are reference destinations from all the boxes in the iref box in the collection file, and eliminates the read item IDs from the master image list. The process then comes to an end.

After the above process, the item IDs registered in the master image list are the item IDs of master images.

Figure 25:
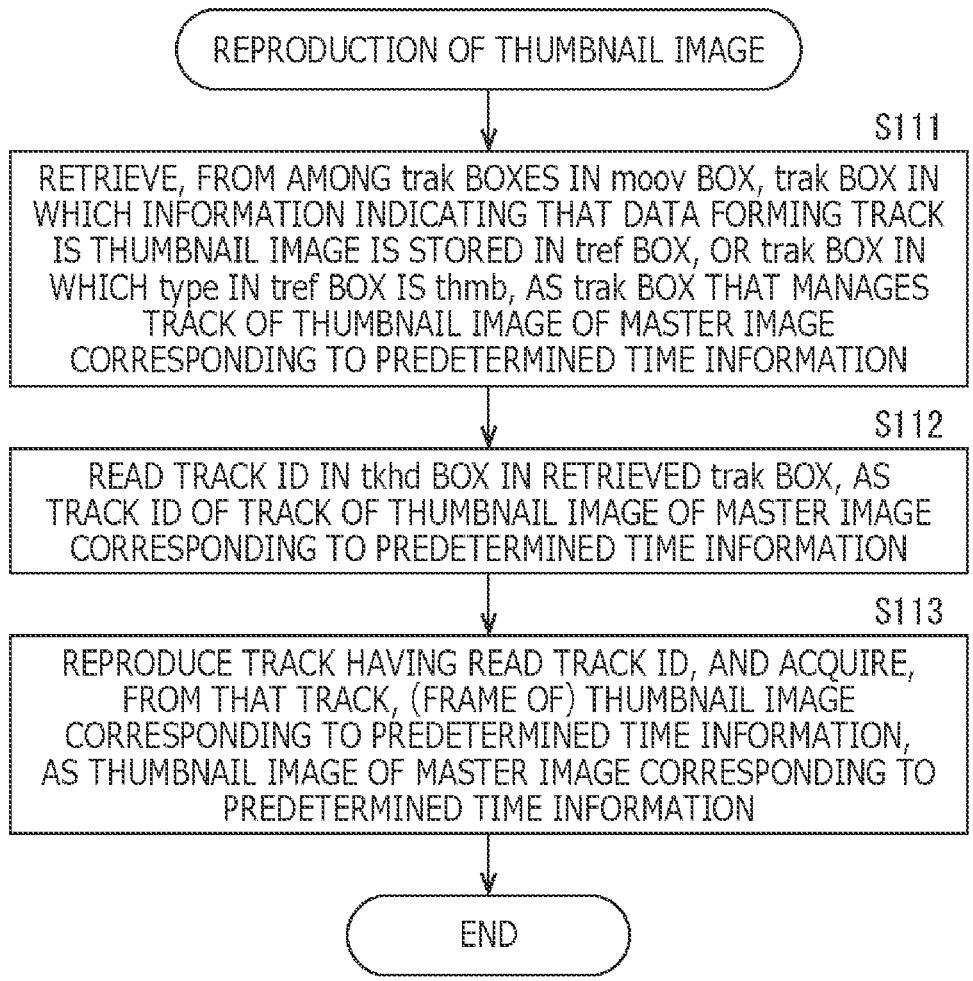
FIG. 25 is a flowchart for explaining an example of a process of reproducing, from a sequence file, the thumbnail image of (the frame of) the master image corresponding to predetermined time information.

FIG. 25 is a flowchart for explaining an example of a process of reproducing, from a sequence file, the thumbnail image of (the frame of) the master image corresponding to predetermined time information.

Note that, in FIG. 25, the file control unit 43 recognizes the time information about (or the order of) a predetermined master image from the handle list or the like, for example.

In step S111, from among the trak boxes in the moov box in a sequence file (FIGS. 13 and 14), the file control unit 43 retrieves the trak box in which information indicating that the data constituting the track is thumbnail images is stored in the tref box, or the trak box in which the type in the tref box is "thmb", as the trak box that manages the track of the thumbnail images of the master images corresponding to the predetermined time information. The process then moves on to step S112.

In step S112, the file control unit 43 reads the track ID in the tkhd box in the trak box retrieved in step S111, as the track ID of the track of the thumbnail images of the master images corresponding to the predetermined time information. The process then moves on to step S113.

In step S113, the file control unit 43 reproduces the track having the track ID read in step S112, and acquires (the frames of) the thumbnail images corresponding to the predetermined time information (or the order) from the track, as the thumbnail images of the master images corresponding to the predetermined time information. The process then comes to an end.

Note that the process of reproducing the track of the images stored in the sequence file is similar to a process of reproducing a video image in an MP4 file.

Figure 26:
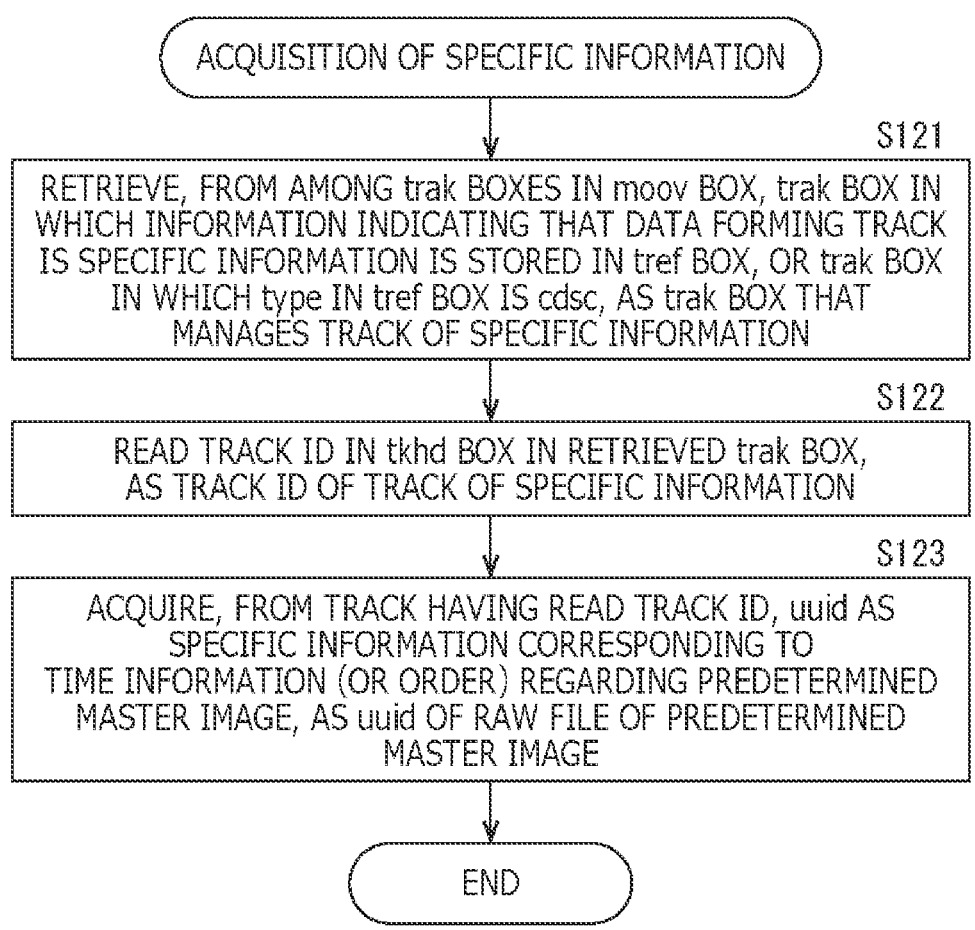
FIG. 26 is a flowchart for explaining an example of a process of acquiring a uuid as the specific information about the RAW file of (the frame of) a predetermined master image from an associating sequence file.

FIG. 26 is a flowchart for explaining an example of a process of acquiring a uuid as the specific information about the RAW file of (the frame of) a predetermined master image from an associating sequence file.

Note that, in FIG. 26, the file control unit 43 recognizes the time information about (or the order of) a predetermined master image from the handle list or the like, for example.

In step S121, from among the trak boxes in the moov box in an associating sequence file (FIG. 14), the file control unit 43 retrieves the trak box in which information indicating that the data constituting the track is specific information is stored in the tref box, or the trak box in which the type in the tref box is "cdsc", as the trak box that manages the track of specific information. The process then moves on to step S122.

In step S122, the file control unit 43 reads the track ID in the tkhd box in the trak box retrieved in step S121, as the track ID of the track of specific information. The process then moves on to step S123.

In step S123, from the track having the track ID read in step S122, the file control unit 43 acquires the uuid as the specific information corresponding to the time information about (or the order of) the predetermined master image, as the uuid of the RAW file of the predetermined master image. The process then comes to an end.

With the uuid acquired in the above manner, the file control unit 43 can access the RAW file of the predetermined master image.

As described above, the file control unit 43 generates and reproduces an associating HEIF file in which the master images in an HEIF file and the specific information for specifying external data outside the HEIF file are associated with each other and stored in the HEIF file compliant with HEIF. Thus, the master images stored in the HEIF file can be associated with external data outside the HEIF file.

Further, in a case where uuids are used as the specific information, even if the file name of external data is changed, the association between the master images in the HEIF file and the external data after the change of the file name can be maintained by the uuids.

<Storage of Specific Information Assigned to External Data>

Figure 27:
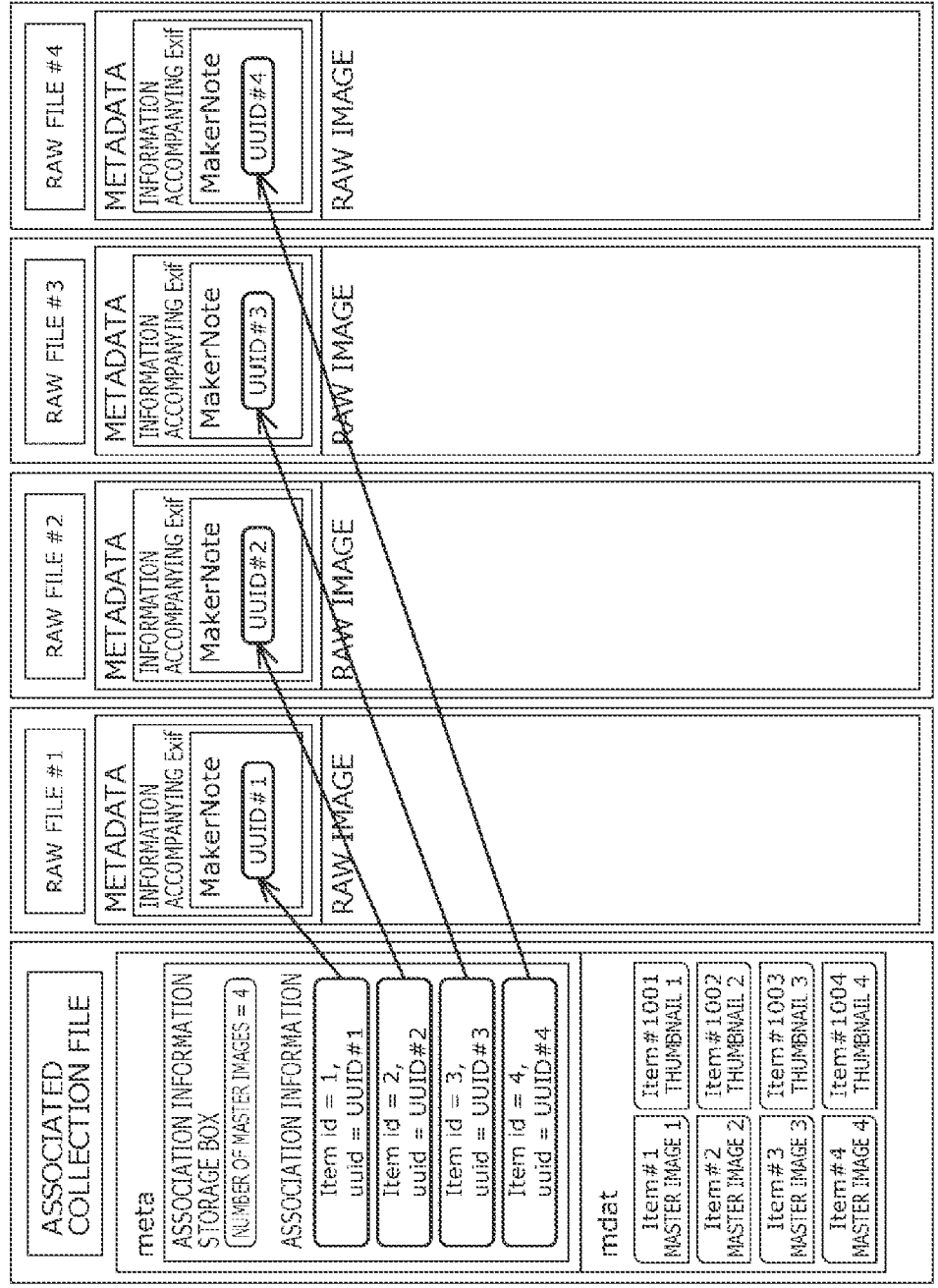
FIG. 27 is a diagram showing an example of storage of uuids in RAW files in a case where RAW files of master images are adopted as external data, and an associating collection file is generated.

FIG. 27 is a diagram showing an example of storage of uuids in RAW files in a case where RAW files of master images are adopted as (the files storing) external data, and an associating collection file is generated.

Note that, in FIG. 27, the first associating collection file is adopted as the associating collection file.

A RAW file has a region called a marker note (MakerNote) as part of the region storing the information accompanying Exif as metadata.

The file control unit 43 can store the uuid assigned to the RAW file (a RAW image) into the marker note of the RAW file, for example.

In FIG. 27, the master images Item #1, Item #2, Item #3, and Item #4 as four items are stored in the associating collection file, and RAW files #1, #2, #3, and #4 in which RAW images of the master images Item #1, Item #2, Item #3, and Item #4 are stored are generated. Further, a UUID #i is assigned to the RAW file #i (a RAW image), and, as association information for associating the master image Item #i with the UUID #i of the RAW file #i of the master image Item #i, association information for associating the item ID #i for specifying the master image Item #i with the UUID #i of the RAW file #i associated with the master image Item #i is stored in the association information storage box.

Figure 28:
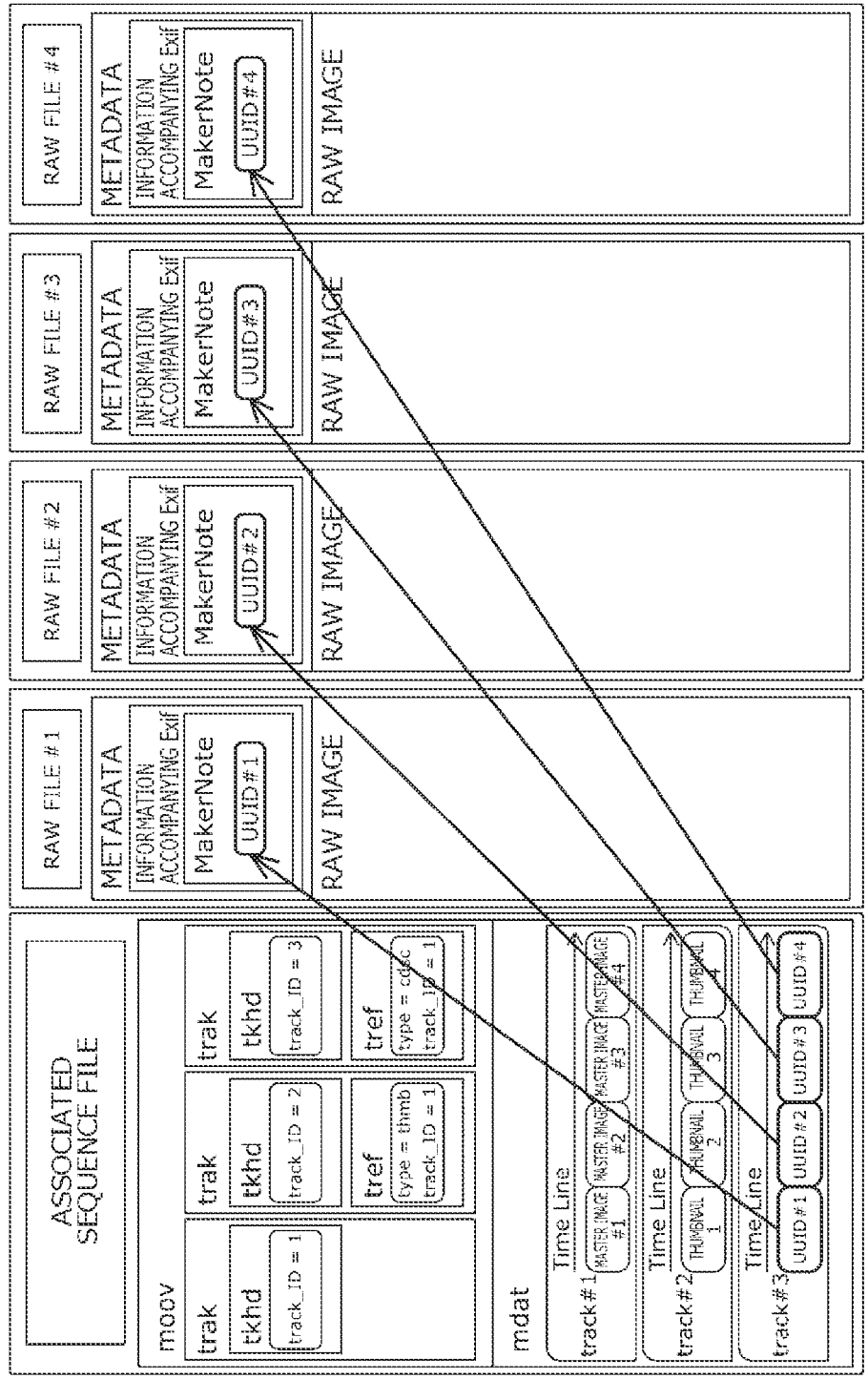
FIG. 28 is a diagram showing an example of storage of uuids in RAW files in a case where RAW files of master images are adopted as external data, and an associating sequence file is generated.

FIG. 28 is a diagram showing an example of storage of uuids in RAW files in a case where RAW files of master images are adopted as external data, and an associating sequence file is generated.

In a case where an associating sequence file is generated, the file control unit 43 can also store the uuids assigned to RAW files in the marker notes of the RAW files, as in a case where an associating collection file is generated as described above with reference to FIG. 27.

In FIG. 28, a track #1 formed with master images #1, #2, #3, and #4 as four frames is stored in the associating sequence file, and RAW files #1, #2, #3, and #4 in which RAW images of the master images #1, #2, #3, and #4 are stored are generated. Further, a UUID #i is assigned to the RAW file #i, and a track #3 in which the UUID #i of the RAW file #i is placed so as to have the same time information as the master image #i corresponding to the RAW file #i (a RAW image) is stored in the associating sequence file.

As described above, the UUID #i of the RAW file #i is placed so as to have the same time information as the master image #i corresponding to the RAW file #i, and the track #3 is formed. Thus, the ith master image #i in the track #1 and the ith UUID #i in the track #3, which is the UUID #i of the RAW file #i of the master image #i, are associated with each other and stored in the associating sequence file.

Although the RAW files (RAW images) of master images are adopted as external data in the above example, some other data can be adopted as external data. As the external data, the sound (voice) or the like recorded together with the imaging of the master images can be adopted, for example. As a file that stores sound, a WAV file in a WAV format, an MP4 file in an MP4 format, or the like can be adopted, for example. In the description below, WAV files are adopted as files that store sound, for example.

Figure 29:
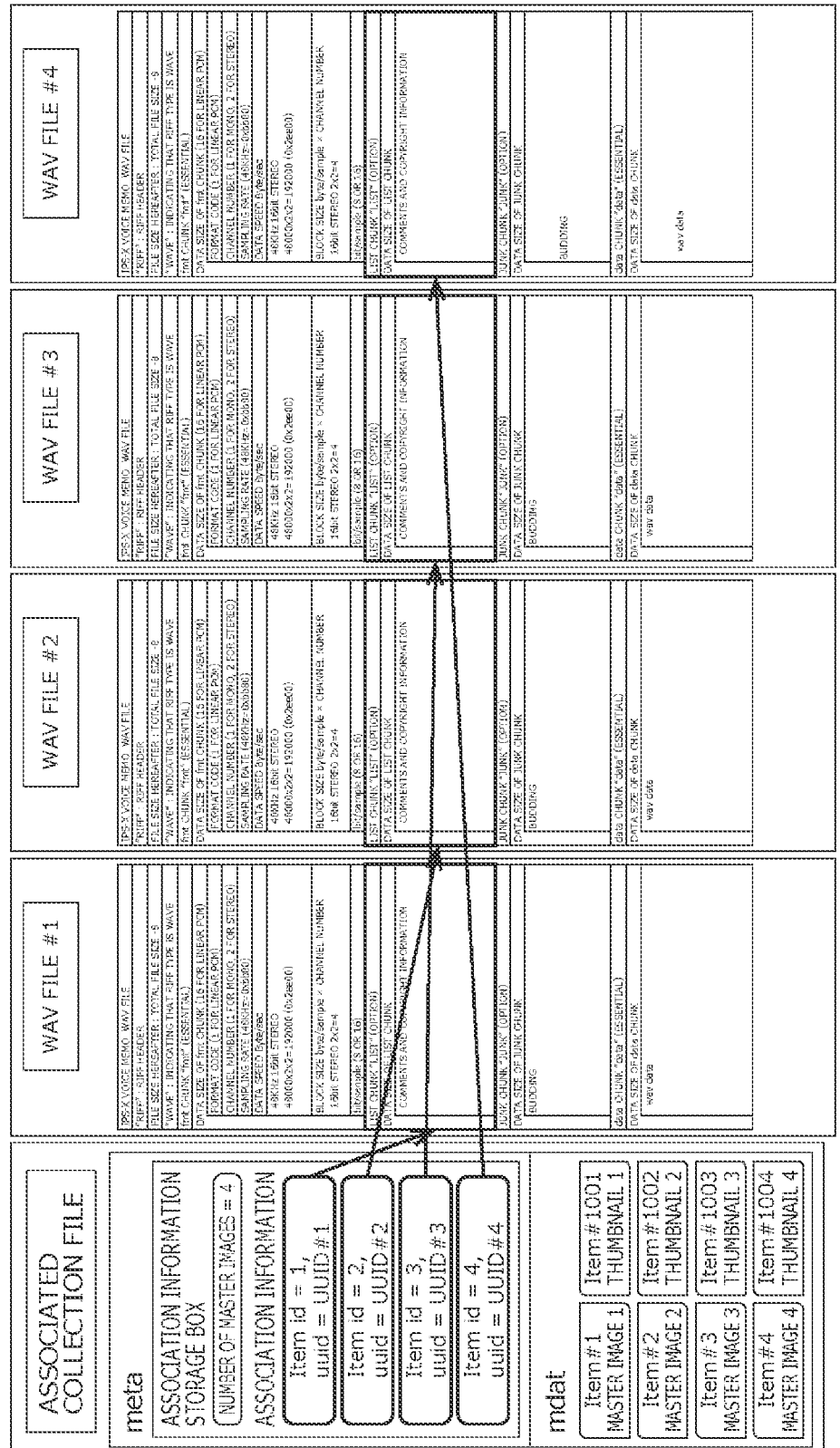
FIG. 29 is a diagram showing an example of storage of uuids in WAV files in a case where WAV files of master images are adopted as external data, and an associating collection file is generated.

FIG. 29 is a diagram showing an example of storage of uuids in WAV files in a case where WAV files of master images are adopted as (the files storing) external data, and an associating collection file is generated.

Note that, in FIG. 29, the first associating collection file is adopted as the associating collection file.

A WAV file has a region called a List chunk as part of the region in which metadata is written.

The file control unit 43 can store the uuids assigned to the WAV files (audio) into the List chunks of the WAV files, for example.

In FIG. 29, the master images Item #1, Item #2, Item #3, and Item #4 as four items are stored in the associating collection file, and WAV files #1, #2, #3, and #4 of the master images Item #1, Item #2, Item #3, and Item #4 are generated. Further, a UUID #i is assigned to the WAV file #i (sound), and, as association information for associating the master image Item #i with the UUID #i of the WAV file #i of the master image Item #i, association information for associating the item ID #i for specifying the master image Item #i with the UUID #i of the WAV file #i associated with the master image Item #i is stored in the association information storage box.

Figure 30:
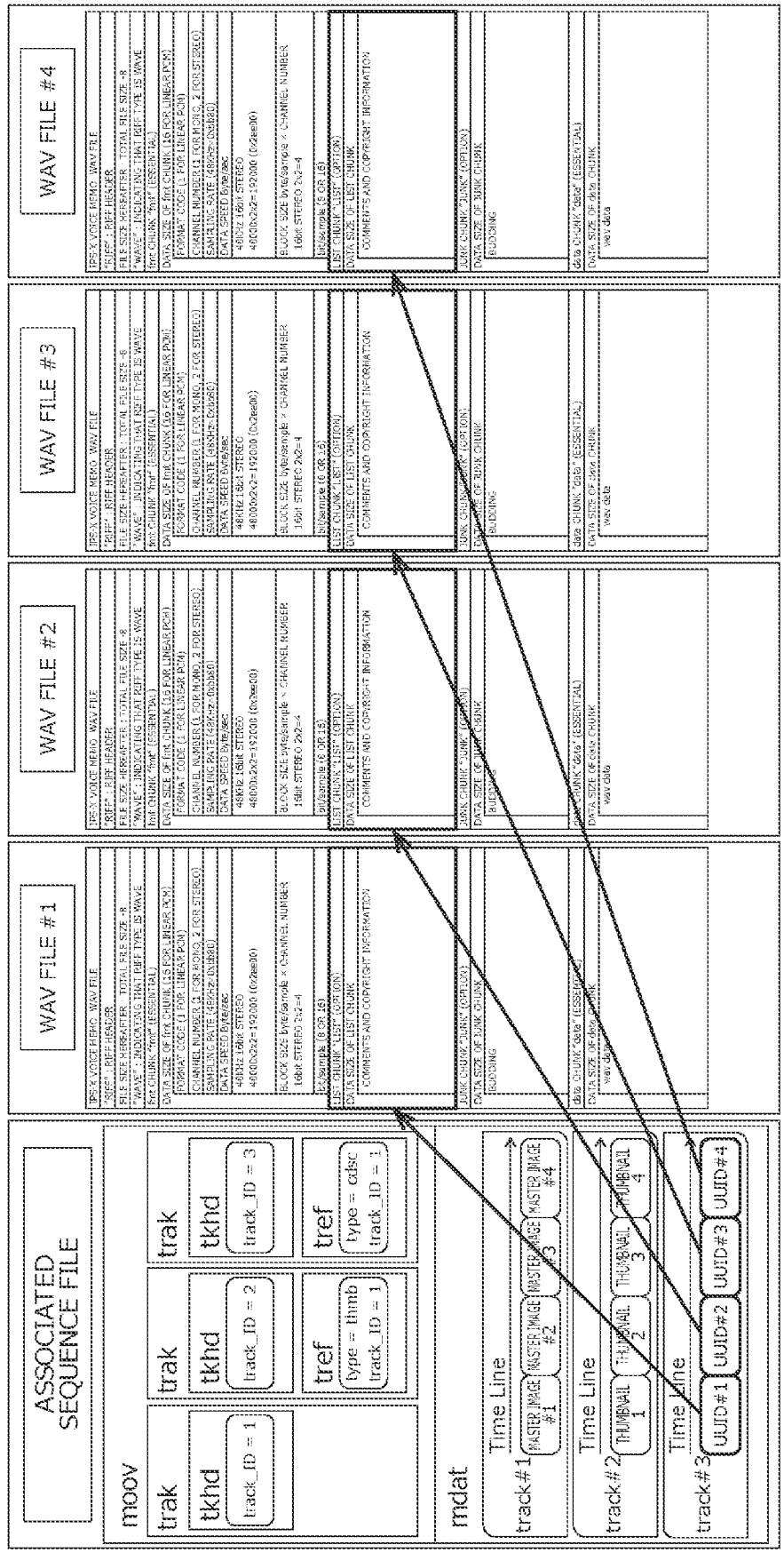
FIG. 30 is a diagram showing an example of storage of uuids in WAV files in a case where WAV files of master images are adopted as external data, and an associating sequence file is generated.

FIG. 30 is a diagram showing an example of storage of uuids in WAV files in a case where WAV files of master images are adopted as external data, and an associating sequence file is generated.

In a case where an associating sequence file is generated, the file control unit 43 can also store the uuids assigned to WAV files in the List chunks of the WAV files, as in a case where an associating collection file is generated as described above with reference to FIG. 29.

In FIG. 30, a track #1 formed with master images #1, #2, #3, and #4 as four frames is stored in the associating sequence file, and WAV files #1, #2, #3, and #4 of the master images #1, #2, #3, and #4 are generated. Further, a UUID #i is assigned to the WAV file #i, and a track #3 in which the UUID #i of the WAV file #i is placed so as to have the same time information as the master image #i corresponding to the WAV file #i is stored in the associating sequence file.

As described above, the UUID #i of the WAV file #i is placed so as to have the same time information as the master image #i corresponding to the WAV file #i, and the track #3 is formed. Thus, the ith master image #i in the track #1 and the ith UUID #i in the track #3, which is the UUID #i of the WAV file #i of the master image #i, are associated with each other and stored in the associating sequence file.

Note that, the present technology can be applied not only to an HEIF file, but also to an ISO base media file, an MP4 file, a Miaf file, or the like that has a box structure different from an HEIF file, for example.

Other than that, the present technology can also be applied to a file or the like that does not have a box structure, and stores images (master images) and other images with a lower resolution than the images, for example.

Further, the present technology can be applied not only in a case where external data is associated with master images in an HEIF file, but also in a case where external data is associated with screen nail images or thumbnail images in an HEIF file.

Other than that, the present technology can also be applied in a case where external data is associated with internal data that is not images like master images or the like in an HEIF file, for example.

<First Embodiment of an Image Processing System to which the Present Technology is Applied>

Figure 31:
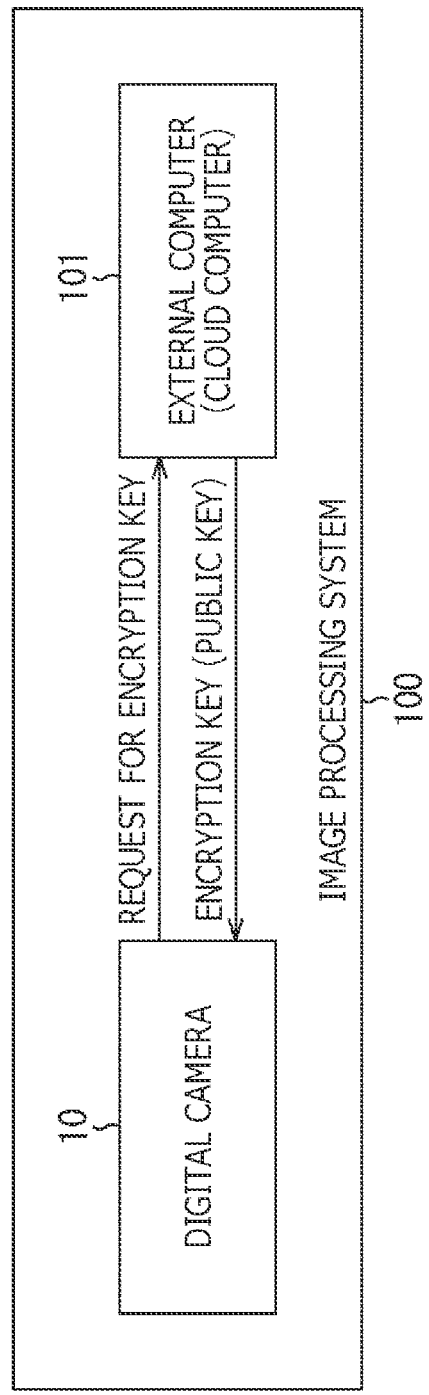
FIG. 31 is a block diagram showing an example configuration of a first embodiment of an image processing system to which the present technology is applied.

FIG. 31 is a block diagram showing an example configuration of a first embodiment of an image processing system to which the present technology is applied.

In FIG. 31, an image processing system 100 includes the digital camera 10 shown in FIG. 1, and an external computer 101 such as a cloud computer, for example. The digital camera 10 and the external computer 101 can communicate with each other via a network such as the Internet.

Here, there are cases where the user wishes to restrict viewing of an image captured by the digital camera 10, to protect a so-called copyright or protect the portrait right or the like of the person appearing in the image.

Therefore, in the image processing system 100, an encrypted HEIF file using an associating HEIF file is generated by the digital camera 10, so that viewing of images captured by the digital camera 10 can be restricted.

Note that, in the description below, viewing of master images stored in an HEIF file is to be restricted, for ease of explanation. However, by the present technology, viewing of any desired media data other than master images stored in an HEIF file can be restricted. The present technology can also be applied to (a file compliant with) an ISO base media file other than an HEIF file, and further, can be applied to any appropriate file other than an ISO base media file.

In the digital camera 10 (FIG. 1), the file control unit 43 can generate, as an encrypted HEIF file, an HEIF file in which an encrypted image obtained by encrypting a master image stored in an HEIF file with a first encryption key, and an encrypted encryption key obtained by encrypting the first encryption key with a second encryption key are associated with each other and stored.

In associating an encrypted image stored in the encrypted HEIF file with the encrypted encryption key obtained by encrypting the first encryption key used in the encryption for obtaining the encrypted image, the file control unit 43 can use the association between the master images stored in an associating HEIF file and the specific information about external data. That is, the file control unit 43 can associate an encrypted image stored in the encrypted HEIF file with an encrypted encryption key, in a manner similar to that in the association between master images stored in an associating HEIF file and the specific information about external data.

The file control unit 43 can also decrypt the encrypted encryption key of an encrypted HEIF file into the first encryption key, and, with the first encryption key obtained by the decryption, decrypt the encrypted image into the original master image.

The digital camera 10 can request the external computer 101 to supply the first encryption key and the second encryption key. When there is a request for the first encryption key and the second encryption key from the digital camera 10, the external computer 101 generates the first encryption key and the second encryption key, and provides (transmits) the first encryption key and the second encryption key to the digital camera 10. Note that the first encryption key and the second encryption key can be generated by the digital camera 10. Alternatively, one of the first encryption key and the second encryption key can be generated by the digital camera 10, and the other can be generated by the external computer 101.

As the first encryption key and the second encryption key, encryption keys of any appropriate encryption scheme can be adopted. Also, as the first encryption key and the second encryption key, encryption keys of the same encryption scheme can be adopted, or encryption keys of different encryption schemes can be adopted.

In this embodiment, a common key of a common key encryption scheme is adopted as the first encryption key, and a public key of a public key encryption scheme is adopted as the second encryption key, for example.

Since the load of the process of generating a common key is smaller than the load of the process of generating a public key of a public key encryption scheme and a private key, a common key can be easily generated in the digital camera 10. Further, with a common key, an image having a relatively large data amount can be encrypted or decrypted in a shorter time than that with a public key and a private key.

Furthermore, by adopting a public key of a public key encryption scheme as the second encryption key, it is possible to increase the confidentiality of a common key encrypted with the public key.

In this embodiment, a common key is generated by the digital camera 10, and a public key and a private key are generated and managed by the external computer 101.

As described above, in the digital camera 10, an HEIF file in which an encrypted image obtained by encrypting a master image stored in an HEIF file with a common key as the first encryption key, and an encrypted encryption key obtained by encrypting the common key with a public key as the second encryption key are associated with each other and stored is generated as an encrypted HEIF file. Thus, it is possible to restrict viewing of the master image so that only the user who can obtain (acquire) the private key corresponding to the public key used in the encryption for obtaining the encrypted encryption key (or the common key before being encrypted into the encrypted encryption key) can view the master image.

In the description below, an encrypted HEIF file using (the association in) the third associating collection file shown in FIG. 12 among associating HEIF files is explained, for example. However, as an encrypted HEIF file, an HEIF file using an associating HEIF file (the first associating collection file, the second associating collection file, or an associating sequence file) other than the third associating collection file can be generated.

Note that, in the description of encrypted HEIF files below, the portions common with the HEIF files (including the associating HEIF files) already described will not be explained.

<Encrypted HEIF File>

Figure 32:
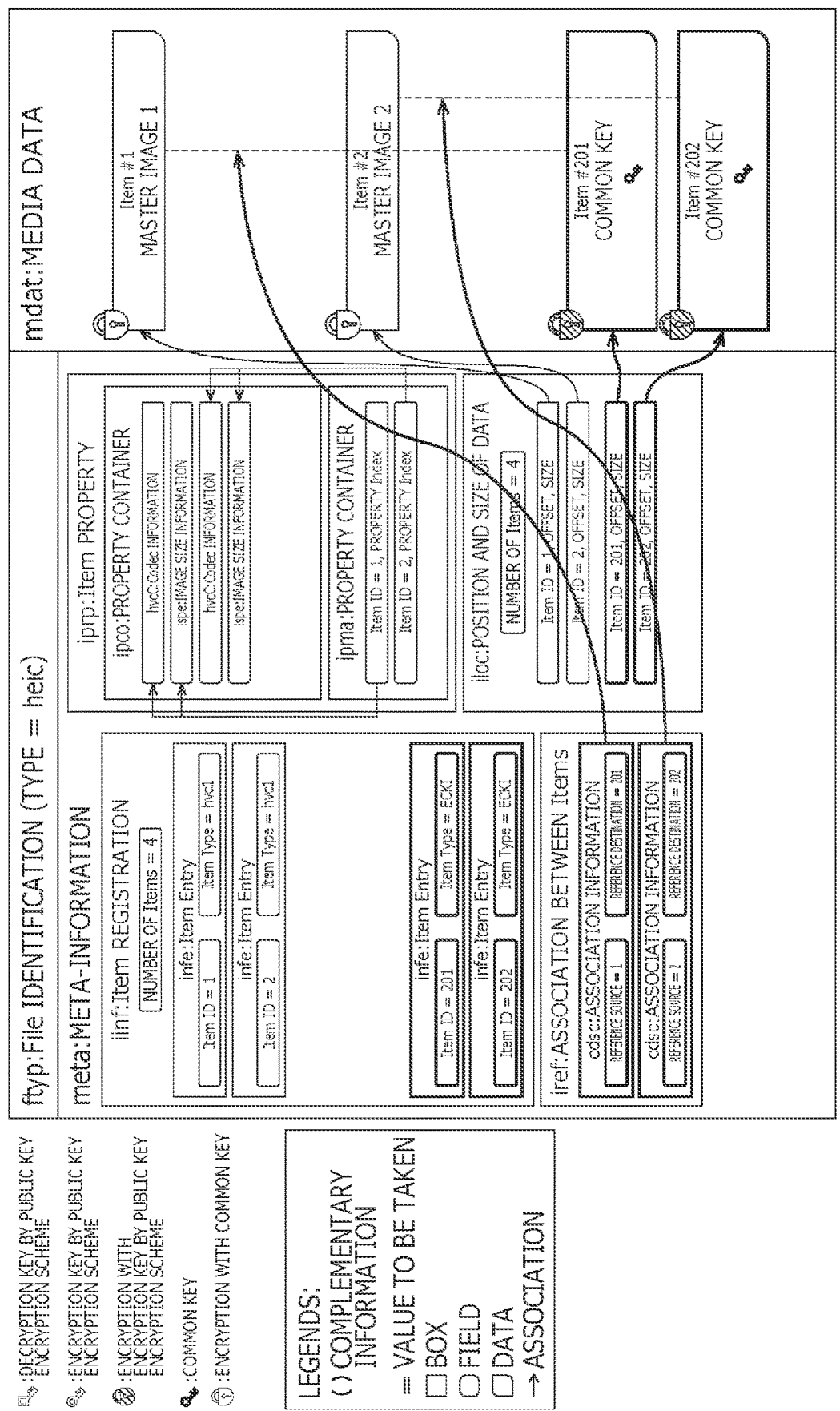
FIG. 32 is a diagram showing an example of a first encrypted HEIF file.

FIG. 32 is a diagram showing an example of a first encrypted HEIF file.

In FIG. 32, items Item #1, Item #2, Item #201, and Item #202 are stored in the mdat box. The item Item #1 is an encrypted image obtained by encrypting a master image 1 with a common key (by a common key encryption scheme), and the item Item #2 is an encrypted image obtained by encrypting a master image 2 with a common key. Different common keys can be used to encrypt different master images. For example, the common key that is used in the encryption for obtaining the encrypted image as the item Item #1 (this encrypted image will be hereinafter also written as the encrypted image Item #1), and the common key that is used in the encryption for obtaining the encrypted image Item #2 are different common keys. Note that the same common key can be used to encrypt different master images, where necessary.

The item Item #201 is an encrypted encryption key obtained by encrypting the common key used in the decryption of the master image 1 with a public key (by a public key encryption scheme), and the item Item #202 is an encrypted encryption key obtained by encrypting the common key used in the encryption of the master image 2 with a public key. Different public keys (corresponding to private keys) can be used to encrypt different public keys. For example, the public key that is used in the encryption for obtaining the encrypted encryption key as the item Item #201 (this encrypted encryption key will be hereinafter also written as the encrypted encryption key Item #201), and the public key that is used in the encryption for obtaining the encrypted encryption key Item #202 are different public keys. Note that the same public key can be used to encrypt different common keys, where necessary.

In FIG. 32, a white lock indicates that the item is encrypted with a common key, and a shaded lock indicates that the item is encrypted with a public key. The same applies in the drawings described later.

In the first encrypted HEIF file, association information for associating an encrypted image Item #i stored in the mdat box with an encrypted encryption key Item #200+i obtained by encrypting the common key used in the encryption for obtaining the encrypted image Item #i with a public key is stored in the meta box so that the encrypted image Item #i and the encrypted encryption key Item #200+i are associated with each other, as in the third associating collection file (FIG. 12) in which association information for associating a master image stored in the mdat box with specific information is stored in the meta box so that the master image and the specific information are associated with each other, for example.

The association information for associating the encrypted image Item #i with the encrypted encryption key Item #200+i is information that associates the item ID #i of the encrypted image Item #i with the item ID of the encrypted encryption key Item #200+i, and is stored in a cdsc box stored in the iref box in the meta box, as in the third associating collection file.

In FIG. 32, a cdsc box storing the association information in which the item ID #1 of the encrypted image Item #1, and the item ID #201 of the encrypted encryption key Item #201 obtained by encrypting the common key used in the encryption for obtaining the encrypted image Item #1 with a public key are associated with each other as a reference source and a reference destination is stored in the iref box, and a cdsc box storing the association information in which the item ID #2 of the encrypted image Item #2, and the item ID #202 of the encrypted encryption key Item #202 obtained by encrypting the common key used in the encryption for obtaining the encrypted image Item #2 with a public key are associated with each other as a reference source and a reference destination is stored in the iref box.

As for the encrypted image Item #i stored in the first encrypted HEIF file, in a case where the private key corresponding to the encrypted image Item #i, which is the private key corresponding to the public key used in the encryption of the common key used in the encryption for obtaining the encrypted image Item #i, can be obtained, the file control unit 43 can decrypt the encrypted encryption key Item #200+i associated with the encrypted image Item #i into the common key with the private key, and decrypt the encrypted image Item #i into the original master image i with the common key obtained by the decryption. Thus, viewing of the master image i can be restricted to the user who can obtain the private key corresponding to the encrypted image Item #i.

In the infe box of the encrypted encryption key Item #200+i in the first encrypted HEIF file, the item type (Item Type) of the encrypted encryption key Item #200+i is set as ECKI (Encryption key for Item) indicating an encryption key (a common key in this case), for example. The attribute value of the item time indicating an encryption key is not necessarily ECKI. In a case where the encrypted image Item #i is to be decrypted, the file control unit 43 specifies the item ID of the reference destination in the cdsc box having the reference source indicating the item ID #i of the encrypted image Item #i, as the item ID #200+i of the encrypted encryption key Item #200+i corresponding to the encrypted image Item #i, or of the encrypted encryption key Item #200+i obtained by encrypting the common key used in the encryption of the encrypted image Item #i. In accordance with the item ID #200+i, the file control unit 43 acquires (reads) the encrypted encryption key Item #200+i having the item ID #200+i from the mdat box, and performs decryption. Whether or not the item specified by the item ID of the reference destination in a cdsc box is an encrypted encryption key can be recognized (determined) from the item type set in the infe box of the item specified by the item ID.

Figure 33:
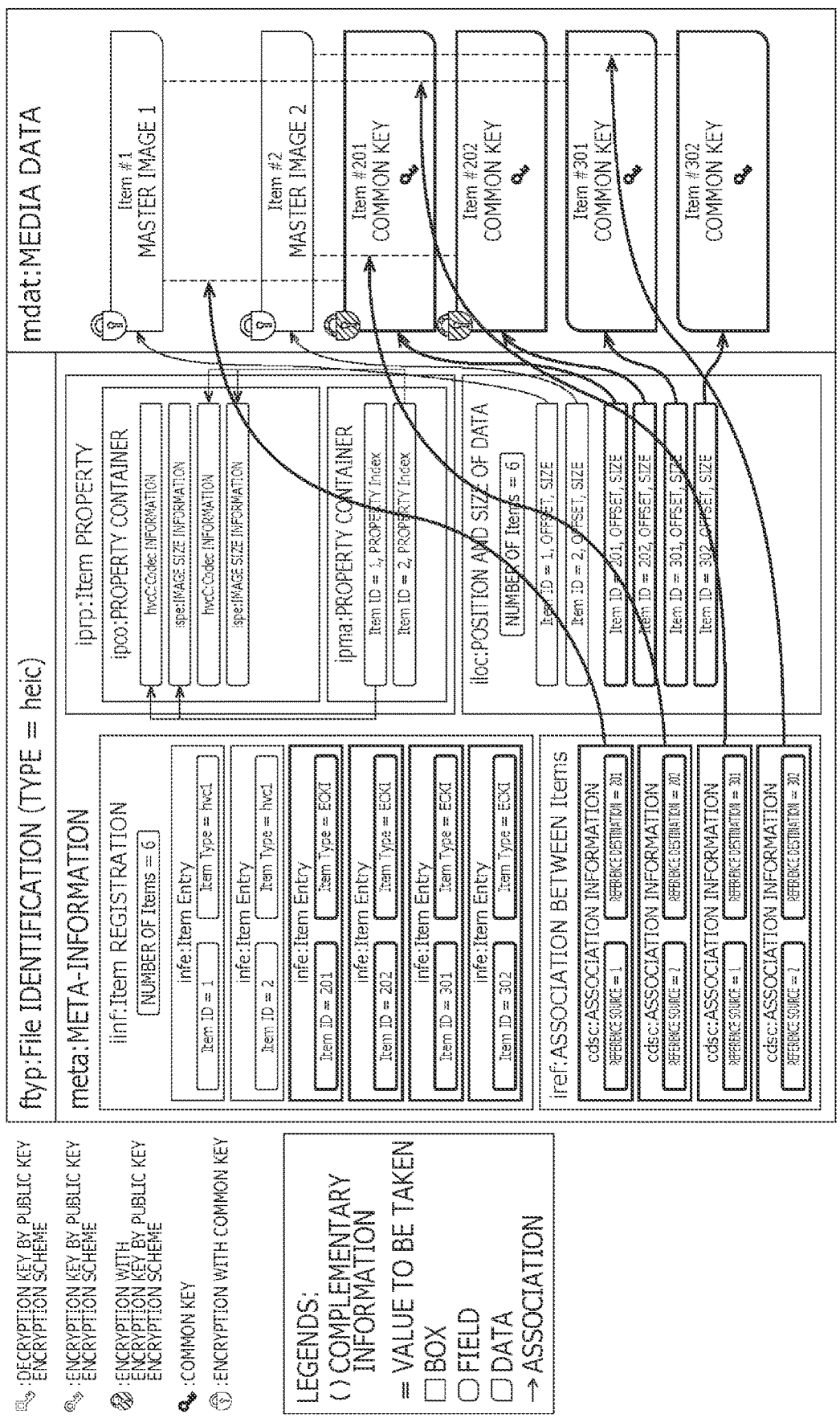
FIG. 33 is a diagram showing an example of a second encrypted HEIF file.

FIG. 33 is a diagram showing an example of a second encrypted HEIF file.

In FIG. 33, the encrypted images Item #1 and Item #2, and the encrypted encryption keys Item #201 and Item #202 are stored in the mdat box, as in FIG. 32. Further, in FIG. 33, plain text common keys Item #301 and Item #302 are stored in the mdat box. The encrypted encryption key Item #200+i is obtained by encrypting the plain text common key Item #300+i as an item with a private key. Here, plain text means data in an unencrypted state.

In the second encrypted HEIF file, the plain text common key Item #300+i is associated with (the master image i corresponding to) the encrypted image Item #i, like the encrypted encryption key Item #200+i corresponding to the common key Item #300+i, or the encrypted encryption key Item #200+i obtained by encrypting the common key Item #300+i.

In FIG. 33, in addition to the cdsc boxes shown in FIG. 32, a cdsc box storing association information in which the item ID #1 of the encrypted image Item #1, and the item ID #301 of the plain text common key Item #301 (the common key Item #301 used in the encryption for obtaining the encrypted image Item #1) corresponding to the encrypted image Item #1 are associated with each other as a reference source and a reference destination is stored in the iref box. Further, a cdsc box storing association information in which the item ID #2 of the encrypted image Item #2, and the item ID #302 of the plain text common key Item #302 corresponding to the encrypted image Item #2 are associated with each other as a reference source and a reference destination is stored in the iref box.

In the second encrypted HEIF file, the plain text common key Item #300+i stored in the mdat box can be deleted in accordance with the user's operation. For example, in a case where viewing of the master image i obtained by decrypting the encrypted image Item #i is restricted to a specific user (the user who can obtain the private key corresponding to the encrypted image Item #i), the file control unit 43 deletes the plain text common key Item #300+i stored in the mdat box in accordance with the user's operation. With this arrangement, the encrypted image Item #i cannot be decrypted, unless the private key corresponding to the encrypted image Item #i is successfully obtained.

That is, in a case where the plain text common key Item #300+i is not stored in the mdat box, the encrypted image Item #i cannot be decrypted, unless the private key corresponding to the encrypted image Item #i is successfully obtained. In a case where the private key corresponding to the encrypted image Item #i can be obtained, the file control unit 43 can decrypt the encrypted encryption key Item #200+i associated with the encrypted image Item #i stored in the second encrypted HEIF file into the common key with the corresponding private key, and decrypt the encrypted image Item #i into the original master image i with the common key obtained by the decryption, as with the first encrypted HEIF file.

On the other hand, in a case where the plain text common key Item #300+i is stored in the mdat box, the file control unit 43 can decrypt the encrypted image Item #i into the original master image i with the plain text common key Item #300+i associated with the encrypted image Item #i stored in the second encrypted HEIF file.

Accordingly, in a case where the plain text common key Item #300+i is stored in the mdat box in the second encrypted HEIF file, the encrypted image Item #i can be decrypted into the master image i, and any user can view the master image i, regardless of acquisition of the private key corresponding to the encrypted image Item #i.

In view of the above, with the second encrypted HEIF file, the user can allow any user to view a master image that does not need to be restricted in viewing, by leaving the plain text common key associated with (the encrypted image obtained by encrypting) the master image in the mdat box. Further, as for a master image that is to be restricted in viewing, the user can restrict viewing by any user, by deleting, from the mdat box, the plain text common key associated with the master image.

Note that, in the infe box of the plain text common key Item #300+i in the second encrypted HEIF file, the item type (Item Type) of the plain text common key Item #300+i is set as ECKI indicating an encryption key, as in the infe box of the encrypted encryption key Item #200+i.

Figure 34:
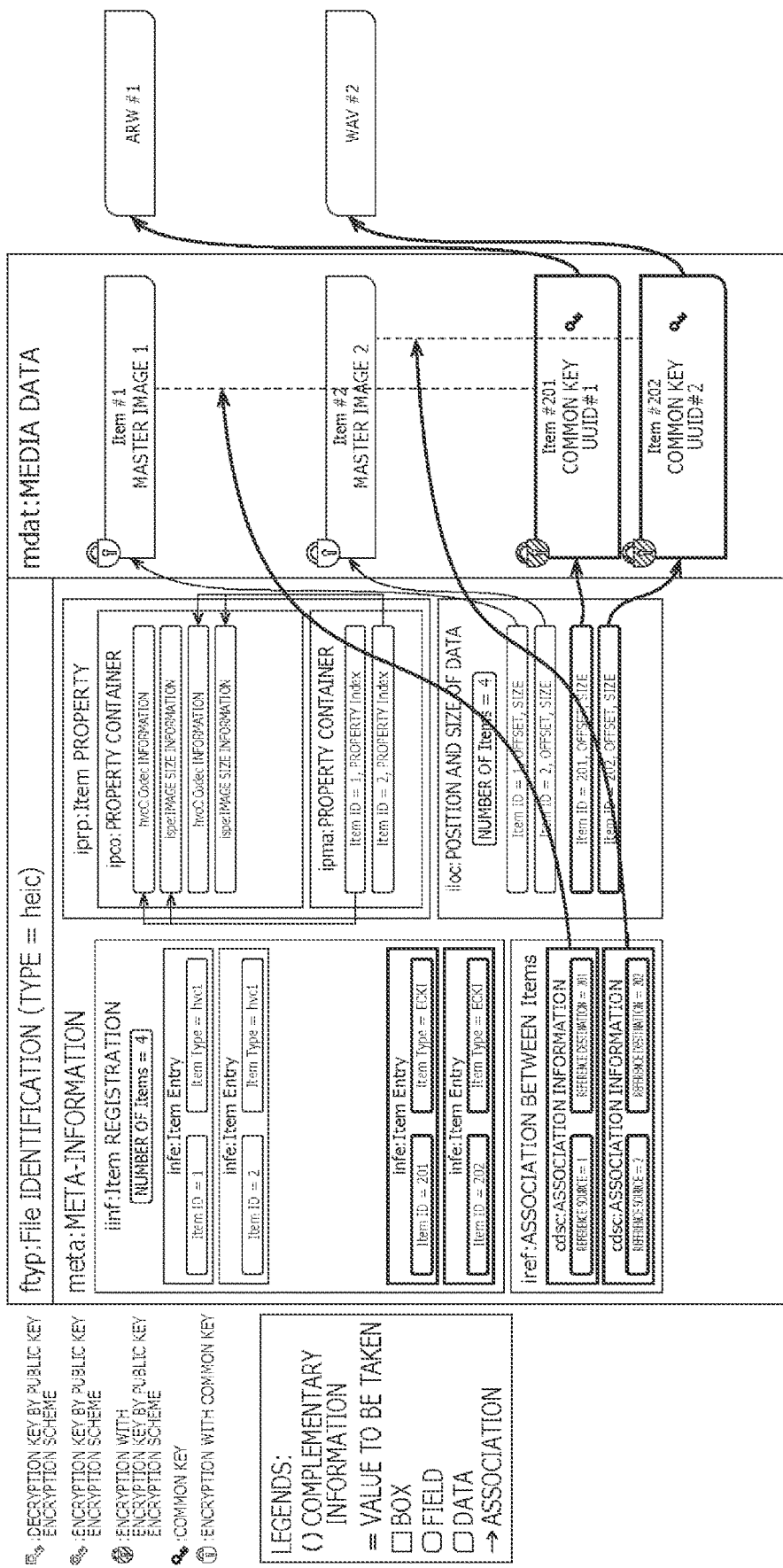
FIG. 34 is a diagram showing an example of a third encrypted HEIF file.

FIG. 34 is a diagram showing an example of a third encrypted HEIF file.

In FIG. 34, the encrypted images Item #1 and Item #2, and the encrypted encryption keys Item #201 and Item #202 are stored in the mdat box, as in FIG. 32.

In the third encrypted HEIF file, however, the encrypted encryption key Item #200+i is a specific-information-containing encryption key obtained by encrypting the uuid as the specific information for specifying the external data associated with the master image i and the common key used in the encryption of the master image i with a private key, and will be hereinafter also written as the specific-information-containing encryption key Item #200+i.

In the third encrypted HEIF file in FIG. 34, the encrypted image Item #1 obtained by encrypting the master image 1 with a common key, the UUID #1 assigned to (the RAW data stored in) the RAW file ARW #1 associated with the master image 1, and the specific-information-containing encryption key Item #201 obtained by encrypting the common key used in the encryption of the master image 1 with a private key are associated with one another by the association information stored in a cdsc box in the iref box, and are stored in the mdat box. Further, the encrypted image Item #2 obtained by encrypting the master image 2 with a common key, the UUID #2 assigned to the WAV file WAV #2 associated with the master image 2, and the specific-information-containing encryption key Item #202 obtained by encrypting the common key used in the encryption of the master image 2 with a private key are associated with one another by the association information stored in a cdsc box in the iref box, and are stored in the mdat box.

With the third encrypted HEIF file, in a case where the private key corresponding to the encrypted image Item #i stored in the third encrypted HEIF file can be obtained, the file control unit 43 can decrypt the specific-information-containing encryption key Item #200+i associated with the encrypted image Item #i into the common key and the UUID #i with the private key, and decrypt the encrypted image Item #i into the original master image i with the common key obtained by the decryption, as with the first encrypted HEIF file. Thus, viewing of the master image i can be restricted to the user who can obtain the private key corresponding to the encrypted image Item #i.

Further, with the third encrypted HEIF file, in a case where the private key corresponding to the encrypted image Item #i can be obtained, it is possible to access the external data specified by the UUID #i obtained by decrypting the specific-information-containing encryption key Item #200+i with the private key, or the external data associated with the master image i. Thus, access to the external data associated with the master image i can be restricted to the user who can obtain the private key corresponding to the encrypted image Item #i. Further, falsification of the uuid as the specific information about the external data associated with the master image i can be prevented.

Figure 35:
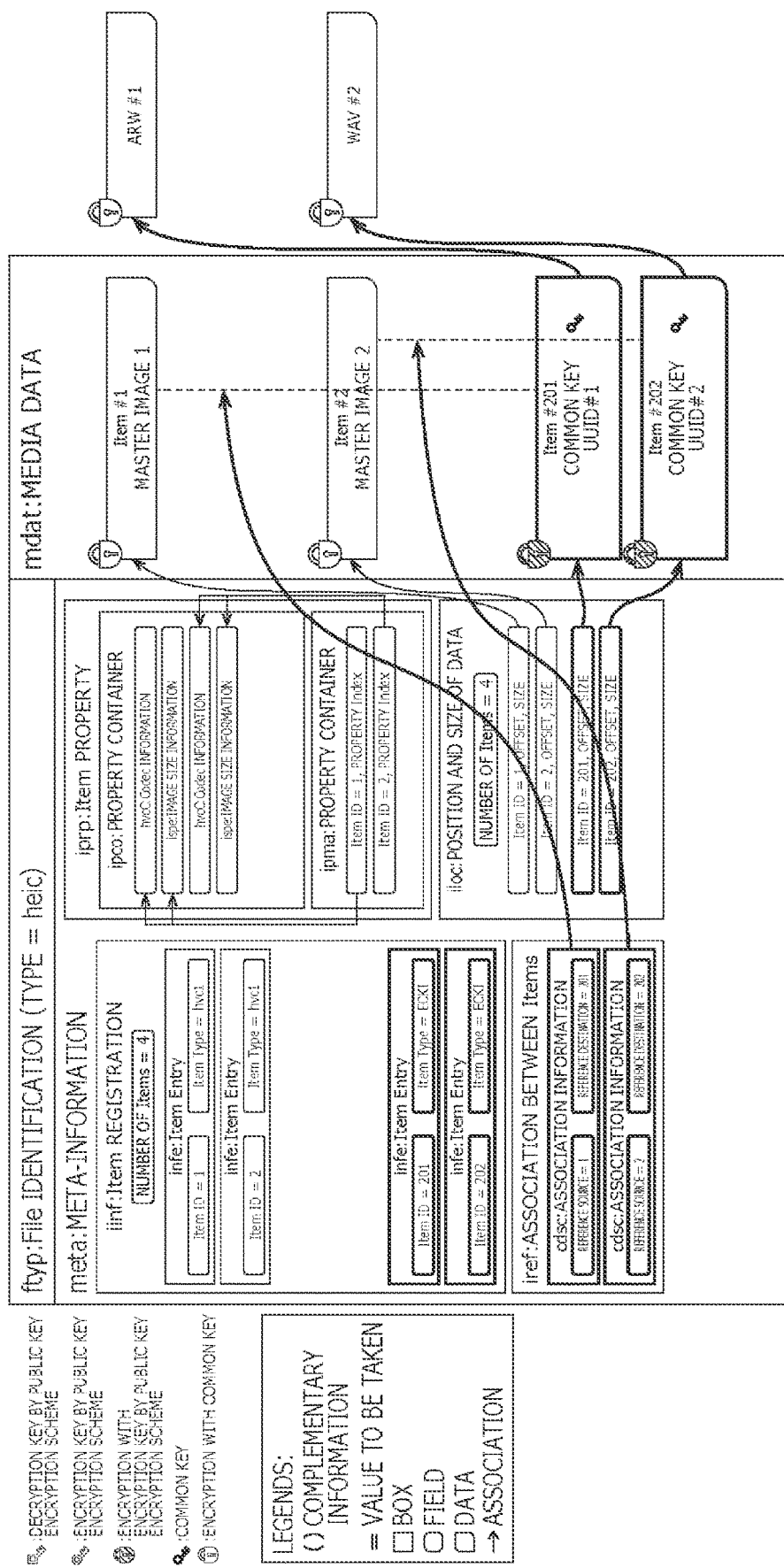
FIG. 35 is a diagram showing an example of a fourth encrypted HEIF file.

FIG. 35 is a diagram showing an example of a fourth encrypted HEIF file.

In FIG. 35, the fourth encrypted HEIF file is designed in a manner similar to the third encrypted HEIF file (FIG. 34).

However, with the fourth encrypted HEIF file, the external data associated with the master image i is encrypted with the common key used in the encryption of the master image i. In FIG. 35, (the RAW data stored in) the RAW file ARW #1 is encrypted with the common key used in the encryption of the master image 1 associated with the RAW file ARW #1. Further, (the sound stored in) the WAV file WAV #2 is encrypted with the common key used in the encryption of the master image 2 associated with the WAV file WAV #2.

With the fourth encrypted HEIF file, in a case where the private key corresponding to the encrypted image Item #i stored in the fourth encrypted HEIF file can be obtained, the file control unit 43 can decrypt the specific-information-containing encryption key Item #200+i associated with the encrypted image Item #i into the common key and the UUID #i with the private key, and decrypt the encrypted image Item #i into the original master image i with the common key obtained by the decryption, as with the third encrypted HEIF file. Thus, viewing of the master image i can be restricted to the user who can obtain the private key corresponding to the encrypted image Item #i.

Further, with the fourth encrypted HEIF file, in a case where the private key corresponding to the encrypted image Item #i can be obtained, it is possible to access the encrypted external data specified by the UUID #i obtained by decrypting the specific-information-containing encryption key Item #200+i with the private key, or the encrypted external data associated with the master image i, and further to decrypt the encrypted external data into the original external data with the common key obtained by decrypting the specific-information-containing encryption key Item #200+i. Thus, viewing and the like of the external data associated with the master image i can be restricted to the user who can obtain the private key corresponding to the encrypted image Item #i. Further, falsification of the uuid as the specific information about the external data associated with the master image i can be prevented.

Figure 36:
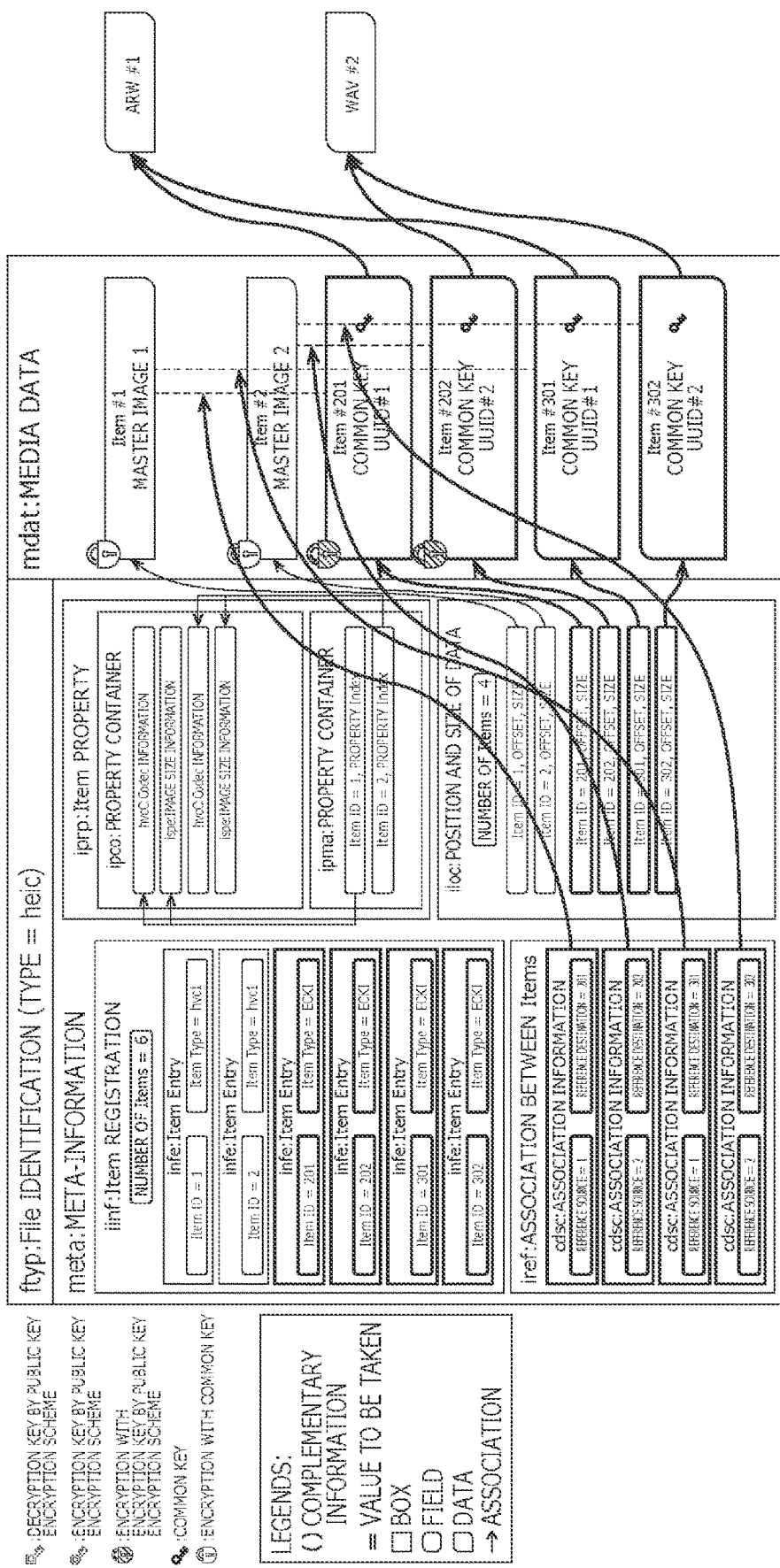
FIG. 36 is a diagram showing an example of a fifth encrypted HEIF file.

FIG. 36 is a diagram showing an example of a fifth encrypted HEIF file.

In FIG. 36, the encrypted images Item #1 and Item #2, and the specific-information-containing encryption keys Item #201 and Item #202 are stored in the mdat box, as in FIG. 34. Further, in FIG. 36, the mdat box stores a set (hereinafter, also referred to as a common key set) Item #301 of a plain text common key and UUID #1 as specific information, and a common key set Item #302 of a plain text common key and UUID #2 as specific information.

The common key forming the common key set Item #300+i is a common key used in the encryption of the master image i. Meanwhile, the UUID #i forming the common key set Item #300+i is the uuid serving as the specific information for specifying the external data associated with (the encrypted image Item #i obtained by encrypting) the master image i. The specific-information-containing encryption key Item #200+i is obtained by encrypting the common key set Item #300+i with a private key.

In the fifth encrypted HEIF file, the common key set Item #300+i of a plain text common key and UUID #i is associated with the encrypted image Item #i and stored, like the specific-information-containing encryption key Item #200+i obtained by encrypting the common key set Item #300+i.

In FIG. 36, in addition to the cdsc boxes shown in FIG. 34, a cdsc box storing association information in which the item ID #1 of the encrypted image Item #1, and the item ID #301 of the common key set Item #301 are associated with each other as a reference source and a reference destination is stored in the iref box. Further, a cdsc box storing association information in which the item ID #2 of the encrypted image Item #2, and the item ID #302 of the common key set Item #302 are associated with each other as a reference source and a reference destination is stored in the iref box.

In the fifth encrypted HEIF file, the (plain text) common key set Item #300+i stored in the mdat box can be deleted in accordance with the user's operation. For example, in a case where viewing of the master image i obtained by decrypting the encrypted image Item #i is restricted to a specific user, the file control unit 43 deletes the common key set Item #300+i stored in the mdat box in accordance with the user's operation. With this arrangement, the encrypted image Item #i cannot be decrypted, unless the private key corresponding to the encrypted image Item #i is successfully obtained. Further, the external data associated with (the master image i corresponding to) the encrypted image Item #i cannot be accessed, unless the private key corresponding to the encrypted image Item #i is successfully obtained.

That is, in a case where the common key set Item #300+i is not stored in the mdat box, the encrypted image Item #i cannot be decrypted, and the external data associated with the encrypted image Item #i cannot be accessed, unless the private key corresponding to the encrypted image Item #i is successfully obtained. In a case where the private key corresponding to the encrypted image Item #i can be obtained, the file control unit 43 can decrypt the specific-information-containing encryption key Item #200+i associated with the encrypted image Item #i stored in the fifth encrypted HEIF file into the common key and the UUID #i with the corresponding private key, and decrypt the encrypted image Item #i into the original master image i with the common key obtained by the decryption, as with the third encrypted HEIF file (FIG. 34). Further, the external data (the RAW file ARW #1 or the WAV file WAV #2 in this case) associated with the encrypted image Item #i can be accessed, in accordance with the UUID #i obtained by decrypting the specific-information-containing encryption key Item #200+i.

On the other hand, in a case where the common key set Item #300+i is stored in the mdat box, the file control unit 43 can decrypt the encrypted image Item #i into the original master image i with the common key forming the common key set Item #300+i associated with the encrypted image Item #i stored in the fifth encrypted HEIF file. Further, the file control unit 43 can access the external data associated with the encrypted image Item #i, in accordance with the UUID #i forming the common key set Item #300+i associated with the encrypted image Item #i stored in the fifth encrypted HEIF file.

Accordingly, in a case where the (plain text) common key set Item #300+i is stored in the mdat box in the fifth encrypted HEIF file, any user can view the master image i and access the external data associated with the master image i, regardless of acquisition of the private key corresponding to the encrypted image Item #i.

In view of the above, with the fifth encrypted HEIF file, the user can allow any appropriate user to view a master image that does not need to be restricted in viewing, by leaving the common key set associated with the master image in the mdat box. Further, it is possible to allow any appropriate user to access the external data associated with such a master image.

Meanwhile, as for a master image that is to be restricted in viewing, the user can restrict viewing by any user, by deleting, from the mdat box, the common key set associated with the master image. Further, it is possible to restrict any user from accessing the external data associated with such a master image.

Note that, in the infe box of the common key set Item #300+i (the infe box of the item ID #300+i) in the fifth encrypted HEIF file, the item type (Item Type) of the common key set Item #300+i is set as ECKI indicating an encryption key, as in the infe box of the specific-information-containing encryption key Item #200+i.

Figure 37:
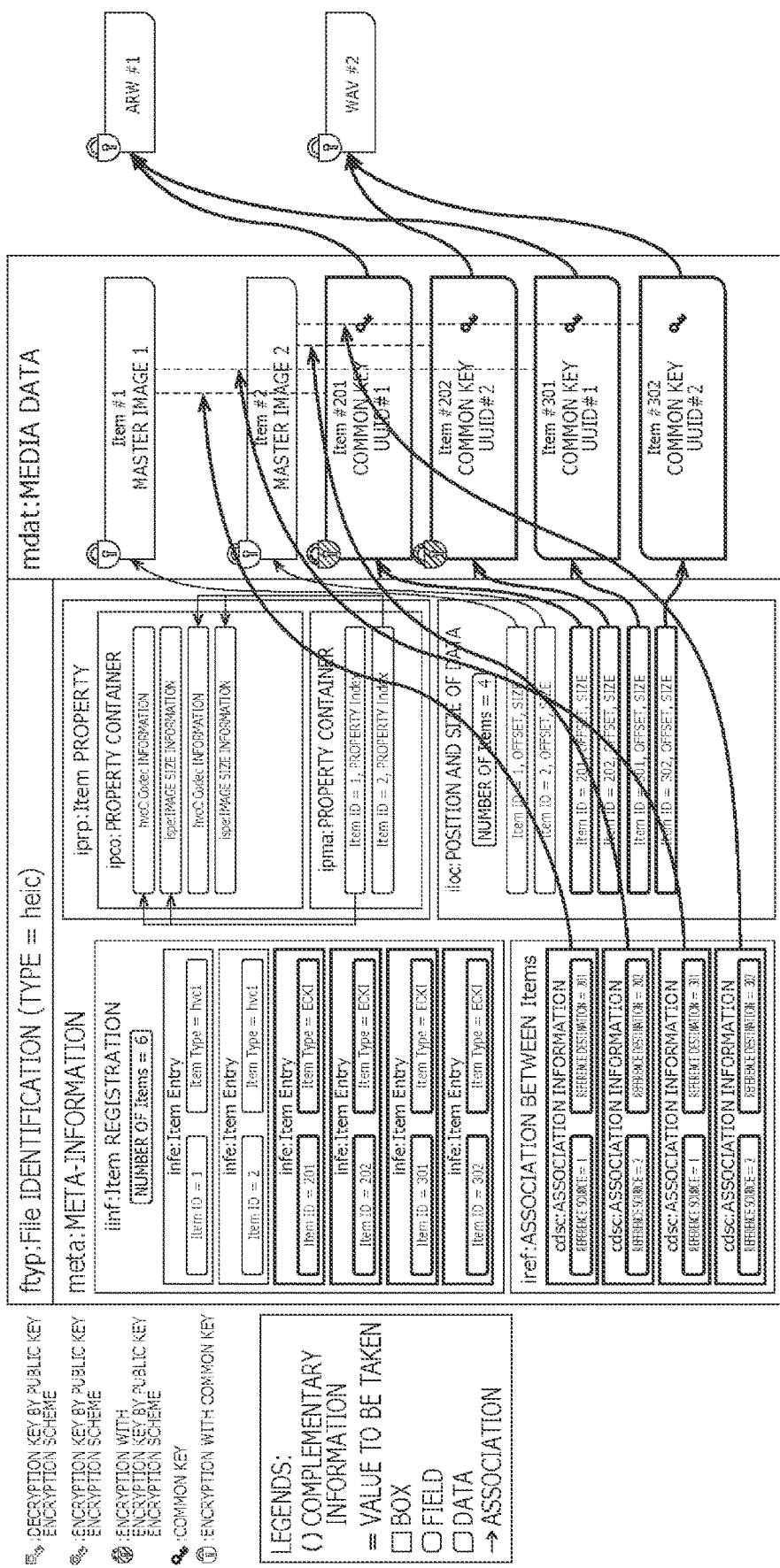
FIG. 37 is a diagram showing an example of a sixth encrypted HEIF file.

FIG. 37 is a diagram showing an example of a sixth encrypted HEIF file.

In FIG. 37, the sixth encrypted HEIF file is designed in a manner similar to the fifth encrypted HEIF file (FIG. 36).

However, with the sixth encrypted HEIF file, the external data associated with the master image i is encrypted with the common key used in the encryption of the master image i, as with the fourth encrypted HEIF file (FIG. 35). In FIG. 37, the RAW file ARW #1 is encrypted with the common key used in the encryption of the master image 1 associated with the RAW file ARW #1, and the WAV file WAV #2 is encrypted with the common key used in the encryption of the master image 2 associated with the WAV file WAV #2.

With the sixth encrypted HEIF file, in a case where the common key set Item #300+i is not deleted but remains stored in the mdat box, the file control unit 43 can decrypt the encrypted image Item #i into the original master image i with the common key forming the common key set Item #300+i associated with the encrypted image Item #i stored in the sixth encrypted HEIF file, as with the fifth encrypted HEIF file. Further, the file control unit 43 can access the encrypted external data associated with the encrypted image Item #i in accordance with the UUID #i forming the common key set Item #300+i associated with the encrypted image Item #i stored in the sixth encrypted HEIF file, and decrypt the encrypted external data into the original external data with the common key forming the common key set Item #300+i.

Accordingly, in a case where the (plain text) common key set Item #300+i is stored in the mdat box in the sixth encrypted HEIF file, any appropriate user can view the master image i, and, for viewing and the like, access the external data associated with the master image i, regardless of acquisition of the private key corresponding to the encrypted image Item #i.

Meanwhile, as for a master image i that is to be restricted in viewing, the user can restrict viewing by any user, by deleting, from the mdat box, the common key set Item #300+i associated with the master image i. Further, regarding the external data associated with such a master image i, access, viewing, and the like by any user can be restricted. Also, falsification of the uuid as the specific information about the external data associated with the master image i can be prevented.

Further, with the sixth encrypted HEIF file, in a case where the private key corresponding to the encrypted image Item #i obtained by encrypting a master image i can be obtained even after the common key set Item #300+i associated with the master image i is deleted from the mdat box, the file control unit 43 can decrypt the specific-information-containing encryption key Item #200+i associated with the encrypted image Item #i into the common key and the UUID #i with the private key, and decrypt the encrypted image Item #i into the original master image i with the common key obtained by the decryption. Thus, viewing of the master image i can be restricted to the user who can obtain the private key corresponding to the encrypted image Item #i.

Further, with the sixth encrypted HEIF file, when the private key corresponding to the encrypted image Item #i can be obtained, it is possible to access the encrypted external data specified by the UUID #i obtained by decrypting the specific-information-containing encryption key Item #200+i with the private key, or the encrypted external data associated with the master image i, and further to decrypt the encrypted external data into the original external data with the common key obtained by decrypting the specific-information-containing encryption key Item #200+i. Thus, viewing and the like of the external data associated with the master image i can be restricted to the user who can obtain the private key corresponding to the encrypted image Item #i. Further, falsification of the uuid as the specific information about the external data associated with the master image i can be prevented.

Figure 38:
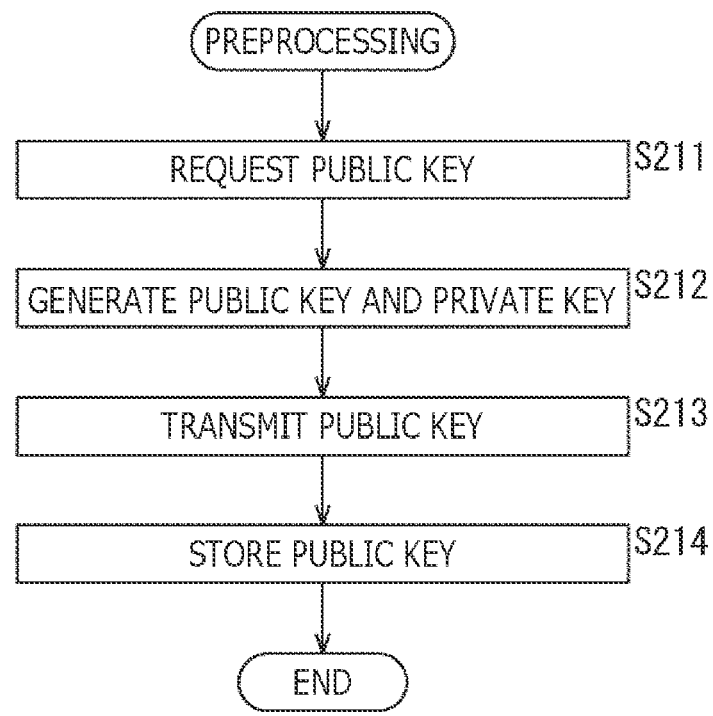
FIG. 38 is a flowchart for explaining an example of the preprocessing to be performed in a case where a first encrypted HEIF file is handled by the image processing system 100.

FIG. 38 is a flowchart for explaining an example of the preprocessing to be performed in a case where a first encrypted HEIF file is handled by the image processing system 100.

The preprocessing is performed immediately after the manufacture of the digital camera 10, before imaging by the digital camera 10, or the like, for example In the preprocessing, in step S211, the digital camera 10 of the image processing system 100 transmits a public key request to the external computer 101, and the process then moves on to step S212.

In step S212, the external computer 101 receives the public key request from the digital camera 10, and, in response to the public key request, generates the private key corresponding to the public key. The process then moves on to step S213.

In step S213, the external computer 101 transmits the public key to the digital camera 10, and the process then moves on to step S214.

In step S214, the digital camera 10 stores the public key supplied from the external computer 101 into the medium 14 or the like, and the preprocessing then comes to an end.

Note that the digital camera 10 can transmit, to the external computer 101, a request for the same number of public keys as the number of master images that can be stored in the medium 14, in accordance with the remaining capacity or the like of the medium 14 that stores the first encrypted HEIF file, for example. In this case, the external computer 101 generates the same number of public keys as the requested public keys, and the generated public keys are stored into the digital camera 10. With a different public key for each master image, the digital camera 10 encrypts the common key used in the encryption of the master image.

Figure 39:
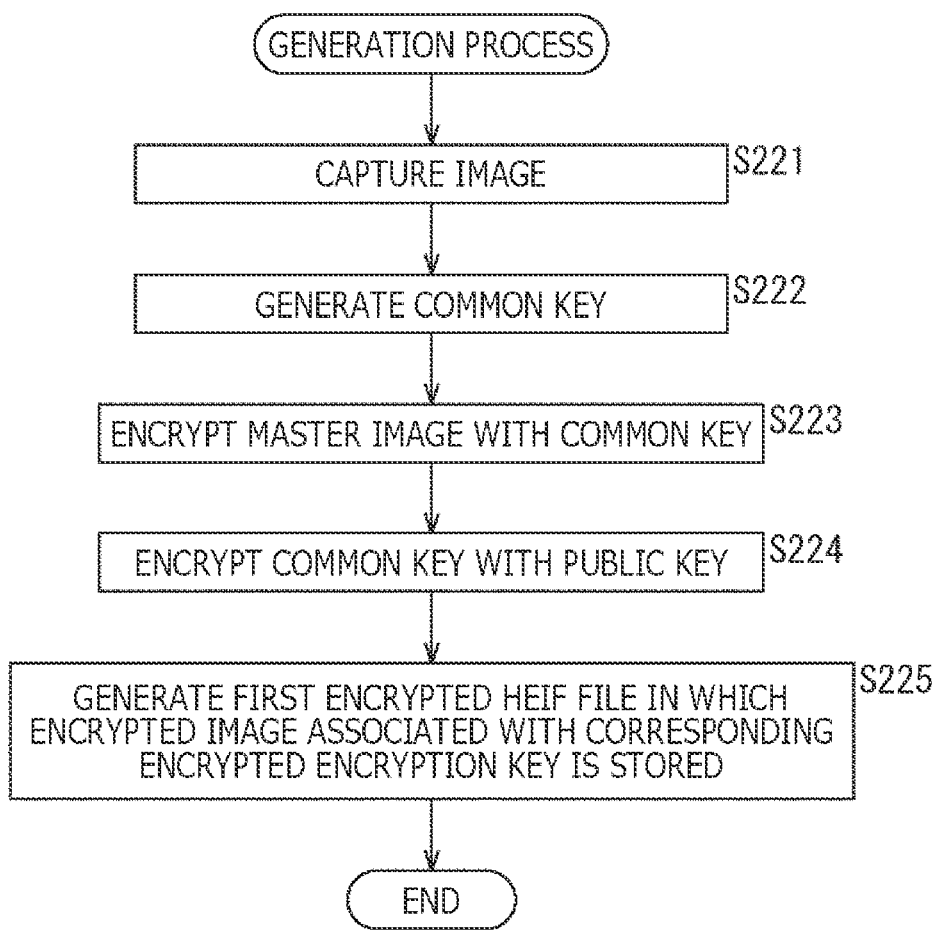
FIG. 39 is a flowchart for explaining an example of a generation process for generating a first encrypted HEIF file in a case where the first encrypted HEIF file is handled by the image processing system 100.

FIG. 39 is a flowchart for explaining an example of a generation process for generating a first encrypted HEIF file in a case where the first encrypted HEIF file is handled by the image processing system 100.

The generation process is started in a case where the user operates the digital camera 10 so as to capture an image (a master image) or the like, for example.

In the generation process, in step S221, the digital camera 10 captures an image, in accordance with the user's operation, for example, and the process then moves on to step S222.

In step S222, the file control unit 43 of the digital camera 10 generates a common key, and the process then moves on to step S223.

In step S223, the file control unit 43 generates an encrypted image by encrypting the master image obtained by capturing an image in step S221, with the common key generated in step S222. The process then moves on to step S224.

In step S224, the file control unit 43 selects a public key of interest that is one of the public keys not yet used for encrypting a common key, from among the public keys stored in the preprocessing. Further, the file control unit 43 generates an encrypted encryption key by encrypting the common key used in the encryption of the master image, with the public key of interest. The process then moves from step S224 on to step S225.

In step S225, the file control unit 43 generates the first encrypted HEIF file in which the encrypted image generated in step S223 and the encrypted encryption key generated in step S224 are associated with each other and stored. The generation process then comes to an end.

Figure 40:
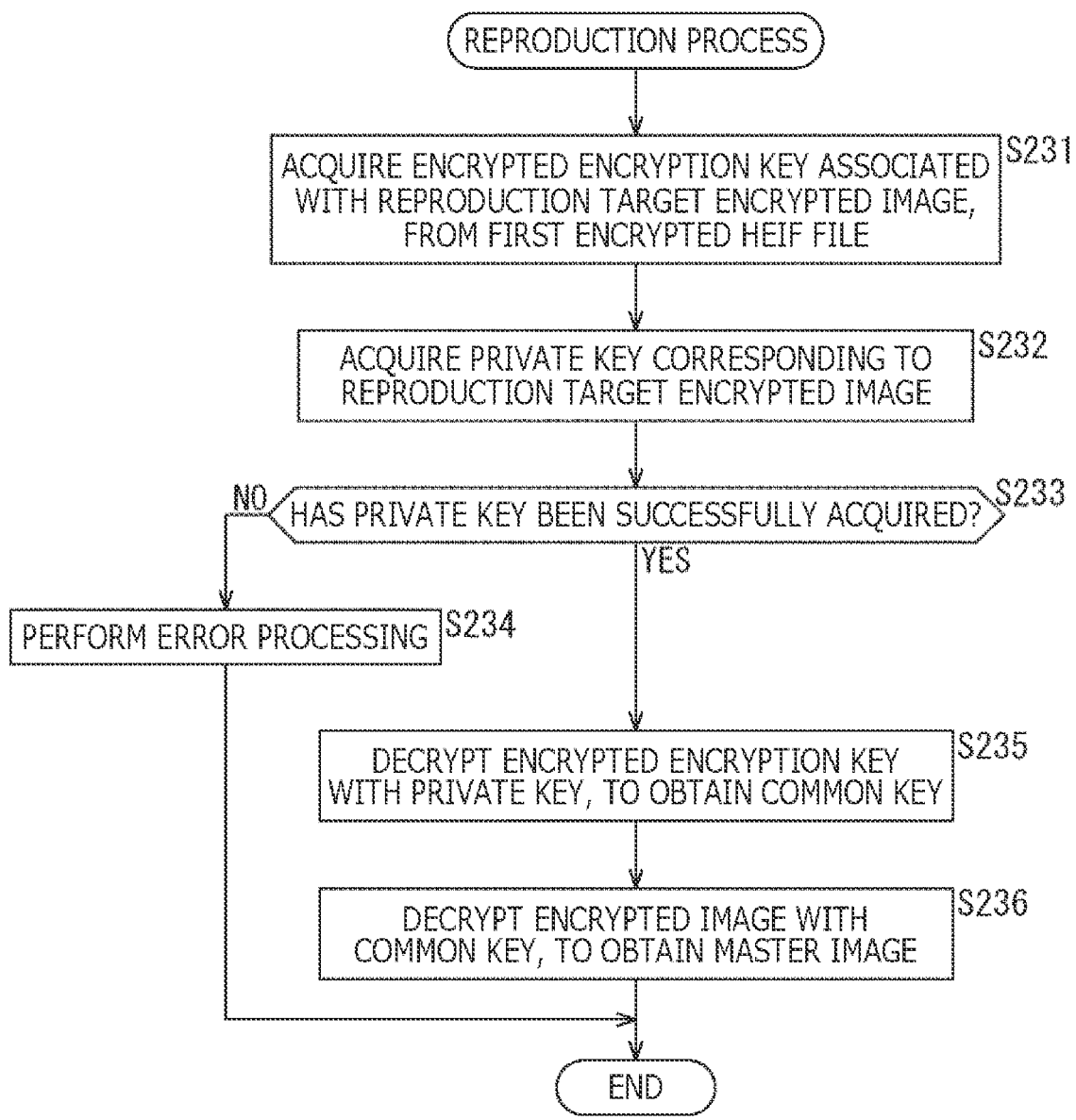
FIG. 40 is a flowchart for explaining an example of a reproduction process for reproducing a first encrypted HEIF file in a case where the first encrypted HEIF file is handled by the image processing system 100.

FIG. 40 is a flowchart for explaining an example of a reproduction process for reproducing a first encrypted HEIF file in a case where the first encrypted HEIF file is handled by the image processing system 100.

The reproduction process is started in a case where the user operates the digital camera 10 so as to reproduce an image (a master image) or the like, for example.

In the reproduction process, in step S231, the file control unit 43 of the digital camera 10 selects the first encrypted HEIF file to be reproduced in accordance with the user's operation, for example, and selects the reproduction target encrypted image from the first encrypted HEIF file. Further, the file control unit 43 acquires (reads) the encrypted encryption key associated with the reproduction target encrypted image (or the encrypted encryption key corresponding to the encrypted image) from the first encrypted HEIF file to be reproduced, and the process then moves from step S231 on to step S232.

In step S232, the file control unit 43 attempts to acquire the private key corresponding to the reproduction target encrypted image, and the process then moves on to step S233.

For example, the file control unit 43 requests the external computer 101 to supply the private key corresponding to the reproduction target encrypted image. The external computer 101 stores beforehand the user ID and the password that are associated with the private key corresponding to the encrypted image, for example. The external computer 101 prompts the user of the digital camera 10 to input the user ID and the password, waits for an input of the user ID and the password, and performs authentication. In a case where the authentication is successful, or a case where the user ID and the password stored and associated with the private key corresponding to the reproduction target encrypted image match the user ID and the password input by the user, for example, the external computer 101 transmits the private key corresponding to the reproduction target encrypted image to the digital camera 10.

In a case where the authentication fails, on the other hand, the external computer 101 informs the digital camera 10 to that effect.

In the digital camera 10, in a case where the private key corresponding to the reproduction target encrypted image is transmitted from the external computer 101, the file control unit 43 acquires the private key.

In step S233, a check is made to determine whether the file control unit 43 has successfully acquired the private key in the above manner.

If it is determined in step S233 that the private key has not been successfully acquired, the process moves on to step S234. In step S234, the digital camera 10 performs error processing, and causes the liquid crystal panel 19 to display an error message indicating that image decryption has failed, or the like, for example. The reproduction process then comes to an end. Therefore, the user who cannot obtain the private key corresponding to the reproduction target encrypted image cannot view the master image obtained by decrypting the reproduction target encrypted image.

If it is determined in step S233 that the private key has been successfully acquired, on the other hand, the process moves on to step S235.

In step S235, the file control unit 43 decrypts the encrypted encryption key acquired in step S231 into the common key, with the private key acquired in step S232. The process then moves on to step S236.

In step S236, the file control unit 43 decrypts the reproduction target encrypted image into the master image with the common key decrypted in step S236, and causes the liquid crystal panel 19 to display the master image. The reproduction process then comes to an end.

Figure 41:
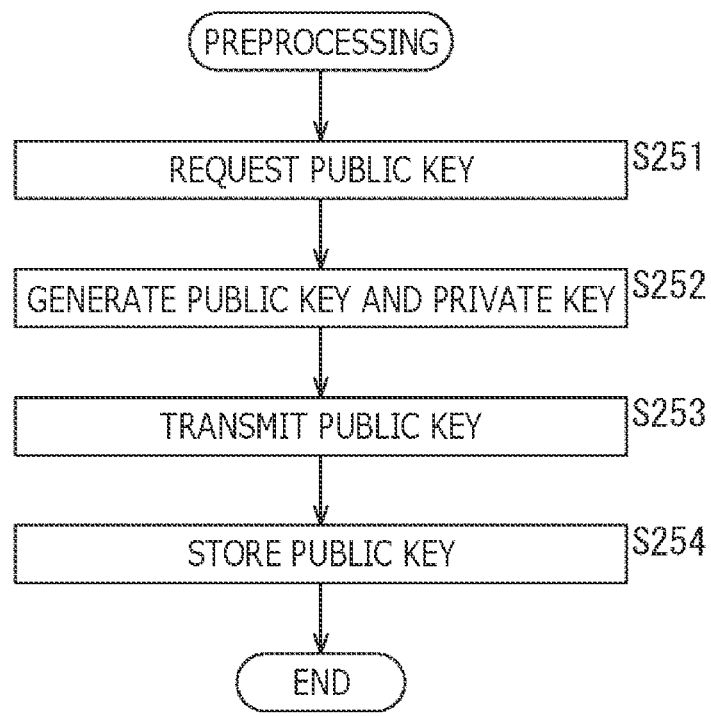
FIG. 41 is a flowchart for explaining an example of the preprocessing to be performed in a case where a second encrypted HEIF file is handled by the image processing system 100.

FIG. 41 is a flowchart for explaining an example of the preprocessing to be performed in a case where a second encrypted HEIF file is handled by the image processing system 100.

In the preprocessing shown in FIG. 41, in steps S251 to S254, processes similar to those in respective steps S211 to S214 in the preprocessing shown in FIG. 38 are performed.

Figure 42:
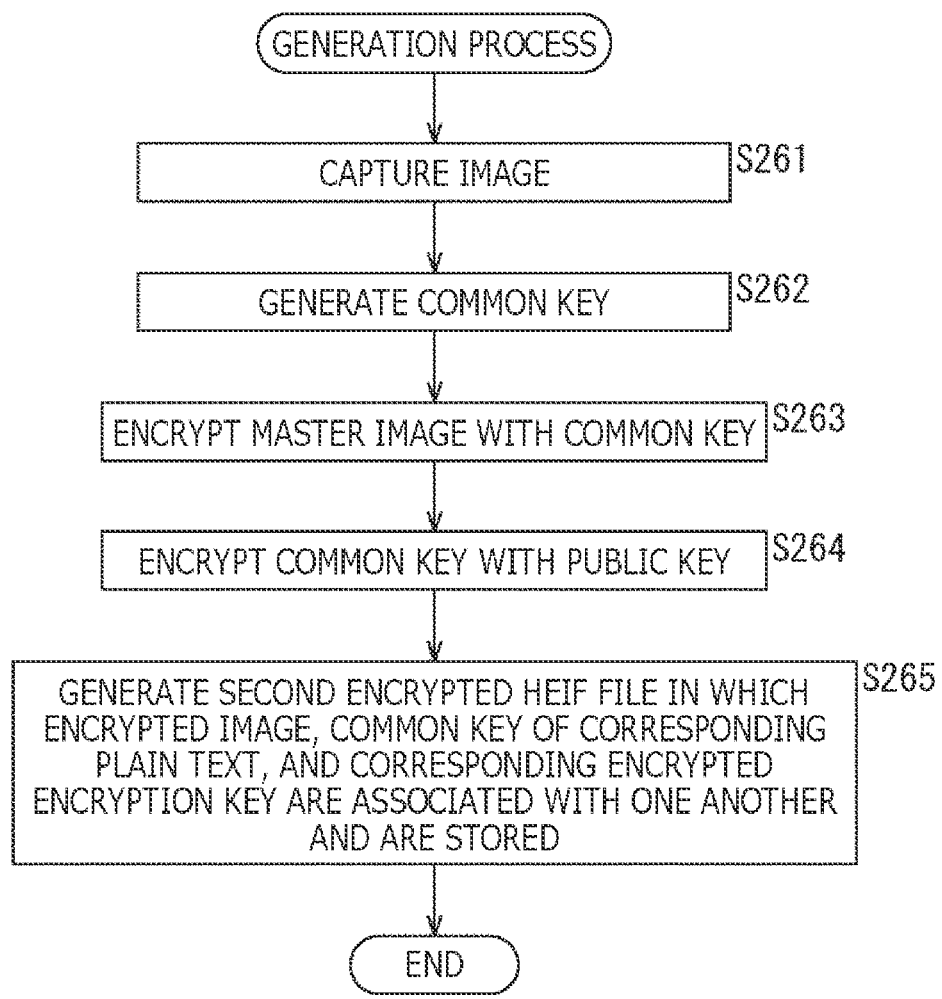
FIG. 42 is a flowchart for explaining an example of a generation process for generating a second encrypted HEIF file in a case where the second encrypted HEIF file is handled by the image processing system 100.

FIG. 42 is a flowchart for explaining an example of a generation process for generating a second encrypted HEIF file in a case where the second encrypted HEIF file is handled by the image processing system 100.

In the generation process shown in FIG. 42, in steps S261 to S264, processes similar to those in respective steps S221 to S224 in the generation process shown in FIG. 39 are performed.

Further, in step S265, the file control unit 43 generates the second encrypted HEIF file in which the encrypted image generated in step S263, the common key generated in step S262, and the encrypted encryption key generated in step S264 are associated with one another and stored. The generation process then comes to an end.

Figure 43:
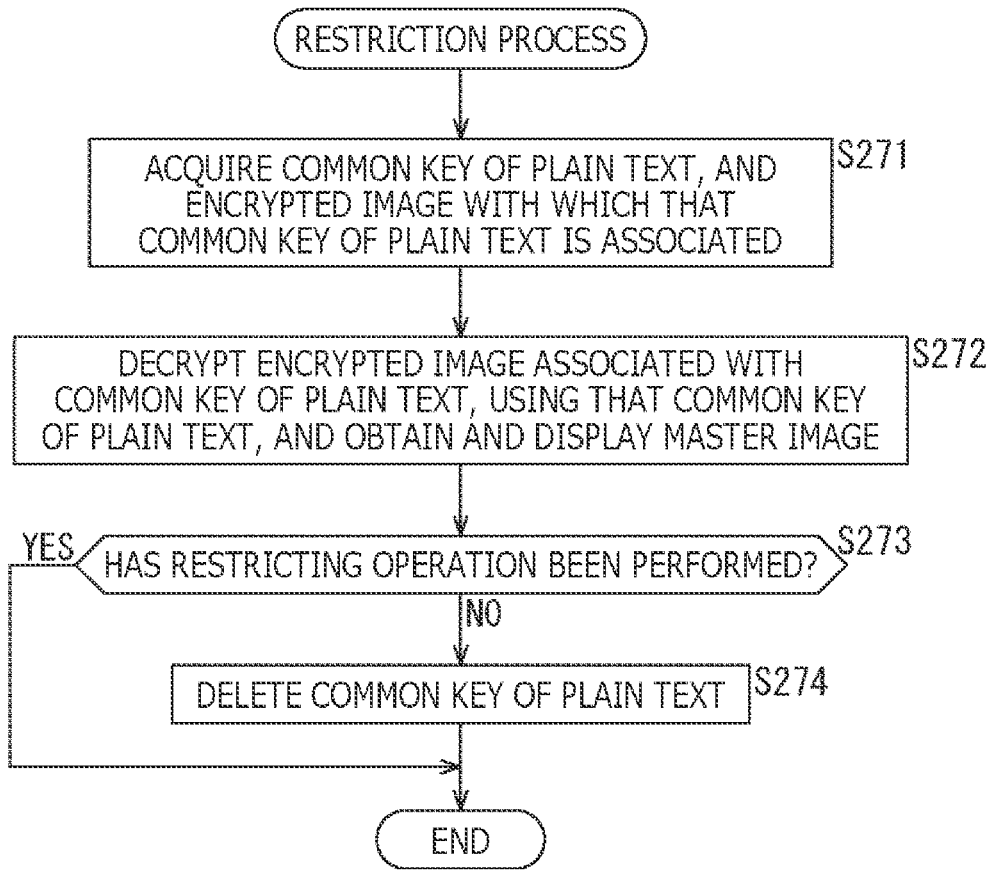
FIG. 43 is a flowchart for explaining an example of a restriction process for restricting viewing of a master image obtained by decrypting an encrypted image only to the user who can obtain the private key corresponding to the encrypted image, in a case where a second encrypted HEIF file is handled by the image processing system 100.

FIG. 43 is a flowchart for explaining an example of a restriction process for restricting viewing of a master image obtained by decrypting an encrypted image only to the user who can obtain the private key corresponding to the encrypted image, in a case where a second encrypted HEIF file is handled by the image processing system 100.

For example, when the user operates the digital camera 10 so as to perform the restriction process, the file control unit 43 in step S271 selects the second encrypted HEIF file to be reproduced in accordance with the user's operation, for example, and acquires (reads) a plain text common key and the encrypted image with which the plain text common key is associated, from the second encrypted HEIF file. The process then moves on to step S272.

In step S272, the file control unit 43 decrypts the encrypted image acquired in step S271 into the master image with the common key also acquired in step S271, and causes the liquid crystal panel 19 to display the master image. The process then moves on to step S273.

In step S273, the file control unit 43 determines whether the user has performed a restricting operation of operating the digital camera 10 so as to restrict viewing of the master image displayed in step S272.

If it is determined in step S273 that the restricting operation has not been performed, the restriction process comes to an end.

If it is determined in step S273 that the restricting operation has been performed, on the other hand, the process moves on to step S274. The file control unit 43 deletes the plain text common key acquired in step S271 from the second encrypted HEIF file, and the restriction process then comes to an end.

As described above, as the plain text common key associated with an encrypted image is deleted from the second encrypted HEIF file, it is possible to restrict viewing of the master image obtained by decrypting the encrypted image only to the user who can obtain the private key corresponding to the encrypted image.

Figure 44:
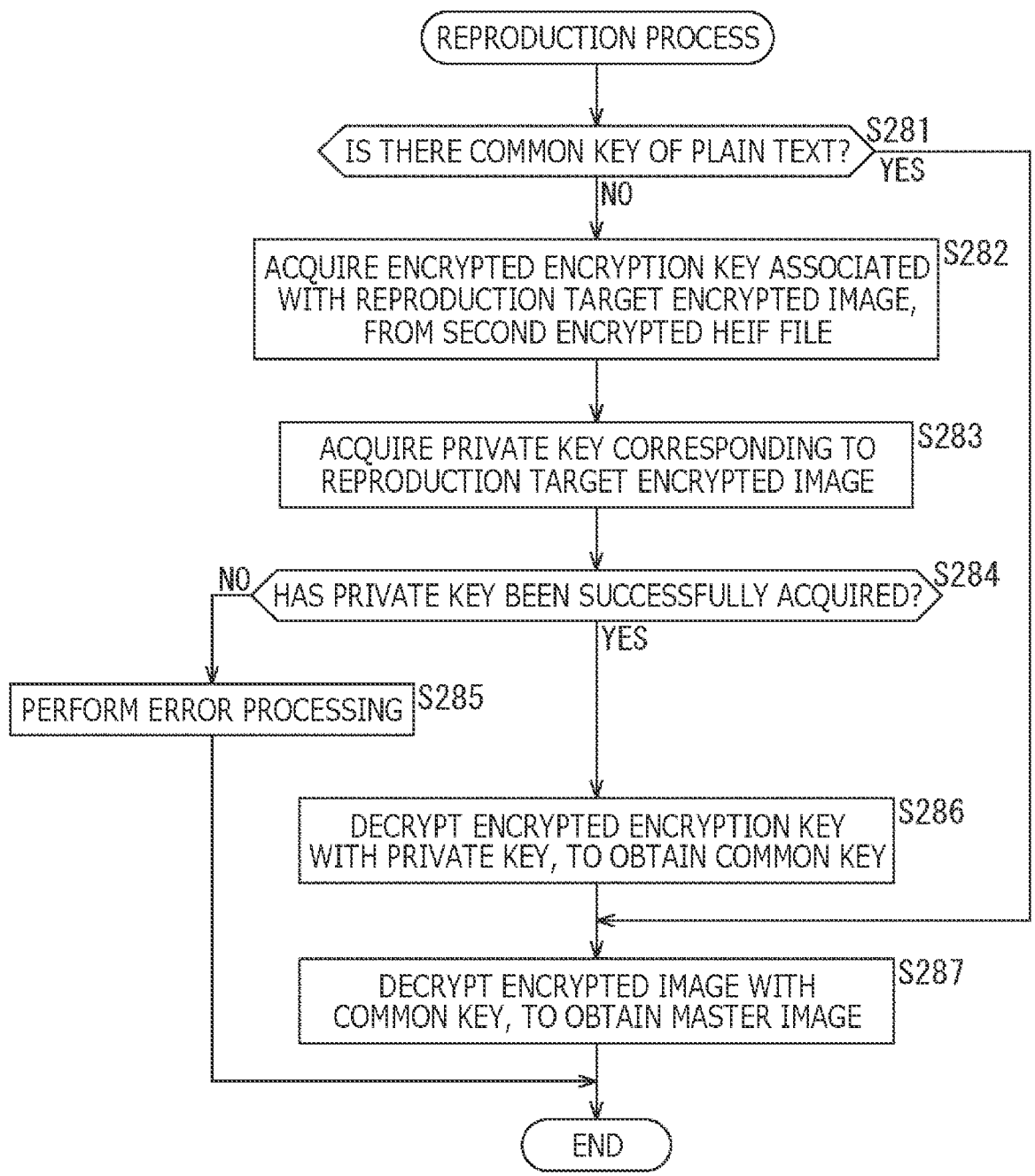
FIG. 44 is a flowchart for explaining an example of a reproduction process for reproducing a second encrypted HEIF file in a case where the second encrypted HEIF file is handled by the image processing system 100.

FIG. 44 is a flowchart for explaining an example of a reproduction process for reproducing a second encrypted HEIF file in a case where the second encrypted HEIF file is handled by the image processing system 100.

In the reproduction process shown in FIG. 44, in step S281, the file control unit 43 selects the second encrypted HEIF file to be reproduced in accordance with the user's operation, for example, and selects the reproduction target encrypted image from the second encrypted HEIF file. The file control unit 43 then determines whether the plain text common key associated with the reproduction target encrypted image is stored in the second encrypted HEIF file to be reproduced.

If it is determined in step S281 that the plain text common key is stored, the process moves on to step S287.

In step S287, the file control unit 43 decrypts the reproduction target encrypted image into the master image with the plain text common key associated with the encrypted image, and causes the liquid crystal panel 19 to display the master image. The reproduction process then comes to an end.

If it is determined in step S281 that the plain text common key is not stored, or if the plain text common key has been deleted by the restriction process shown in FIG. 43, on the other hand, the process moves on to step S282.

In steps S282 to S287, processes similar to those in respective steps S231 to S236 in the reproduction process in FIG. 40 are performed.

Figure 45:
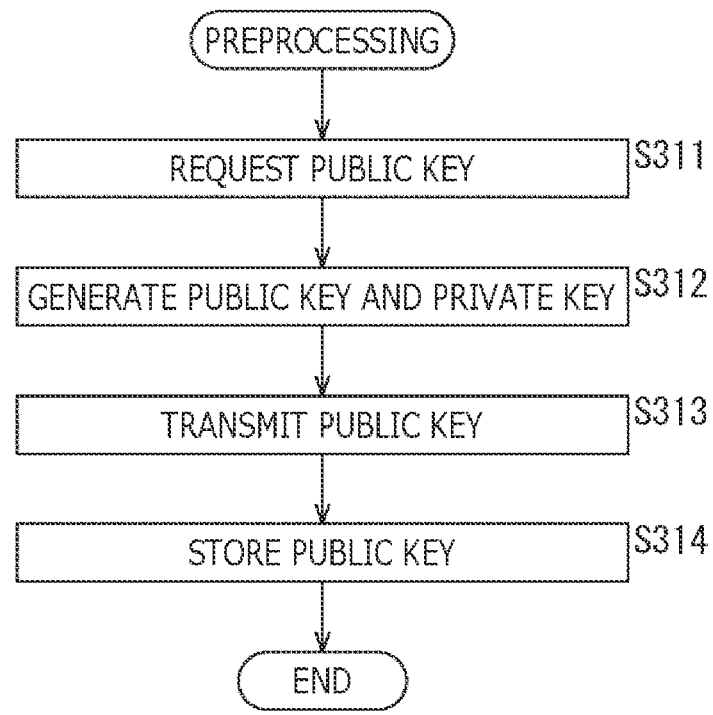
FIG. 45 is a flowchart for explaining an example of the preprocessing to be performed in a case where a third encrypted HEIF file is handled by the image processing system 100.

FIG. 45 is a flowchart for explaining an example of the preprocessing to be performed in a case where a third encrypted HEIF file is handled by the image processing system 100.

In the preprocessing shown in FIG. 45, in steps S311 to S314, processes similar to those in respective steps S211 to S214 in the preprocessing shown in FIG. 38 are performed.

Figure 46:
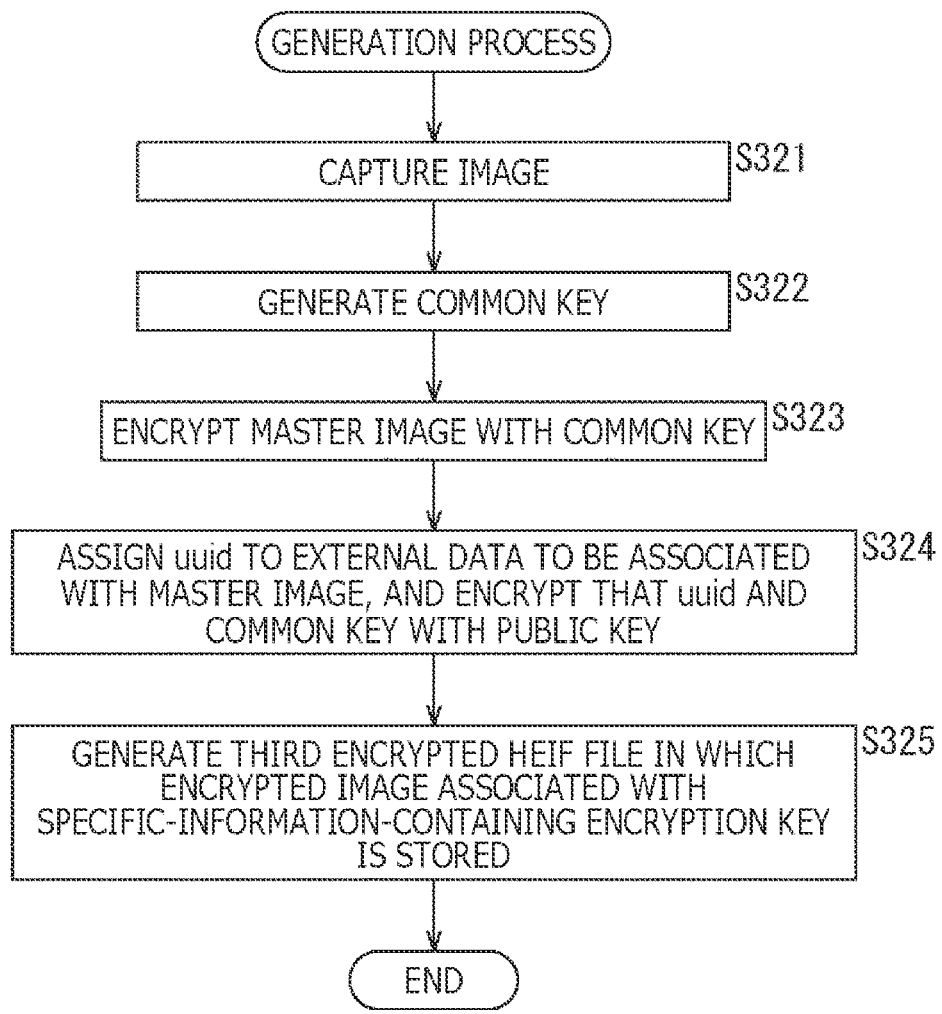
FIG. 46 is a flowchart for explaining an example of a generation process for generating a third encrypted HEIF file in a case where the third encrypted HEIF file is handled by the image processing system 100.

FIG. 46 is a flowchart for explaining an example of a generation process for generating a third encrypted HEIF file in a case where the third encrypted HEIF file is handled by the image processing system 100.

In the generation process shown in FIG. 46, in steps S321 to S323, processes similar to those in respective steps S221 to S223 in the generation process shown in FIG. 39 are performed.

Further, in step S324, the file control unit 43 selects a public key of interest that is one of the public keys not yet used for encrypting a common key, from among the public keys stored in the preprocessing. The file control unit 43 also assigns a uuid as specific information to the external data (such as the RAW data of the master image, for example) associated with the master image. The file control unit 43 then encrypts the common key used in the encryption of the master image and the uuid of the external data associated with the master image with the public key of interest, to generate a specific-information-containing encryption key. The process then moves from step S324 on to step S325.

In step S325, the file control unit 43 generates the third encrypted HEIF file in which the encrypted image generated in step S323 and the specific-information-containing encryption key generated in step S324 are associated with each other and stored. The generation process then comes to an end.

Figure 47:
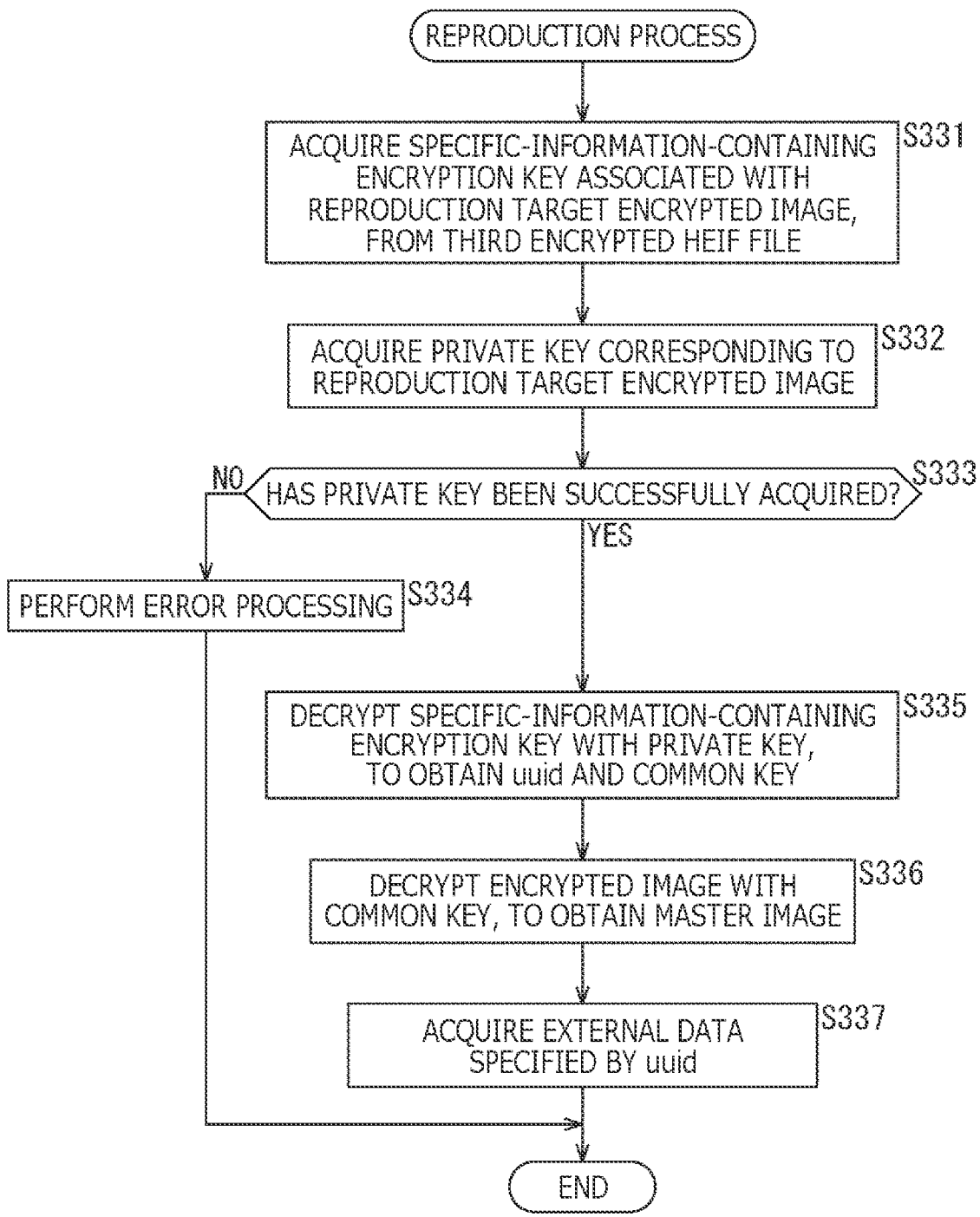
FIG. 47 is a flowchart for explaining an example of a reproduction process for reproducing a third encrypted HEIF file in a case where the third encrypted HEIF file is handled by the image processing system 100.

FIG. 47 is a flowchart for explaining an example of a reproduction process for reproducing a third encrypted HEIF file in a case where the third encrypted HEIF file is handled by the image processing system 100.

In the reproduction process shown in FIG. 47, in step S331, the file control unit 43 of the digital camera 10 selects the third encrypted HEIF file to be reproduced in accordance with the user's operation, for example, and selects the reproduction target encrypted image from the third encrypted HEIF file. Further, the file control unit 43 acquires the specific-information-containing encryption key associated with the reproduction target encrypted image from the third encrypted HEIF file to be reproduced, and the process then moves from step S331 on to step S332.

In step S332, the file control unit 43 attempts to acquire the private key corresponding to the reproduction target encrypted image in a manner similar to that in step S233 in FIG. 40, for example. The process then moves on to step S333.

In step S333, a check is made to determine whether the file control unit 43 has successfully acquired the private key.

If it is determined in step S333 that the private key has not been successfully acquired, the process moves on to step S334. In step S334, the digital camera 10 performs error processing in a manner similar to that in step S234 in FIG. 40. The reproduction process then comes to an end.

If it is determined in step S333 that the private key has been successfully acquired, on the other hand, the process moves on to step S335.

In step S335, the file control unit 43 decrypts the specific-information-containing encryption key acquired in step S331 into the uuid as the specific information and the common key, with the private key acquired in step S332. The process then moves on to step S336.

In step S336, the file control unit 43 decrypts the reproduction target encrypted image into the master image with the common key decrypted in step S335, and causes the liquid crystal panel 19 to display the master image. The process then moves on to step S337.

In step S337, the file control unit 43 acquires the external data specified by the uuid decrypted in step S336, and the reproduction process then comes to an end. The external data is reproduced in response to the user's operation or the like, for example.

Figure 48:
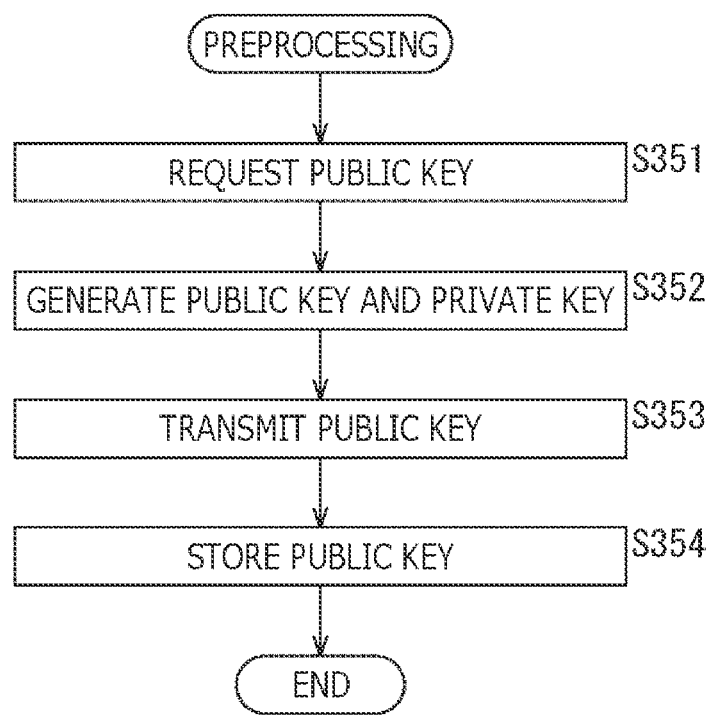
FIG. 48 is a flowchart for explaining an example of the preprocessing to be performed in a case where a fourth encrypted HEIF file is handled by the image processing system 100.

FIG. 48 is a flowchart for explaining an example of the preprocessing to be performed in a case where a fourth encrypted HEIF file is handled by the image processing system 100.

In the preprocessing shown in FIG. 48, in steps S351 to S354, processes similar to those in respective steps S211 to S214 in the preprocessing shown in FIG. 38 are performed.

Figure 49:
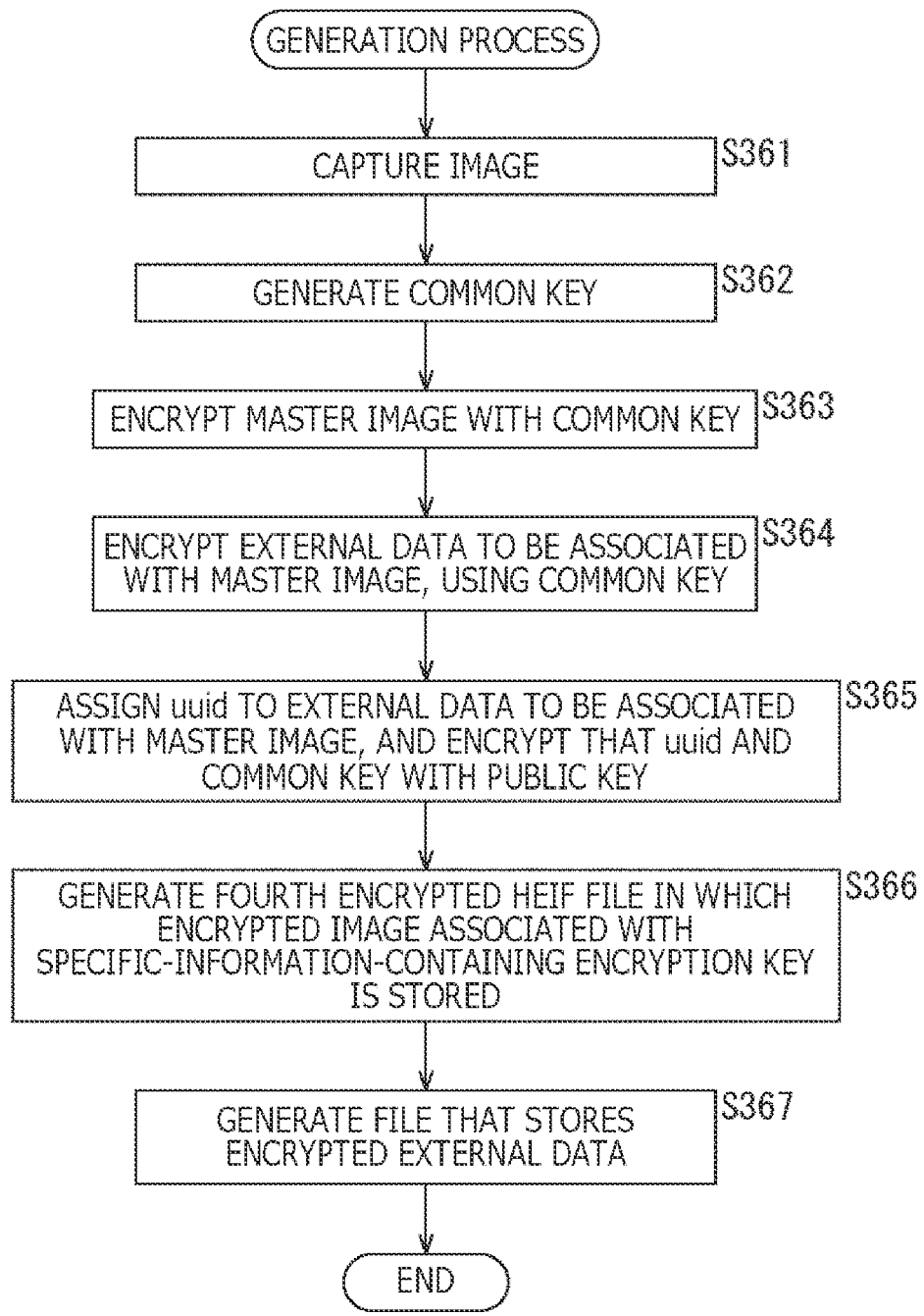
FIG. 49 is a flowchart for explaining an example of a generation process for generating a fourth encrypted HEIF file in a case where the fourth encrypted HEIF file is handled by the image processing system 100.

FIG. 49 is a flowchart for explaining an example of a generation process for generating a fourth encrypted HEIF file in a case where the fourth encrypted HEIF file is handled by the image processing system 100.

In the generation process shown in FIG. 49, in steps S361 to S363, processes similar to those in respective steps S321 to S323 in the generation process shown in FIG. 46 are performed.

Further, in step S364, the file control unit 43 encrypts the external data (such as the RAW data of the master image, for example) associated with the master image, with the common key used in the encryption of the master image. The process then moves on to step S365.

In step S365, the file control unit 43 selects a public key of interest that is one of the public keys not yet used for encrypting a common key, from among the public keys stored in the preprocessing. The file control unit 43 also assigns a uuid as specific information to the external data (the external data encrypted in step S364) associated with the master image. The file control unit 43 then encrypts the common key used in the encryption of the master image and the uuid of the external data associated with the master image with the public key of interest, to generate a specific-information-containing encryption key. The process then moves from step S365 on to step S366.

In step S366, the file control unit 43 generates the fourth encrypted HEIF file in which the encrypted image generated in step S363 and the specific-information-containing encryption key generated in step S365 are associated with each other and stored. The process then moves on to step S367.

In step S367, the file control unit 43 generates a file storing the external data encrypted in step S364, and stores the file into the medium 14, for example. The generation process then comes to an end.

Figure 50:
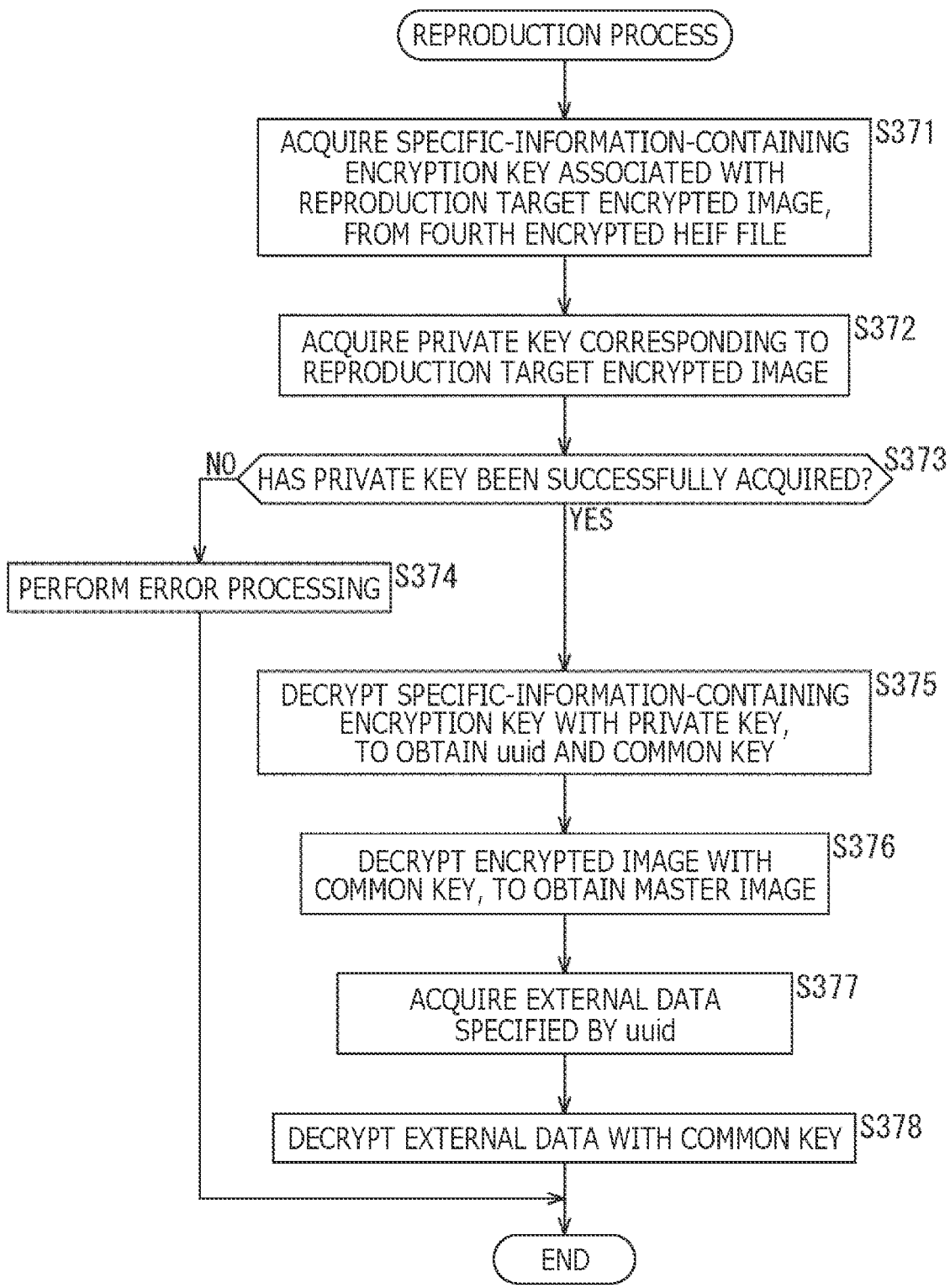
FIG. 50 is a flowchart for explaining an example of a reproduction process for reproducing a fourth encrypted HEIF file in a case where the fourth encrypted HEIF file is handled by the image processing system 100.

FIG. 50 is a flowchart for explaining an example of a reproduction process for reproducing a fourth encrypted HEIF file in a case where the fourth encrypted HEIF file is handled by the image processing system 100.

In the reproduction process shown in FIG. 50, in steps S371 to S377, processes similar to those in respective steps S331 to S337 in FIG. 47 are performed.

Further, in step S378, the file control unit 43 decrypts the external data acquired in step S377 with the common key decrypted in step S375. The reproduction process then comes to an end.

That is, with the fourth encrypted HEIF file, the external data acquired in step S377 is encrypted with the common key, and therefore, the encrypted external data is decrypted with the common key in step S378.

Figure 51:
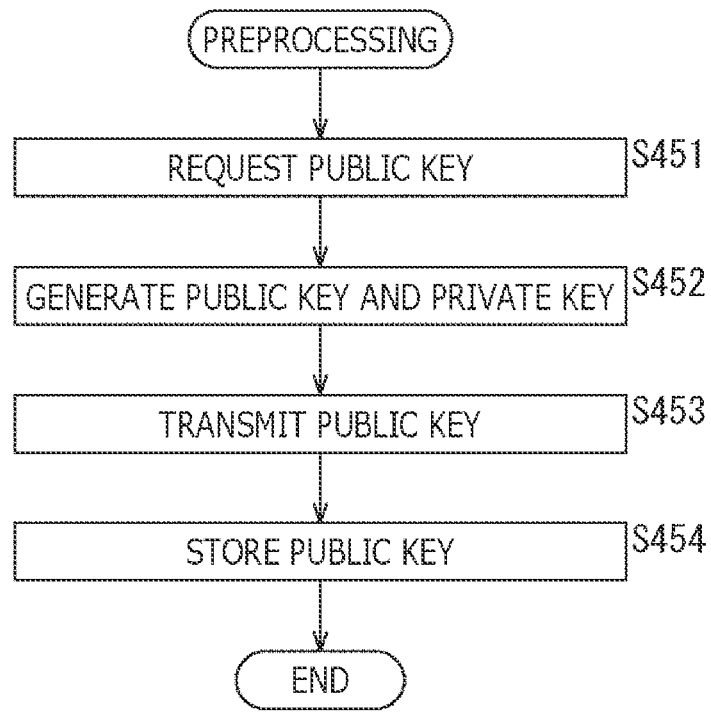
FIG. 51 is a flowchart for explaining an example of the preprocessing to be performed in a case where a fifth or sixth encrypted HEIF file is handled by the image processing system 100.

FIG. 51 is a flowchart for explaining an example of the preprocessing to be performed in a case where a fifth or sixth encrypted HEIF file is handled by the image processing system 100.

In the preprocessing shown in FIG. 41, in steps S451 to S454, processes similar to those in respective steps S211 to S214 in the preprocessing shown in FIG. 38 are performed.

Figure 52:
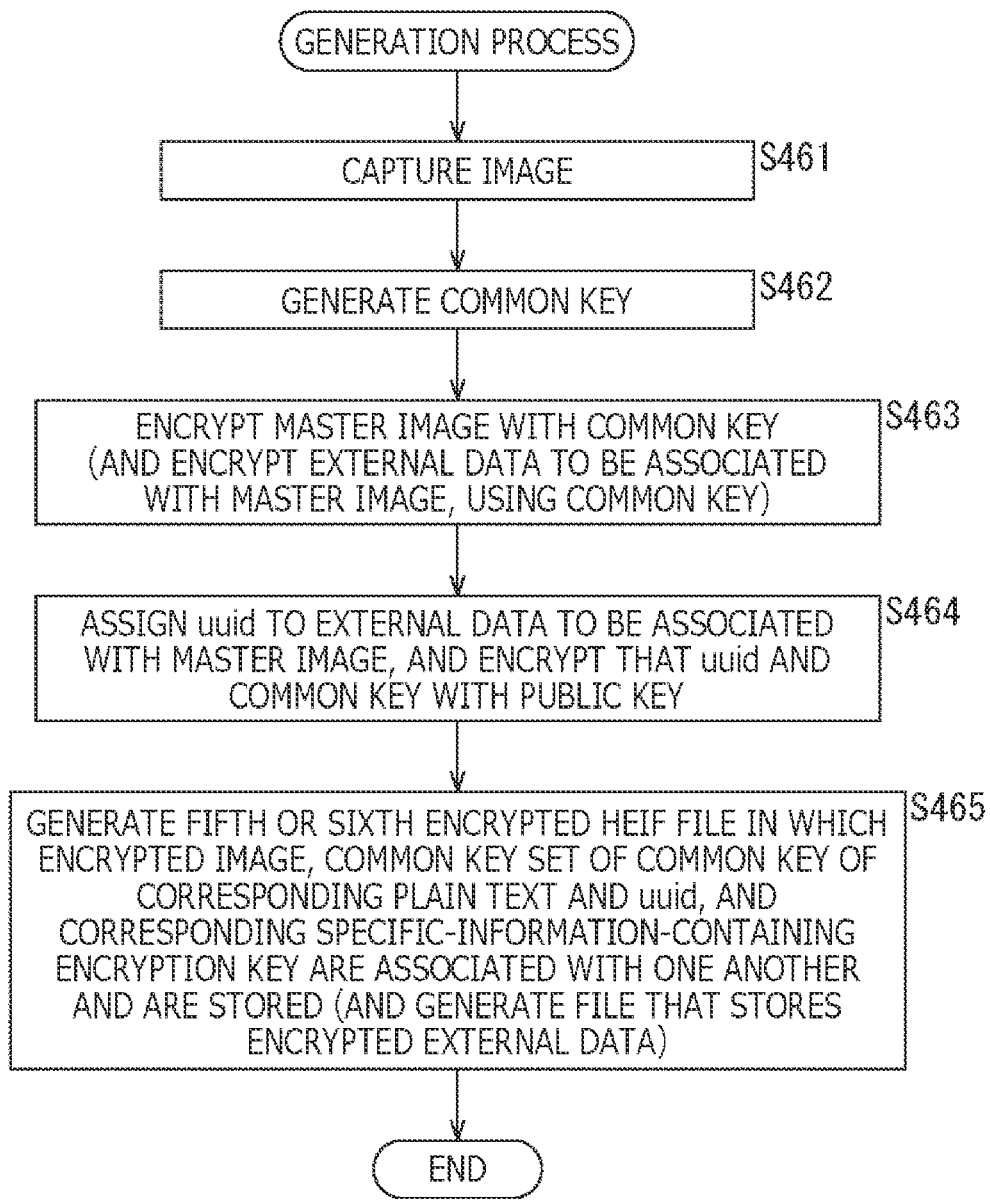
FIG. 52 is a flowchart for explaining an example of a generation process for generating a fifth or sixth encrypted HEIF file in a case where the fifth or sixth encrypted HEIF file is handled by the image processing system 100.

FIG. 52 is a flowchart for explaining an example of a generation process for generating a fifth or sixth encrypted HEIF file in a case where the fifth or sixth encrypted HEIF file is handled by the image processing system 100.

In the generation process shown in FIG. 52, in steps S461 and S462, processes similar to those in respective steps S221 and S222 in the generation process shown in FIG. 39 are performed.

Further, in step S463, the file control unit 43 generates an encrypted image by encrypting the master image obtained by capturing an image in step S461, with the common key generated in step S462. The process then moves on to step S464.

Note that, as for the sixth HEIF file, in step S463, the file control unit 43 further encrypts the external data associated with the master image, with the common key used in the encryption of the master image.

In step S464, the file control unit 43 selects a public key of interest that is one of the public keys not yet used for encrypting a common key, from among the public keys stored in the preprocessing. The file control unit 43 also assigns a uuid as specific information to the external data associated with the master image. The file control unit 43 then encrypts the common key set of the common key used in the encryption of the master image and the uuid of the external data associated with the master image with the public key of interest, to generate a specific-information-containing encryption key. The process then moves from step S464 on to step S465.

In step S465, the file control unit 43 generates the fifth or sixth encrypted HEIF file in which the encrypted image generated in step S463, the specific-information-containing encryption key generated in step S464, and the (plain text) common key set before being encrypted with the specific-information-containing encryption key are associated with one another and stored. The generation process then comes to an end.

Note that, as for the sixth HEIF file, in step S465, the file control unit 43 further generates a file storing the external data encrypted in step S463, and stores the file into the medium 14, for example.

Figure 53:
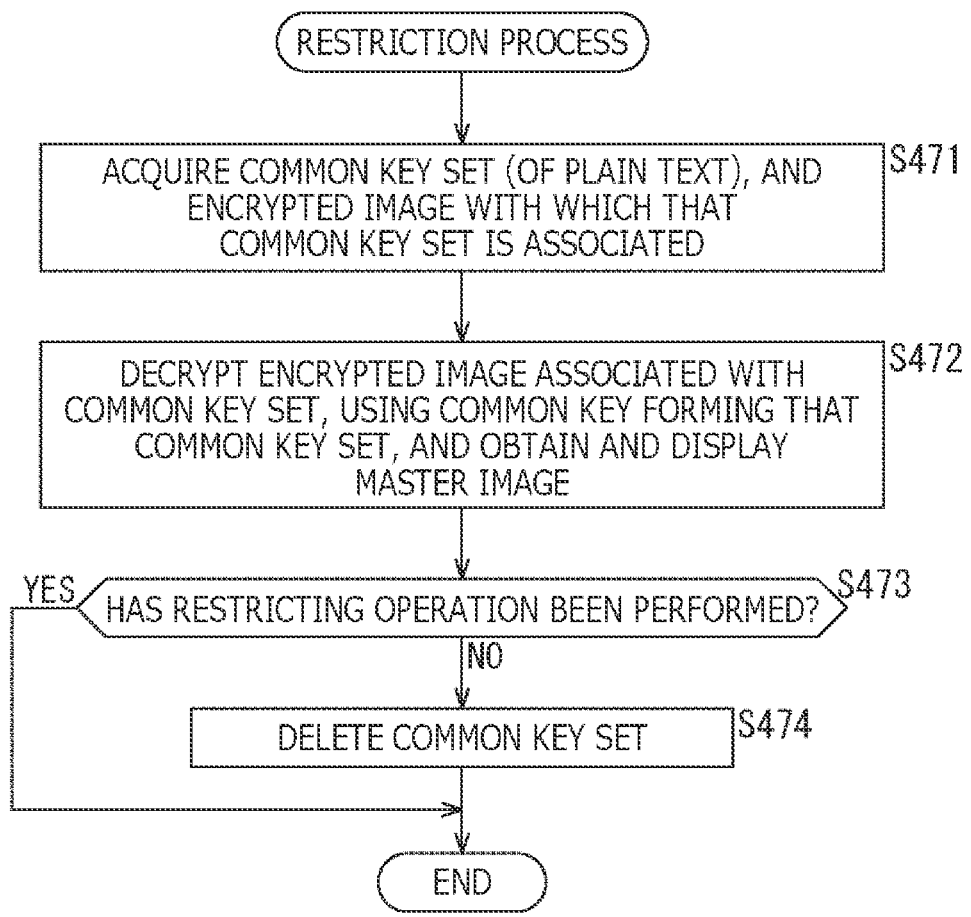
FIG. 53 is a flowchart for explaining an example of a restriction process for restricting viewing of a master image obtained by decrypting an encrypted image only to the user who can obtain the private key corresponding to the encrypted image, in a case where a fifth or sixth encrypted HEIF file is handled by the image processing system 100.

FIG. 53 is a flowchart for explaining an example of a restriction process for restricting viewing of a master image obtained by decrypting an encrypted image only to the user who can obtain the private key corresponding to the encrypted image, in a case where a fifth or sixth encrypted HEIF file is handled by the image processing system 100.

In the restriction process shown in FIG. 53, in step S471, the file control unit 43 selects the fifth or sixth encrypted HEIF file to be reproduced in accordance with the user's operation, for example, and acquires a (plain text) common key set and the encrypted image with which the common key set is associated, from the fifth or sixth encrypted HEIF file. The process then moves on to step S472.

In step S472, the file control unit 43 decrypts the encrypted image acquired in step S471 into the master image with the common key forming the common key set also acquired in step S471, and causes the liquid crystal panel 19 to display the master image. The process then moves on to step S473.

In step S473, the file control unit 43 determines whether the user has performed a restricting operation of operating the digital camera 10 so as to restrict viewing of the master image displayed in step S472.

If it is determined in step S473 that the restricting operation has not been performed, the restriction process comes to an end.

If it is determined in step S473 that the restricting operation has been performed, on the other hand, the process moves on to step S474. The file control unit 43 deletes the common key set acquired in step S471 from the fifth or sixth encrypted HEIF file, and the restriction process then comes to an end.

As described above, as the plain text common key associated with an encrypted image is deleted from the fifth or sixth encrypted HEIF file, it is possible to restrict viewing of the master image obtained by decrypting the encrypted image, and access to the external data associated with the master image, only to the user who can obtain the private key corresponding to the encrypted image.

Figure 54:
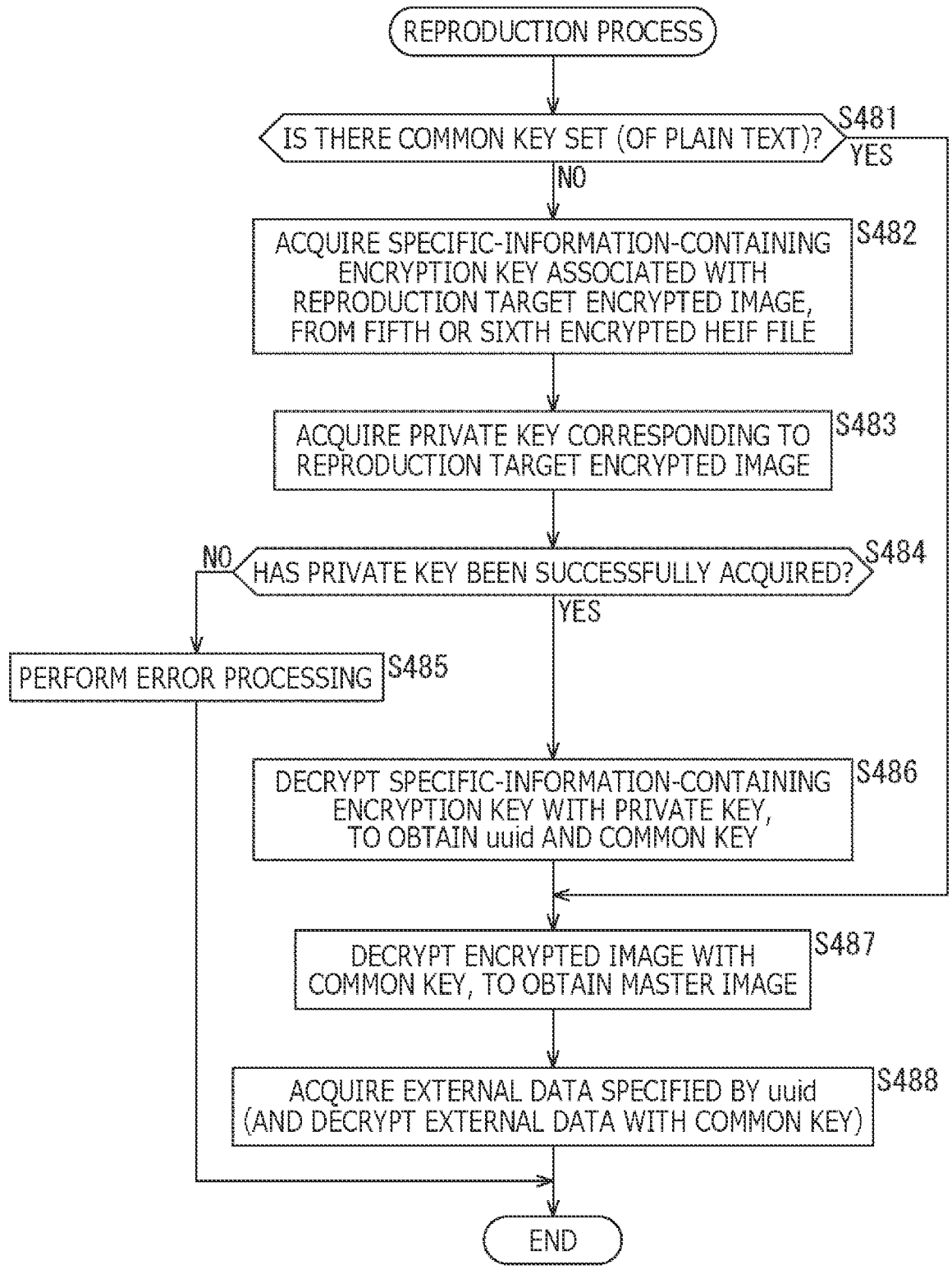
FIG. 54 is a flowchart for explaining an example of a reproduction process for reproducing a fifth or sixth encrypted HEIF file in a case where the fifth or sixth encrypted HEIF file is handled by the image processing system 100.

FIG. 54 is a flowchart for explaining an example of a reproduction process for reproducing a fifth or sixth encrypted HEIF file in a case where the fifth or sixth encrypted HEIF file is handled by the image processing system 100.

In the reproduction process shown in FIG. 54, in step S481, the file control unit 43 selects the fifth or sixth encrypted HEIF file to be reproduced in accordance with the user's operation, for example, and selects the reproduction target encrypted image from the fifth or sixth encrypted HEIF file. The file control unit 43 then determines whether the plain text common key set associated with the reproduction target encrypted image is stored in the fifth or sixth encrypted HEIF file to be reproduced.

If it is determined in step S481 that the common key set is stored, the process moves on to step S487.

In step S487, the file control unit 43 decrypts the reproduction target encrypted image into the master image with the common key forming the common key set associated with the encrypted image, and causes the liquid crystal panel 19 to display the master image. The process then moves on to step S488.

In step S488, the file control unit 43 acquires the external data specified by the uuid forming the common key set associated with the reproduction target encrypted image. The reproduction process then comes to an end.

Note that, as for the sixth HEIF file, the external data is encrypted. Therefore, in step S488, the file control unit 43 further acquires the encrypted external data specified by the uuid forming the common key set, and then decrypts the encrypted external data with the common key forming the common key set.

If it is determined in step S481 that the common key set is not stored, or if the common key set has been deleted by the restriction process shown in FIG. 53, on the other hand, the process moves on to step S482.

In steps S482 to S488, processes similar to those in respective steps S331 to S337 in the reproduction process in FIG. 47 are performed. The reproduction process then comes to an end.

Note that, as for the sixth HEIF file, the external data is encrypted. Therefore, in step S488, the file control unit 43 further acquires the encrypted external data specified by the uuid obtained by decrypting the specific-information-containing encryption key in step S486, and then decrypts the encrypted external data with the common key obtained by decrypting the specific-information-containing encryption key in step S486.

<Second Embodiment of an Image Processing System to which the Present Technology is Applied>

Figure 55:
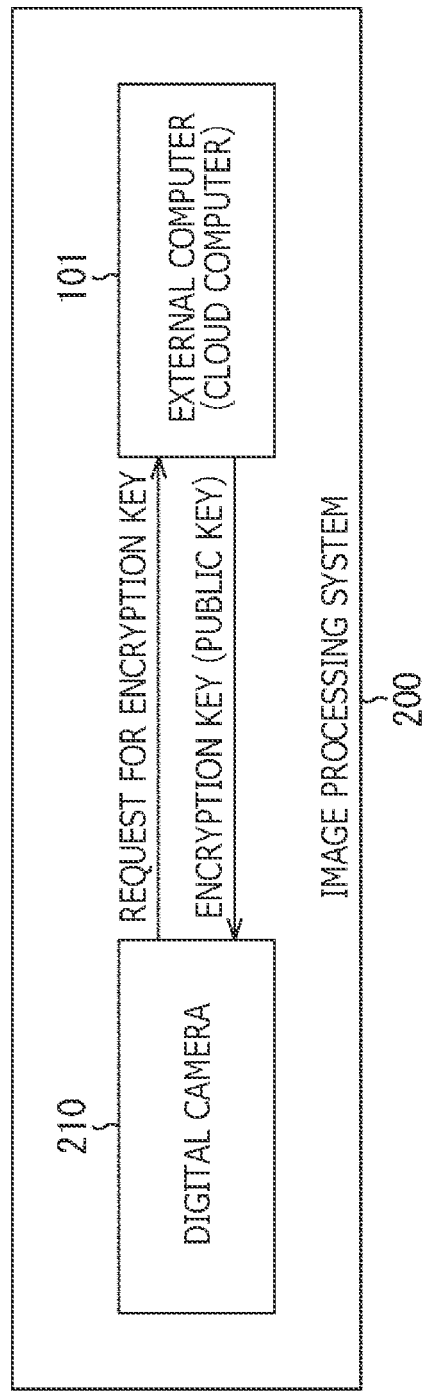
FIG. 55 is a block diagram showing an example configuration of a second embodiment of an image processing system to which the present technology is applied.

FIG. 55 is a block diagram showing an example configuration of a second embodiment of an image processing system to which the present technology is applied.

Note that, in the drawing, the components corresponding to those of the image processing system 100 in FIG. 31 are denoted by the same reference numerals as those used in FIG. 31, and explanation thereof will not be repeated below.

In FIG. 55, an image processing system 200 includes a digital camera 210 and the external computer 101.

Accordingly, the image processing system 200 is the same as the image processing system 100 in FIG. 31 in including the external computer 101, and differs from the image processing system 100 in including the digital camera 210 in place of the digital camera 10.

Figure 56:
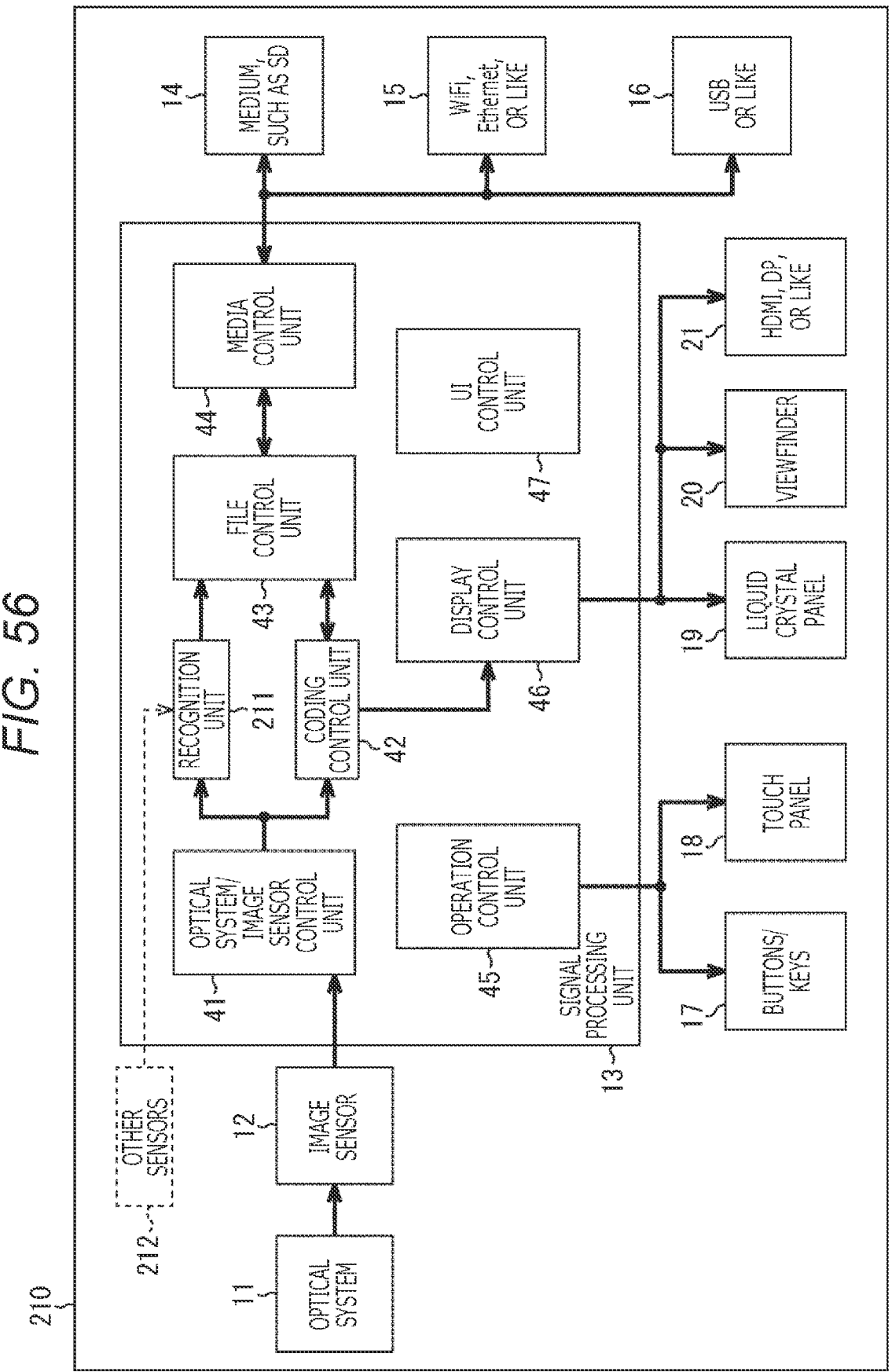
FIG. 56 is a block diagram showing an example configuration of a digital camera 210.

FIG. 56 is a block diagram showing an example configuration of the digital camera 210.

Note that, in the drawing, the components corresponding to those of the digital camera 10 in FIG. 1 are denoted by the same reference numerals as those used in FIG. 1, and explanation thereof will not be repeated below.

The digital camera 210 includes components from the optical system 11 to the interface 21, and the signal processing unit 13 includes components from the optical system/image sensor control unit 41 to the UI control unit 47, and a recognition unit 211.

Accordingly, the digital camera 210 is the same as the digital camera 10 in FIG. 1 in including the components from the optical system 11 to the interface 21, and the signal processing unit 13 is the same as that in FIG. 1 in including the components from the optical system/image sensor control unit 41 to the UI control unit 47.

However, the digital camera 210 differs from the digital camera 10 in that the recognition unit 211 is added to the signal processing unit 13.

The recognition unit 211 receives (data of) a master image supplied from the optical system/image sensor control unit 41.

The recognition unit 211 performs image recognition on the master image supplied from the optical system/image sensor control unit 41. Through the image recognition, the recognition unit 211 recognizes the object appearing in the master image as the recognition target, and supplies the recognition result to the file control unit 43.

In the recognition unit 211, the recognition algorithm adopted for recognizing an object can be an algorithm for recognizing any appropriate object appearing in a master image as the recognition target, and identifying (classifying) the type of the object as the recognition target such as a person, an automobile, or a trademark, for example, or can be a recognition algorithm for recognizing an object of a specific type as the recognition object and identifying an individual, such as a recognition algorithm for identifying an individual person, for example.

Further, other sensors 212 may be provided in the digital camera 210, and the recognition unit 211 can recognize an object appearing in a master image, using a sensing result supplied from the other sensors 212 in addition to the master image. The other sensors 212 can include a global positioning system (GPS) sensor, an orientation sensor, a depth (distance measurement) sensor, and the like, for example. The recognition unit 211 can increase the accuracy of recognition of objects appearing in master images, by specifying the current location from a sensing result supplied from the GPS sensor or the orientation sensor, and restricting recognition targets to objects that can exist at the current location. Also, the recognition unit 211 can increase the recognition accuracy at low illuminance, by generating, from a sensing result supplied from the depth sensor, a distance image having the distance to the object as its pixel value, and recognizing the object appearing in a master image, using the distance image in addition to the master image.

Here, there is "grid" as an item type of an HEIF. As for a master image whose item type is "grid", each divisional image of a plurality of divisional images (tiles) obtained by dividing the master image into divisional images of the same size is stored as an item in an HEIF file. A master image whose item type is "grid" is reconstructed from a plurality of divisional images as items. An item (a master image in this example) whose item type is "grid", or a master image to be divided into a plurality of divisional images (and a master image to be reconstructed from a plurality of divisional images) is also referred to as a grid item.

In the digital camera 210, the file control unit 43 can perform encryption not on an entire master image, but on divisional images obtained by dividing a master image. For example, the file control unit 43 can perform encryption on divisional images in which a predetermined object in a master image appears, according to a recognition result supplied from the recognition unit 211.

In the description below, processing of an encrypted HEIF file in a case where encryption is performed on a divisional image basis will be explained. Before that, however, an HEIF file storing a master image whose item type is "grid" (this HEIF file will be hereinafter also referred to as a grid file) is described.

<Grid File>

Figure 57:
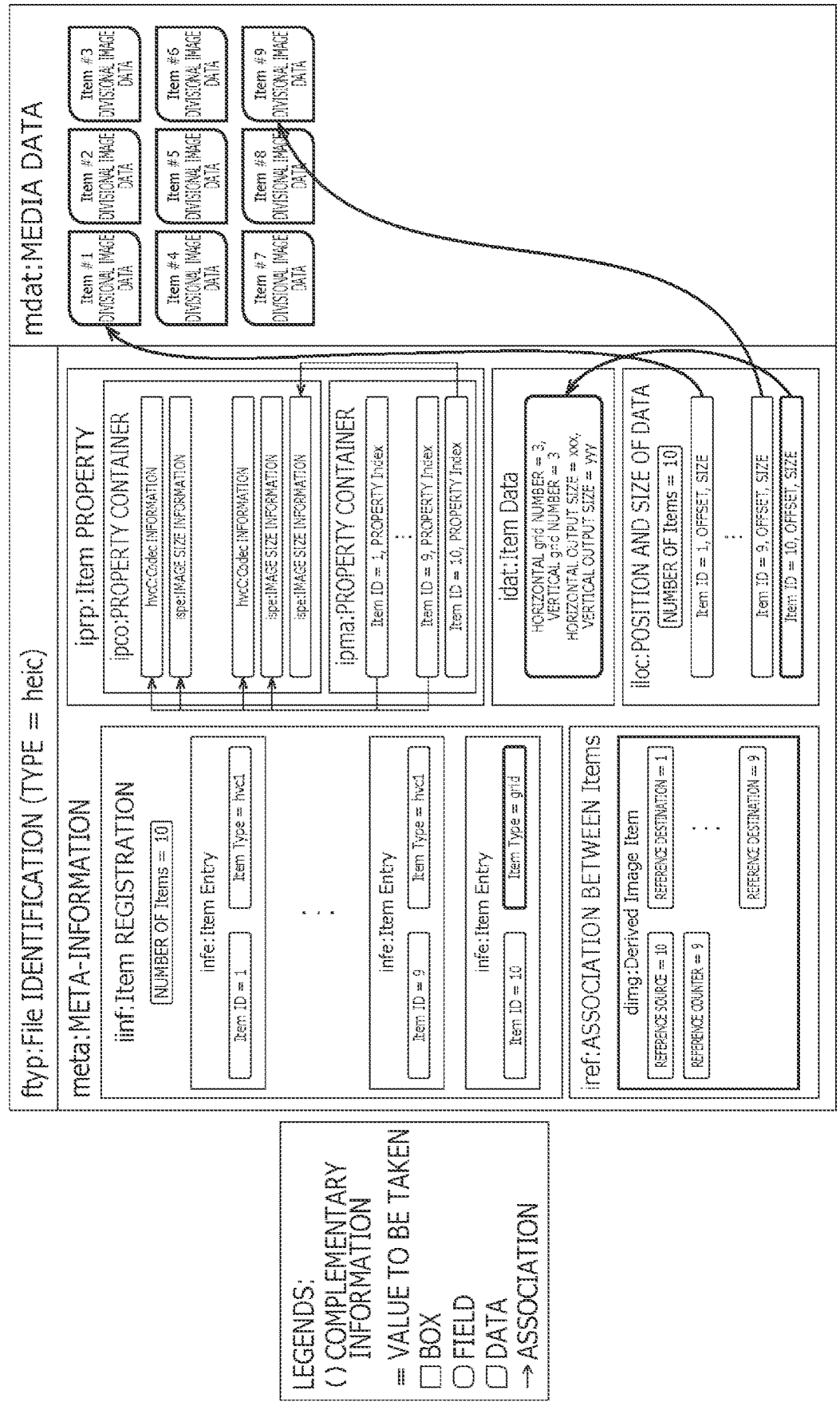
FIG. 57 is a diagram showing an example of a grid file.

FIG. 57 is a diagram showing an example of a grid file.

In the grid file in FIG. 57, a master image is divided into 3×3 divisional images Item #1 to Item #9 arranged in vertical and horizontal directions, and the divisional images Item #1 to Item #9 are stored as items in the mdat box.

In FIG. 57, the items stored in the mdat box are the nine items of the divisional images Item #1 to Item #9, but the number of items in each of the iinf box and the iloc box is 10. This is because, in addition of the nine items of the divisional images Item #1 to Item #9, a master image (a reconstructed image) as a grid item to be reconstructed from the divisional images Item #1 to Item #9 is counted as an item. In FIG. 57, the item ID of the master image as a grid item is 10, and this master image is referred to as the master image Item #10, for ease of explanation.

Regarding the master image #10 as a grid item, the media data is not stored in the mdat box, but an idat box is stored in the meta box instead. The idat box stores a horizontal grid number, a vertical grid number, a horizontal output size, and a vertical output size. The horizontal grid number and the vertical grid number indicate the respective numbers of the divisional images #1 to #9 constituting the master image #10 as a grid item in the horizontal direction and the vertical direction. The horizontal output size and the vertical output size indicate the respective sizes in the horizontal direction and the vertical direction of the master image #10 as a grid item reconstructed from the divisional images #1 to #9.

Further, as for the master image #10 as a grid item, information (the offset and size) regarding the storage location of the master image #10 is stored in the iloc box, and this information indicates the storage location of the idat box of the master image #10 as a grid item.

The grid file in FIG. 57 includes ten infe boxes, as the ten items of the divisional images Item #1 to Item #9 and the master image Item #10 to be reconstructed from the divisional images Item #1 to Item #9 are stored therein. As described above with reference to FIG. 9, the item ID for specifying the item and the item type are stored (registered) in an infe box, and "grid" indicating a grid item is stored as the item type of the master image Item #10 in the infe box of the master image Item #10 as a grid item.

In the grid file, a dimg box is stored in the iref box. The dimg box stores information for associating a grid item with the divisional images constituting the grid item. For example, the dimg box stores the item IDs of the divisional images are stored as reference destinations, and the item ID of the master image as the grid item to be reconstructed from the divisional image is stored as a reference source. In FIG. 57, the item IDs #1 to #9 of the divisional images Item #1 to Item #9 are stored as the reference destinations, and the item ID #10 of the master image Item #10 is stored as the reference source. The dimg box also stores a reference counter indicating the number of divisional images.

Regarding the grid file as described above, the file control unit 43 can recognize, from the item type "grid" stored in the infe box of the master image Item #10, that the master image Item #10 is a reconstructed image (a grid item) to be reconstructed from a plurality of divisional images. Further, the file control unit 43 can specify, from the reference source and the reference destinations stored in the dimg box, the item ID #10 of the master image Item #10 to be reconstructed from the divisional images, and the item IDs #1 to #9 of the divisional images Item #1 to Item #9 to be used for reconstructing the master image Item #10. From the horizontal grid number and the vertical grid number, and the horizontal output size and the vertical output size stored in the idat box, the file control unit 43 can also specify the numbers of the divisional images #1 to #9 constituting the master image #10 in the horizontal direction and the vertical direction, and the horizontal and vertical sizes of the master image #10 to be reconstructed from the divisional images #1 to #9.

From the divisional images Item #1 to Item #9 of the item IDs #1 to #9 specified from the dimg box, the file control unit 43 can reconstruct the master image Item #10 that has the item ID #10 specified from the dimg box, has the size specified from the idat box, and is formed with divisional images as many as the numbers in the horizontal direction and the vertical direction specified from the idat box.

In the digital camera 210 (FIG. 56), the file control unit 43 can generate an encrypted grid file that is a grid file in which encrypted divisional images an encrypted images obtained by encrypting divisional images obtained by dividing a master image with a common key (a first encryption key), and an encrypted encryption key obtained by encrypting the common key with a public key (a second encryption key) are associated with each other and stored. An encrypted grid file is a type of encrypted HEIF file.

In associating the encrypted divisional images stored in the encrypted grid file with the encrypted encryption key obtained by encrypting the common key used in the encryption for obtaining the encrypted divisional images, the file control unit 43 can use the association between the master image stored in an associating HEIF file and the specific information about external data. That is, the file control unit 43 can associate the encrypted divisional images stored in the encrypted grid file with the encrypted encryption key, in a manner similar to that in the association between the master image stored in an associating HEIF file and the specific information about external data.

The file control unit 43 can also decrypt the encrypted encryption key of the encrypted grid file into the common key, and, with the common key obtained by the decryption, decrypt the encrypted divisional images into the original divisional images. Further, the file control unit 43 can reconstruct the reconstructed image as the master image by arranging the divisional images.

<Processing of an Encrypted Grid File>

Figure 58:
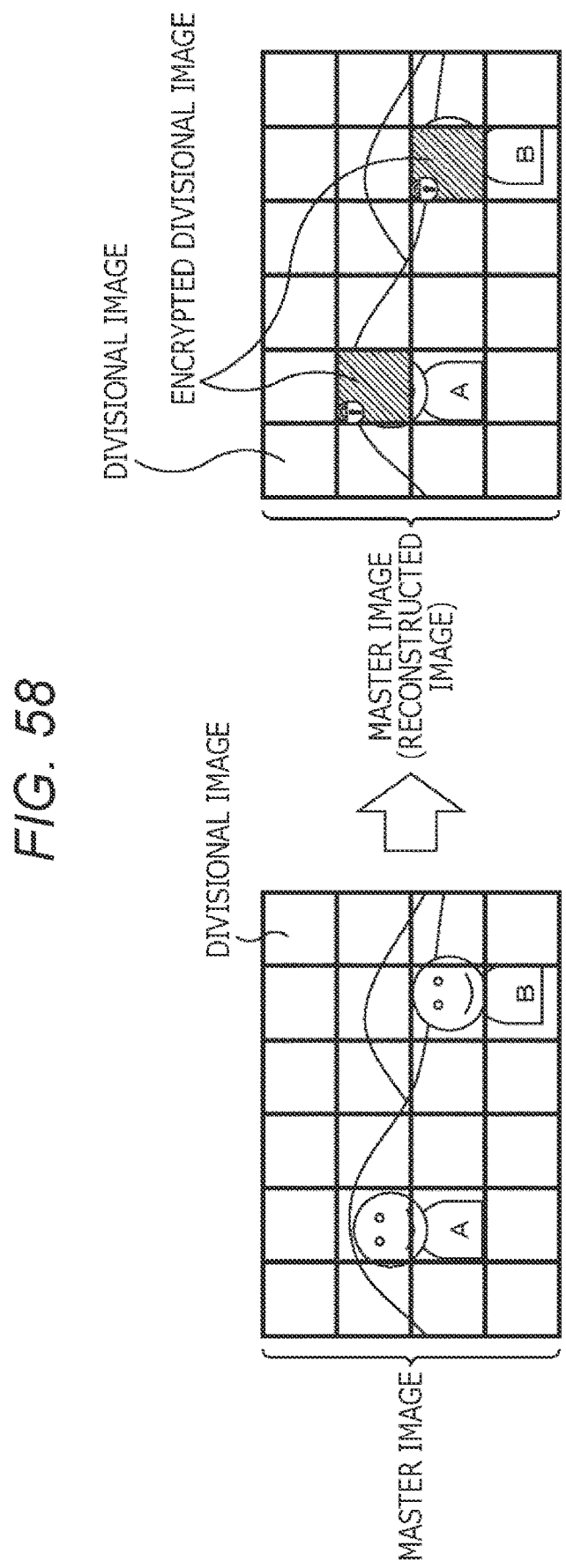
FIG. 58 is a diagram for explaining an outline of encrypted grid file processing to be performed by the digital camera 210.

FIG. 58 is a diagram for explaining an outline of encrypted grid file processing to be performed by the digital camera 210.

At the time of generation of the encrypted grid file, the recognition unit 211 in the digital camera 210 (FIG. 56) sets the faces of persons as the recognition target, recognizes the faces of persons appearing in the master image, for example, and supplies the recognition result to the file control unit 43.

According to the recognition result supplied from the recognition unit 211, the file control unit 43 encrypts the divisional images in which the recognition target has been recognized (the divisional images in which the face of the person as the recognition target appears) among the divisional images obtained by dividing the master image, into encrypted divisional images with a common key, and stores the encrypted divisional images into the encrypted grid file, for example. The divisional images other than the divisional images in which the recognition target has been recognized can be encrypted into encrypted divisional images with a common key and be stored into the encrypted grid file like the divisional images in which the recognition target has been recognized, or can be stored (as plain text) into the encrypted grid file without being encrypted. In this example, the divisional images other than the divisional images in which the recognition target has been recognized are stored into the encrypted grid file without being encrypted.

As in a case with an encrypted HEIF file, the file control unit 43 encrypts the common key used in the encryption of divisional images into an encrypted encryption key with a public key, and stores the encrypted encryption key into the encrypted grid file by associating the encrypted encryption key with the corresponding encrypted divisional images (the divisional images encrypted with the public key obtained by decrypting the encrypted encryption key).

When reproducing the encrypted grid file, the file control unit 43 in the digital camera 210 reconstructs a reconstructed image as a master image from the divisional images and the encrypted divisional images stored in the encrypted grid file.

In a case where the private key corresponding to the public key can be obtained, when reconstructing a reconstructed image as a master image, the file control unit 43 decrypts the encrypted encryption key associated with the encrypted divisional images into the common key with the private key, and decrypts the encrypted divisional images into the original divisional images with the common key. Further, the file control unit 43 reconstructs the reconstructed image as the master image by arranging the (plain text) divisional images stored in the encrypted grid file and the divisional images obtained by decrypting the encrypted divisional images. As a result, it is possible to obtain a reconstructed image showing the objects as the recognition target appearing in the original master image, or human faces in this case.

On the other hand, in a case where the private key corresponding to the public key cannot be obtained, when reconstructing the reconstructed image as the master image, the file control unit 43 reconstructs the reconstructed image as the master image by arranging the (plain text) divisional images stored in the encrypted grid file and the encrypted divisional images (or an unpatterned one-color image or the like representing the encrypted divisional images, for example). As a result, it is possible to obtain a reconstructed image that does not show (or hides) the objects as the recognition target appearing in the original master image, or human faces in this case.

As described above, with the encrypted grid file, viewing of the objects as the recognition target can be restricted to the user who can obtain the private key corresponding to the public key.

Note that, in the digital camera 210, encrypted divisional images can be encrypted with common keys that vary with each object appearing in the corresponding divisional images, and the common keys used in the encryption of the divisional images can be encrypted with public keys that vary with each object.

That is, in the digital camera 210, divisional images can be encrypted with common keys that vary with each object as a recognition target appearing in a divisional image. Further, the common keys that vary with each object as a recognition target appearing in a divisional image can be encrypted with public keys that vary with each object as a recognition target (accordingly, the private keys also vary).

For example, in a case where the face of a person is a recognition target, and the face of a person A and the face of a person B appearing in a master image are recognized as shown in FIG. 58, the divisional image in which the face of the person A appears and the divisional image in which the face of the person B appears can be encrypted with different common keys. Further, the common key used in the encryption of the divisional image in which the face of the person A appears and the common key used in the encryption of the divisional image in which the face of the person B appears can be encrypted with different public keys KA and KB.

In this example, in a case where the private key corresponding to the public key KA can be obtained, a reconstructed image showing the face of the person A is reconstructed, and, in a case where the private key corresponding to the public key KB can be obtained, a reconstructed image showing the face of the person B is reconstructed. Accordingly, viewing of the face of the person A can be limited to the user who can obtain the private key corresponding to the public key KA, and viewing of the face of the person B can be limited to the user who can obtain the private key corresponding to the public key KB.

As described above, for each object, the user who can view object can be limited.

Also, in this example, an individual is identified, with a recognition target being specific one type of object that is a person. However, a plurality of types of objects can be set as recognition targets, and the type of an object as a recognition target can be identified. For example, a person and a trademark can be identified as recognition targets. In this case, encryption can be performed with different common keys and public keys for the respective types of objects as the recognition targets, which are a person and a trademark.

Further, in the recognition unit 211, an object as a recognition target can be set in accordance with the user's operation. For example, whether to identify an individual as a specific one type of object such as a person as a recognition target, or whether to identify a person and a trademark as recognition targets as described above can be set in accordance with the user's operation.

<Encrypted Grid File>

Figure 59:
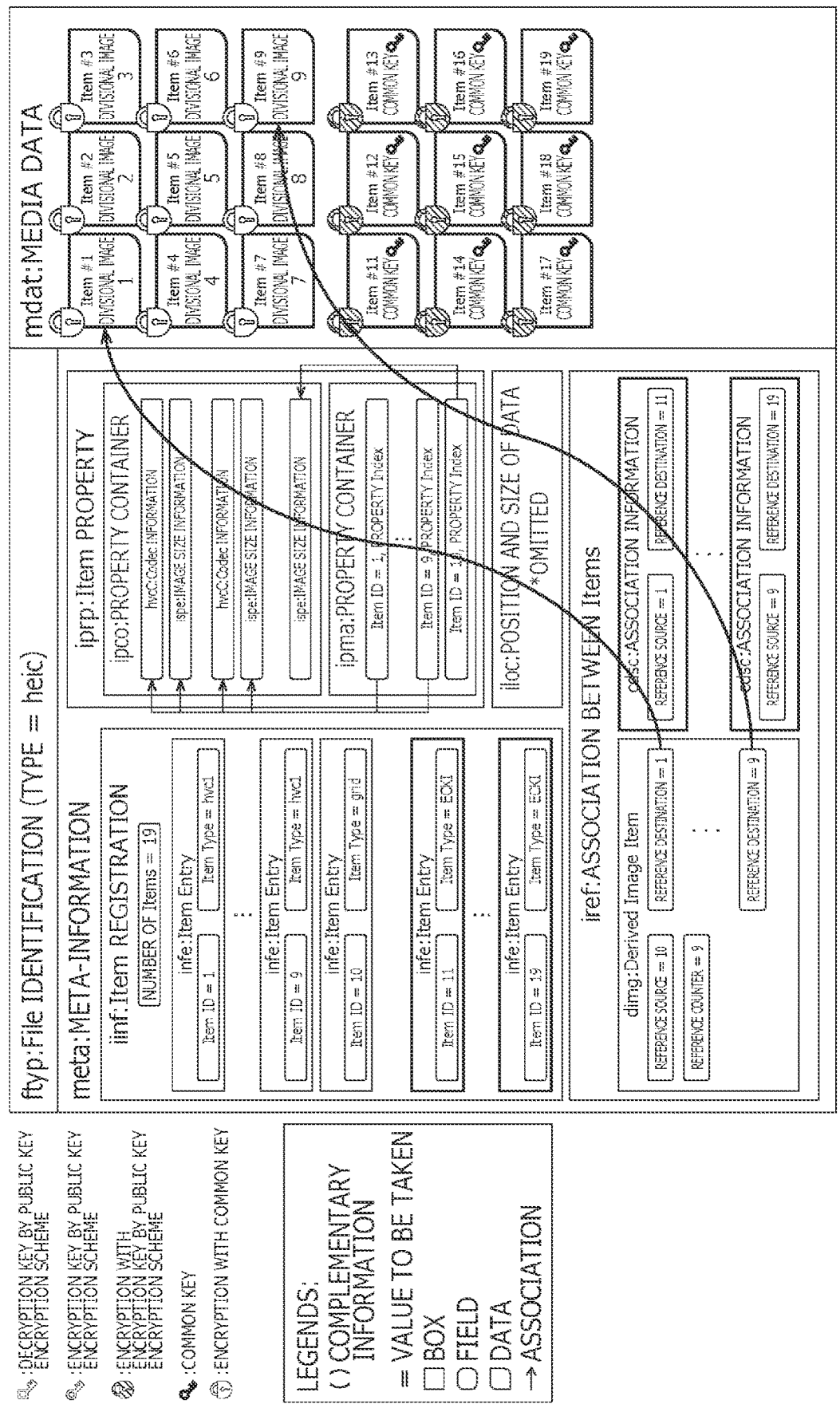
FIG. 59 is a diagram showing an example of an encrypted grid file.

FIG. 59 is a diagram showing an example of an encrypted grid file.

The encrypted grid file in FIG. 59 is an encrypted grid file corresponding to the grid file in FIG. 57. That is, the encrypted grid file in FIG. 59 is an encrypted grid file storing encrypted divisional images Item #1 to Item #9 as the encrypted images obtained by encrypting the divisional images Item #1 to Item ##9 stored in the grid file in FIG. 57 on a divisional image basis.

Note that the contents of the iloc box and the idat box are not shown in FIG. 59, but are similar to those in FIG. 57.

The encrypted grid file in FIG. 59 differs from the grid file in FIG. 57 in that, instead of the (plain text) divisional images Item #1 to Item #9, the encrypted divisional images Item #1 to Item #9 are stored as items in the mdat box. The encrypted grid file in FIG. 59 also differs from the grid file in FIG. 57 in that encrypted encryption keys Item #11 to Item #19 obtained by encrypting the common keys used in the encryption for obtaining the encrypted divisional images Item #1 to Item #9 with public keys are newly stored as items in the mdat box. Further, the encrypted grid file in FIG. 59 differs from the grid file in FIG. 57 in that cdsc boxes storing association information are newly stored in the iref box.

Note that, in the encrypted grid file in FIG. 59, items are increased from those in the grid file in FIG. 57 by the number of the encrypted encryption keys Item #11 to Item #19. Therefore, in the encrypted grid file in FIG. 59, the number of items in the iinf box is 19, and, in this respect, the encrypted grid file in FIG. 59 differs from the grid file in FIG. 57 in which the number of items is ten. Further, the encrypted grid file in FIG. 59 differs from the grid file in FIG. 57 in that infe boxes for the encrypted encryption keys Item #11 to Item #19, which cause the increase of items from that in the grid file in FIG. 57, are newly provided.

In FIG. 59, objects as different recognition targets are captured in the respective divisional images 1 to 9 before being encrypted into the encrypted divisional images Item #1 to Item #9, for example. Therefore, the divisional images 1 to 9 are encrypted into the encrypted divisional images Item #1 to Item #9 with different common keys. Further, the common keys used in the encryption of the divisional images 1 to 9 in which objects as different recognition targets are captured are encrypted into the encrypted encryption keys Item #11 to Item #19 with different public keys.

In the encrypted grid file, association information for associating an encrypted divisional image Item #i with an encrypted encryption key Item #10+i obtained by encrypting the common key used in the encryption for obtaining the encrypted divisional image Item #i with a public key is stored in the cdsc box, so that the encrypted divisional image Item #i and the encrypted encryption key Item #10+i are associated with each other, as in the (first to sixth) encrypted HEIF files, for example.

As for the encrypted divisional image Item #i stored in the encrypted grid file, in a case where the private key corresponding to the encrypted divisional image Item #i (the private key corresponding to the public key used in the encryption of the common key used in the encryption for obtaining the encrypted divisional image Item #i) can be obtained, the file control unit 43 can decrypt the encrypted encryption key Item #10+i associated with the encrypted divisional image Item #i into the common key with the private key, and decrypt the encrypted divisional image Item #i into the original divisional image i with the common key obtained by the decryption. Thus, as for each divisional image i obtained by dividing a master image, viewing of (the object appearing in) the divisional image i can be restricted to the user who can obtain the private key corresponding to the encrypted divisional image Item #i.

In a case where the encrypted divisional image Item #i is to be decrypted, the file control unit 43 specifies the item ID of the reference destination in the cdsc box having the reference source indicating the item ID #i of the encrypted divisional image Item #i, as the item ID #10+i of the encrypted encryption key Item #10+i corresponding to the encrypted divisional image Item #i, or of the encrypted encryption key Item #10+i obtained by encrypting the common key used in the encryption of the encrypted image Item #i. In accordance with the item ID #10+i, the file control unit 43 acquires the encrypted encryption key Item #10+i from the mdat box, and performs decryption.

Note that, in the encrypted grid file in FIG. 59, all the nine divisional images 1 to 9 constituting the master image are encrypted into the encrypted divisional images Item #1 to Item #9. However, not all the divisional images 1 to 9 constituting the master image need to be encrypted. That is, of the divisional images 1 to 9 constituting the master image, only the divisional images in which objects as recognition targets appear can be encrypted.

Figure 60:
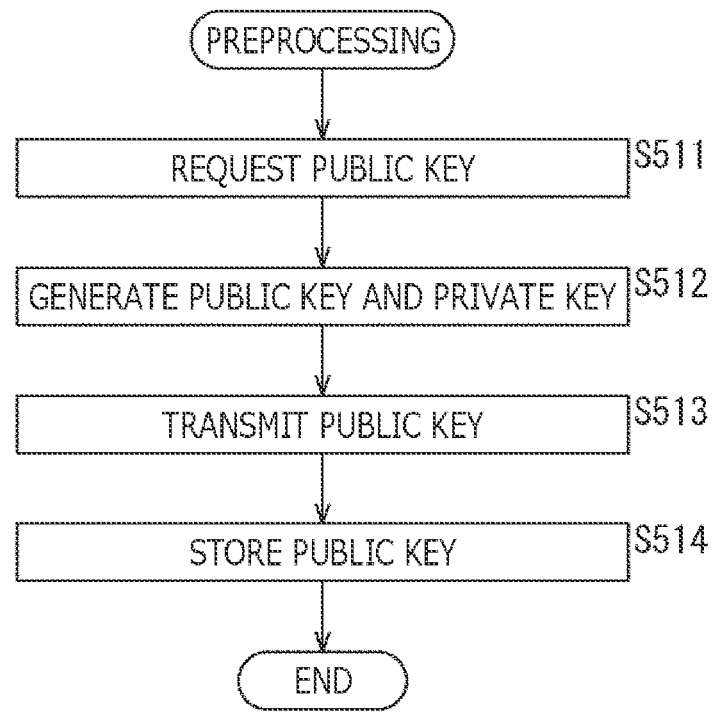
FIG. 60 is a flowchart for explaining a first example of the preprocessing to be performed in a case where an encrypted grid file is handled by the image processing system 200.

FIG. 60 is a flowchart for explaining a first example of the preprocessing to be performed in a case where an encrypted grid file is handled by the image processing system 200.

In the first example of the preprocessing, in step S511, the digital camera 210 of the image processing system 200 transmits a request for a predetermined number of public keys to the external computer 101, and the process then moves on to step S512.

For example, in a case where persons are set as recognition targets in the recognition unit 211 to identify individuals, face recognition is performed using images captured for displaying so-called through-lens images by the digital camera 210, so that the number of persons (individuals) as recognition targets is specified, and public keys as many as the number of persons as the recognition targets are requested.

Further, in the digital camera 210, the user inputs information about persons whose faces are to be concealed, for example, and public keys as many as the number of persons whose faces are to be concealed are requested according to the information.

In steps S512 to S514, processes similar to those in respective steps S212 to S214 in FIG. 38 are performed. As a result, the digital camera 210 stores public keys as many as the necessary number, such as the number of persons whose faces are to be concealed, for example.

Figure 61:
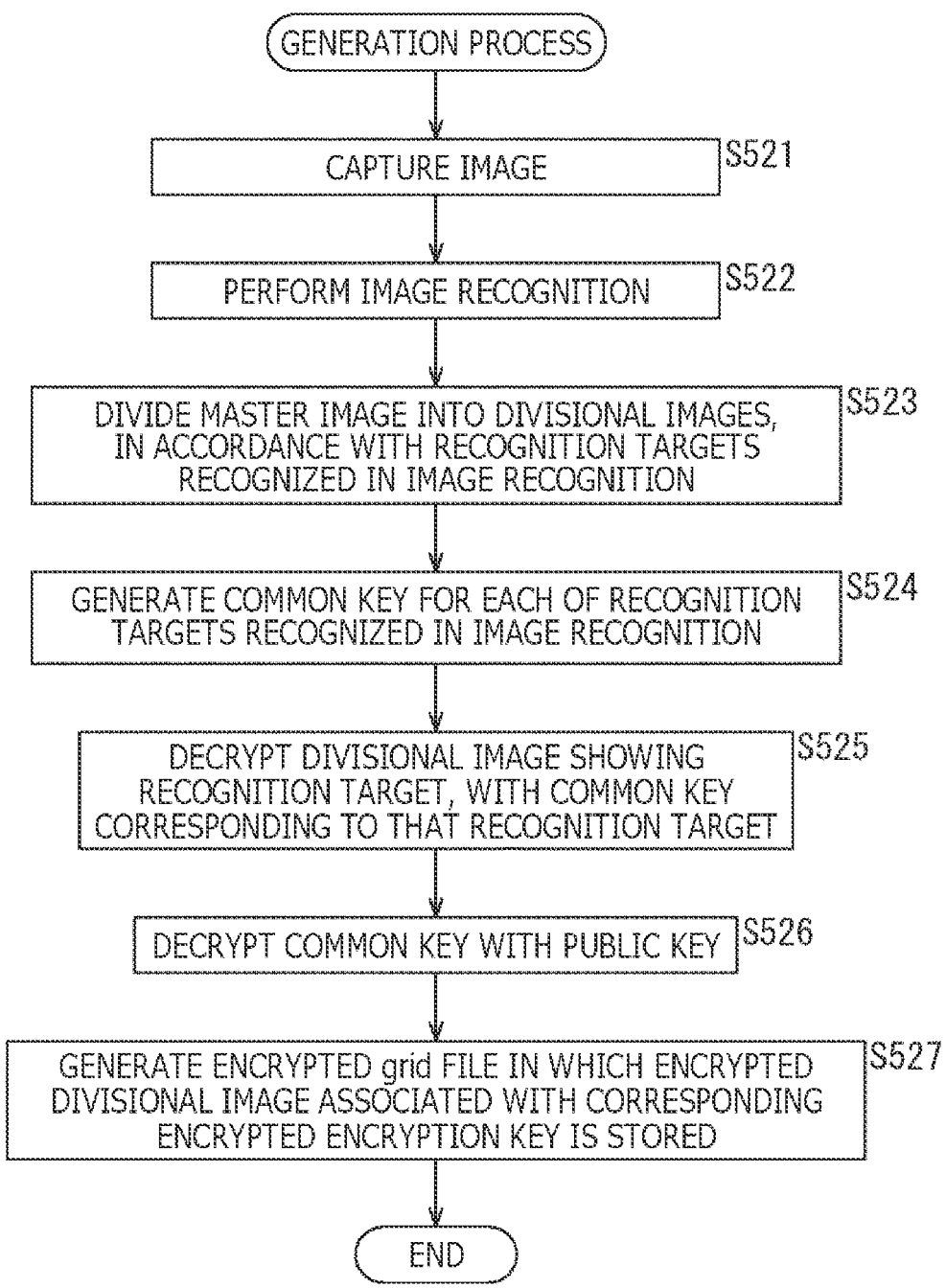
FIG. 61 is a flowchart for explaining a first example of a generation process for generating an encrypted grid file in a case where the encrypted grid file is handled by the image processing system 200.

FIG. 61 is a flowchart for explaining a first example of a generation process for generating an encrypted grid file in a case where the encrypted grid file is handled by the image processing system 200.

In the first example of a generation process, in step S521, the digital camera 210 captures an image, in accordance with the user's operation, for example, and the process then moves on to step S522.

In step S522, the recognition unit 211 performs image recognition using the image captured in step S521, and the process then moves on to step S523.

In step S523, the file control unit 43 controls the coding control unit 42 to divide the master image obtained by capturing an image in step S521, in accordance with the recognition targets recognized in the image recognition performed by the recognition unit 211. Under the control of the file control unit 43, the coding control unit 42 divides the master image into a plurality of divisional images so that different recognition targets appear in different divisional images (so that one or less recognition target appears in one divisional image), for example, and supplies the plurality of divisional images to the file control unit 43. The process then moves from step S523 on to step S524.

In step S524, the file control unit 43 generates different common keys for the respective recognition targets recognized in the image recognition by the recognition unit 211, and the process then moves on to step S525.

In step S525, the file control unit 43 generates encrypted divisional images by encrypting the divisional images showing the recognition targets recognized in the image recognition by the recognition unit 211 among the divisional images obtained by dividing the master image, with the common keys for the recognition targets. The process then moves on to step S526.

In step S526, the file control unit 43 encrypts the common keys for the respective recognition targets recognized in the image recognition by the recognition unit 211 with public keys stored in the first example of the preprocessing, and thus, generates encrypted encryption keys for the respective recognition targets. The process then moves on to step S527. Note that the common keys for different recognition targets are encrypted with different public keys.

In step S527, the file control unit 43 generates an encrypted grid file that stores the divisional images in which any recognition target does not appear among the divisional images obtained by dividing the master image, and the encrypted divisional images generated in step S525 associated with the encrypted encryption keys that have been generated in step S526 and correspond to the encrypted divisional images (the encrypted encryption keys obtained by encrypting the common keys used in the encryption for obtaining the encrypted divisional images). The generation process then comes to an end.

Note that, according to HEIF, a master image is divided into a plurality of divisional images of the same size. Therefore, in a case where a master image is divided into divisional images in which one or less recognition target appears, one recognition target might appear over a plurality of divisional images. In a case where one recognition target appears over a plurality of divisional images, the plurality of divisional images can be encrypted with the same common key.

Further, in this example, common keys are generated for the respective recognition targets recognized by image recognition, and a divisional image showing a recognition target is encrypted with the common key for the recognition target. However, common keys can be generated for the respective divisional images showing the recognition targets recognized by image recognition, and a divisional image showing a recognition target can be encrypted with the common key for the divisional image, for example.

Figure 62:
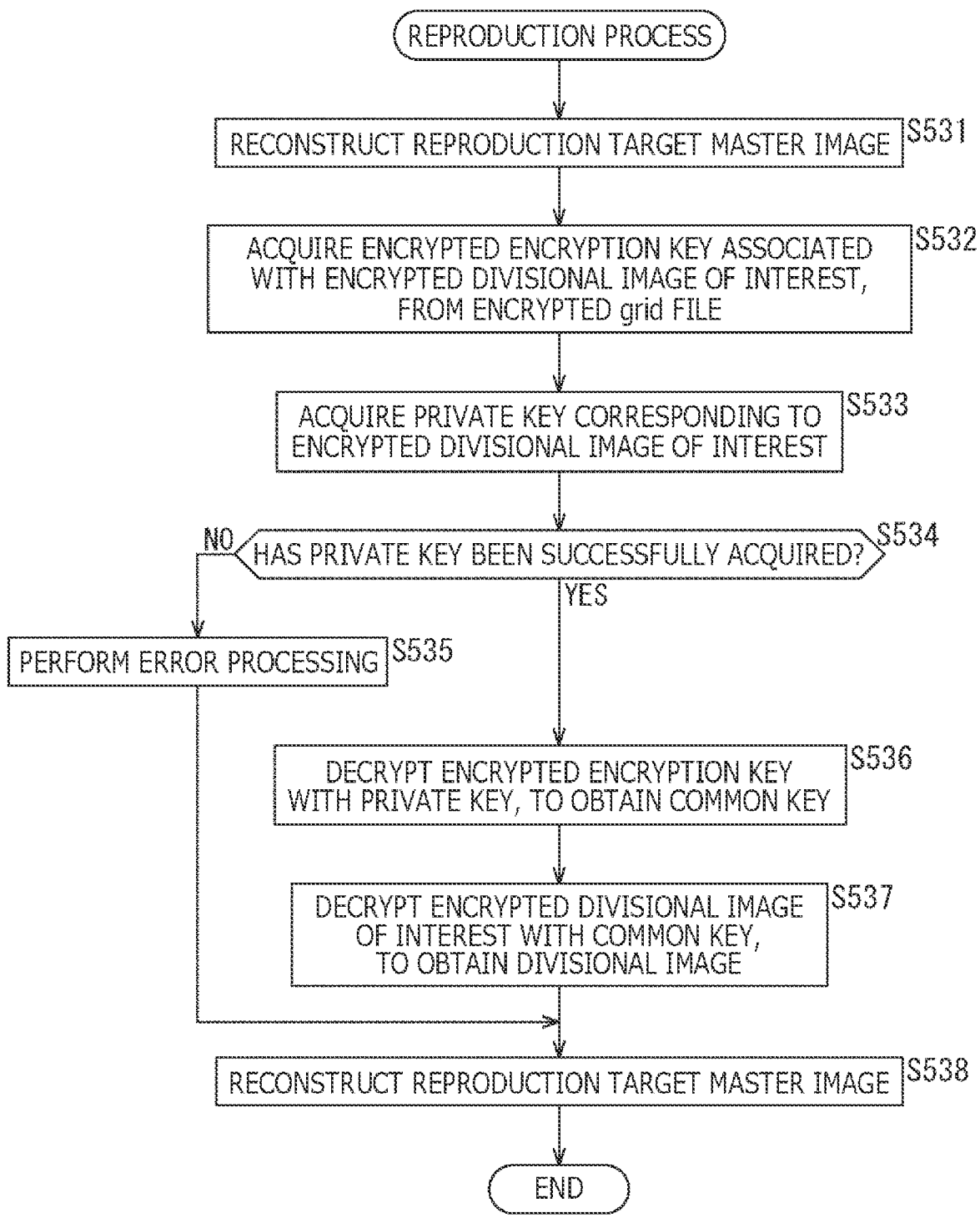
FIG. 62 is a flowchart for explaining an example of a reproduction process for reproducing an encrypted grid file in a case where the encrypted grid file is handled by the image processing system 200.

FIG. 62 is a flowchart for explaining an example of a reproduction process for reproducing an encrypted grid file in a case where the encrypted grid file is handled by the image processing system 200.

In the reproduction process, in step S531, the file control unit 43 of the digital camera 210 selects the encrypted grid file to be reproduced in accordance with the user's operation, for example, and selects the reproduction target master image from the encrypted grid file. Further, the file control unit 43 reconstructs the master image using the divisional images and the encrypted divisional images constituting the reproduction target master image, and causes the liquid crystal panel 19 to display the master image.

In the master image reconstructed in step S531, the objects appearing in the regions of the encrypted divisional images are invisible. After such a master image is displayed in step S531, the process moves on to step S532.

In step S532, when the user designates an encrypted divisional image in the master image displayed in step S531, for example, the file control unit 43 selects the encrypted divisional image designated by the user as the encrypted divisional image of interest. Further, the file control unit 43 acquires the encrypted encryption key associated with the encrypted divisional image of interest (or the encrypted encryption key corresponding to the encrypted divisional image) from the encrypted grid file to be reproduced, and the process then moves from step S532 on to step S533.

In step S533, the file control unit 43 attempts to acquire a private key corresponding to the encrypted divisional image of interest (the private key corresponding to the public key used in the encryption for obtaining the encrypted divisional image of interest), in a manner similar to that in step S232 in FIG. 40, for example. The process then moves on to step S534.

In step S534, a check is made to determine whether the file control unit 43 has successfully acquired the private key corresponding to the encrypted divisional image of interest.

If it is determined in step S534 that the private key has not been successfully acquired, the process moves on to step S535, and error processing similar to that in step S234 in FIG. 40 is performed. The reproduction process then comes to an end. Therefore, the user who cannot obtain the private key corresponding to the encrypted divisional image of interest cannot view the master image shown in the divisional image obtained by decrypting the encrypted divisional image of interest.

If it is determined in step S534 that the private key has been successfully acquired, on the other hand, the process moves on to step S536.

In step S536, the file control unit 43 decrypts the encrypted encryption key acquired in step S532 into the common key, with the private key acquired in step S533. The process then moves on to step S537.

In step S537, the file control unit 43 decrypts the encrypted divisional image of interest into the divisional image with the common key decrypted in step S536. The process then moves on to step S538.

In step S538, the file control unit 43 reconstructs the master image, using the divisional image obtained by decrypting the encrypted divisional image of interest, instead of using the encrypted divisional image of interest, and causes the liquid crystal panel 19 to display the master image. The reproduction process then comes to an end.

Figure 63:
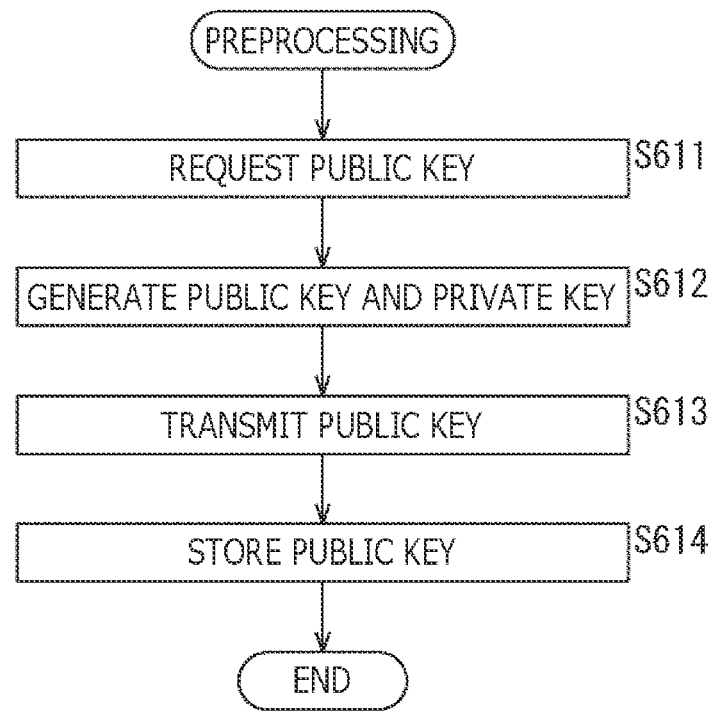
FIG. 63 is a flowchart for explaining a second example of the preprocessing to be performed in a case where an encrypted grid file is handled by the image processing system 200.

FIG. 63 is a flowchart for explaining a second example of the preprocessing to be performed in a case where an encrypted grid file is handled by the image processing system 200.

In the second example of the preprocessing, in step S611, the digital camera 210 of the image processing system 200 transmits a request for a predetermined number of public keys to the external computer 101, and the process then moves on to step S612.

For example, in a case where a method for dividing a master image into divisional images of the same size, or the numbers of the divisional images in the horizontal direction and the vertical direction of the master image is set in advance, public keys as many as the number of the divisional images constituting the master image are requested.

In steps S512 to S514, processes similar to those in respective steps S212 to S214 in FIG. 38 are performed. As a result, in the digital camera 210, public keys as many as the maximum number that can be necessary, or as many as the number of the divisional images constituting the master image are acquired and stored as the public keys for the respective divisional images constituting the master image.

Figure 64:
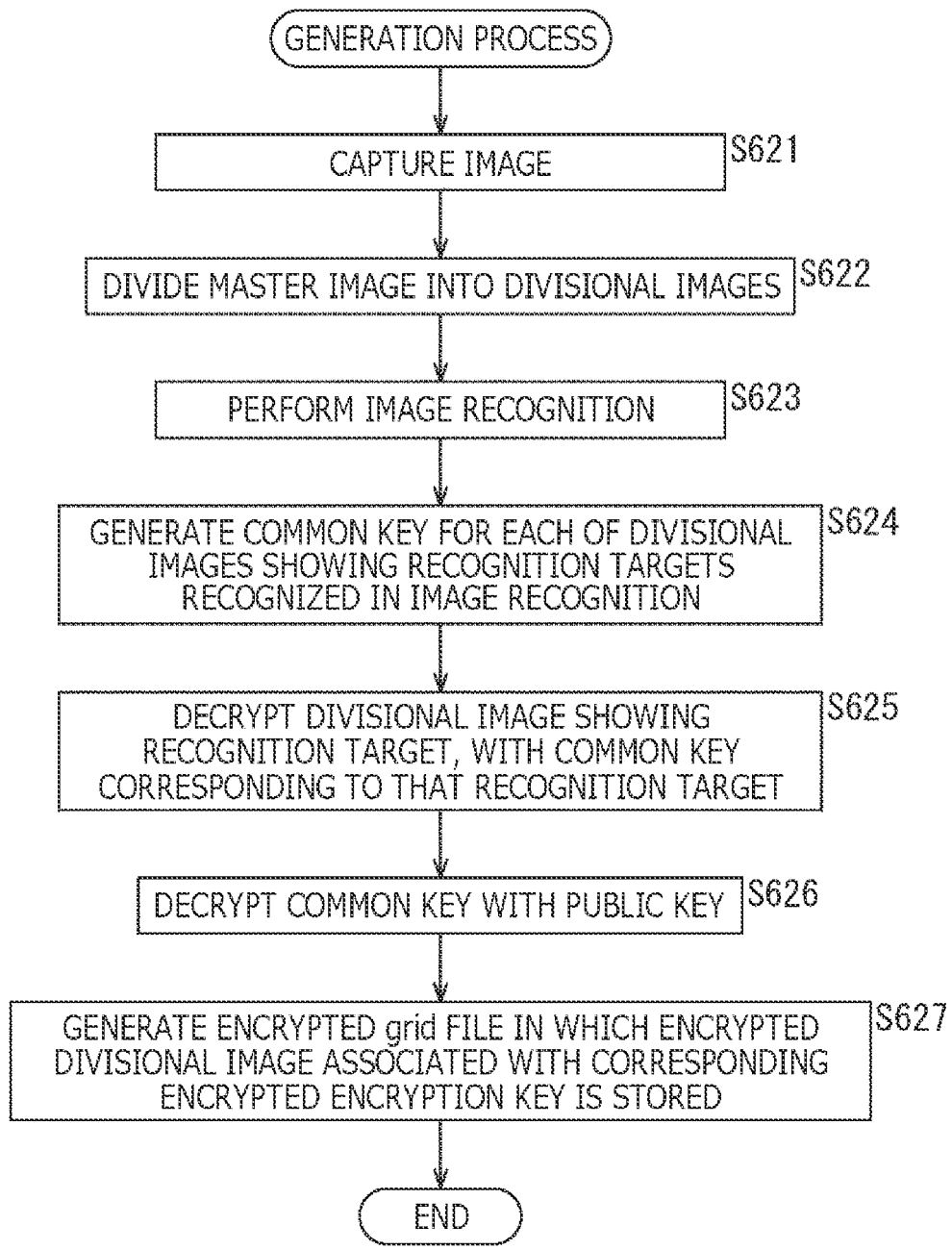
FIG. 64 is a flowchart for explaining a second example of a generation process for generating an encrypted grid file in a case where the encrypted grid file is handled by the image processing system 200.

FIG. 64 is a flowchart for explaining a second example of a generation process for generating an encrypted grid file in a case where the encrypted grid file is handled by the image processing system 200.

In the second example of a generation process, in step 3621, the digital camera 210 captures an image, in accordance with the user's operation, for example, and the process then moves on to step S622.

In step S622, the file control unit 43 controls the coding control unit 42 to divide the master image obtained by capturing an image in step S621. Under the control of the file control unit 43, the coding control unit 42 divides the master image into a plurality of divisional images of the same size by the preset dividing method, for example, and supplies the plurality of divisional images to the file control unit 43. The process then moves from step S622 on to step S623.

In step S623, the recognition unit 211 performs image recognition using the image captured in step S621, and the process then moves on to step S624.

In step S624, the file control unit 43 generates common keys for the respective divisional images showing the recognition targets recognized in the image recognition by the recognition unit 211 among the plurality of the divisional images constituting the master image. The process then moves on to step S625.

In step S625, the file control unit 43 generates encrypted divisional images by encrypting the divisional images showing the recognition targets recognized in the image recognition by the recognition unit 211 among the divisional images obtained by dividing the master image, with the common keys for the divisional images. The process then moves on to step S626.

In step S626, the file control unit 43 encrypts the common keys for the divisional images showing the recognition targets recognized in the image recognition by the recognition unit 211 with public keys stored in the second example of the preprocessing, the public keys being for the divisional images, and thus, generates encrypted encryption keys for the respective divisional images showing the recognition targets. The process then moves from step S626 on to step S627.

In step S627, the file control unit 43 generates an encrypted grid file that stores the divisional images in which any recognition target does not appear among the divisional images obtained by dividing the master image, and the encrypted divisional images generated in step S625 and associated with the encrypted encryption keys that have been generated in step S626 and correspond to the encrypted divisional images. The generation process then comes to an end.

A reproduction process for reproducing the encrypted grid file generated in the second example of a generation process is similar to that in FIG. 62, for example, and therefore, explanation thereof is not made herein.

Figure 65:
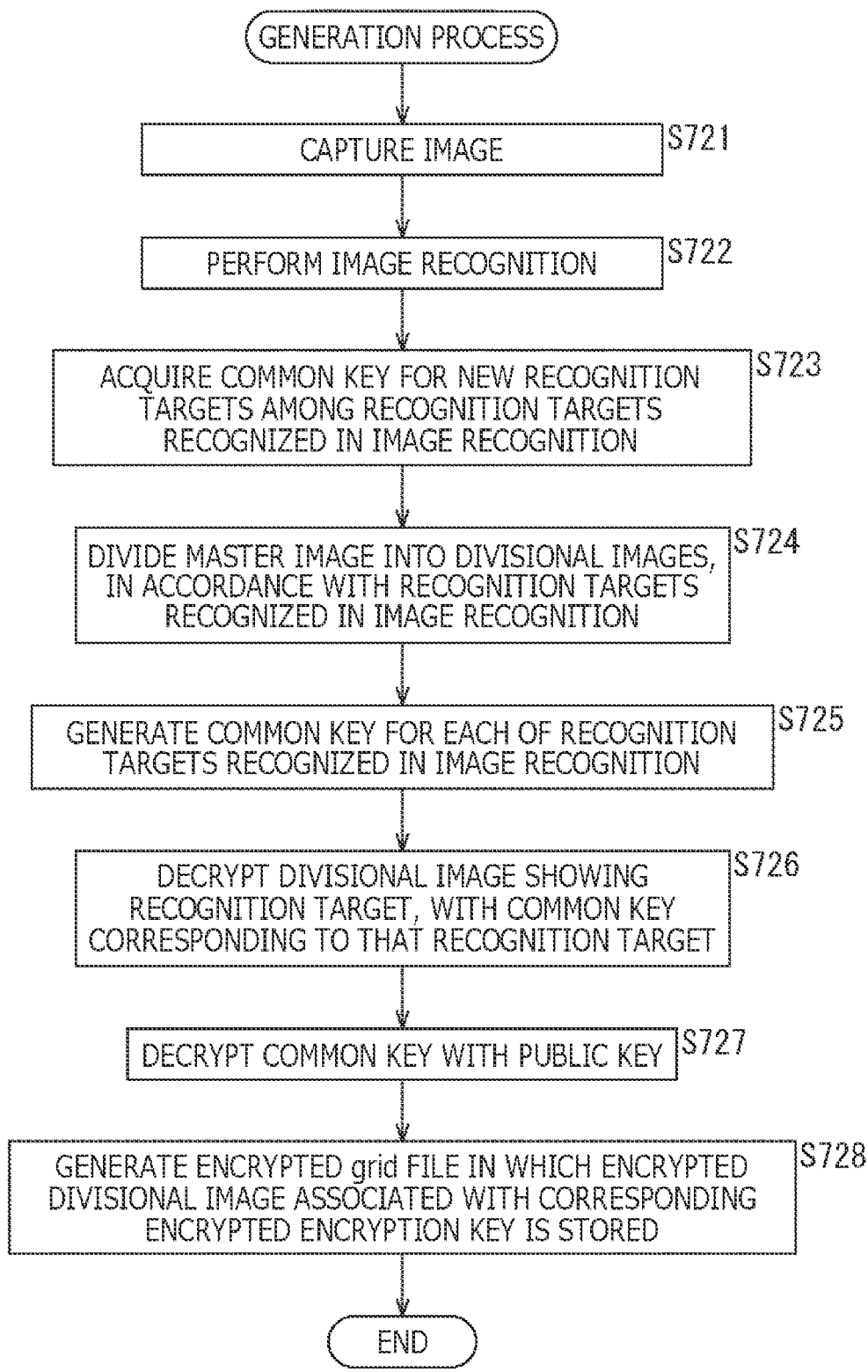
FIG. 65 is a flowchart for explaining a third example of a generation process for generating an encrypted grid file in a case where the encrypted grid file is handled by the image processing system 200.

FIG. 65 is a flowchart for explaining a third example of a generation process for generating an encrypted grid file in a case where the encrypted grid file is handled by the image processing system 200.

In the first and second examples of a generation process, common keys are encrypted with public keys stored in advance in the digital camera 210 by the first and second examples of the preprocessing. In the third example of a generation process, however, necessary public keys are acquired in the generation process, without the preprocessing.

In the third example of a generation process, in steps S721 and S722, processes similar to those in steps S521 and S522 in FIG. 61 are performed. The process then moves on to step S723.

In step S723, the digital camera 210 acquires and stores a public key for a new recognition target among the recognition targets recognized in the image recognition by the recognition unit 211 in step S722. The process then moves on to step S724.

That is, the digital camera 210 stores a recognition targets recognized in the image recognition by the recognition unit 211, and acquires and stores a public key for a new recognition target when the new recognition target is recognized. Specifically, the digital camera 210 transmits a request for public keys as many as the number of new recognition targets to the external computer 101. In response to the request for public keys from the digital camera 210, the external computer 101 generates public keys and the corresponding private keys for the new recognition targets, and transmits the public keys to the digital camera 210. The digital camera 210 receives and stores the public keys supplied for the new recognition target from the external computer 101.

In step S724, the file control unit 43 controls the coding control unit 42 to divide the master image obtained by capturing an image in step S721, in accordance with the recognition targets recognized in the image recognition performed by the recognition unit 211. Under the control of the file control unit 43, the coding control unit 42 divides the master image into a plurality of divisional images in a manner similar to that in step S523 in FIG. 61, for example, and supplies the plurality of divisional images to the file control unit 43. The process then moves from step 3724 on to step 3725.

In step 3725, the file control unit 43 generates common keys for the respective recognition targets recognized in the image recognition by the recognition unit 211, and the process then moves on to step 3726.

In step S726, the file control unit 43 generates encrypted divisional images by encrypting the divisional images showing the recognition targets recognized in the image recognition by the recognition unit 211 among the divisional images obtained by dividing the master image, with the common keys for the recognition targets. The process then moves on to step 3727.

In step 3727, the file control unit 43 encrypts the common keys for the respective recognition targets recognized in the image recognition by the recognition unit 211 with the public keys for the recognition targets, and thus, generates encrypted encryption keys for the respective recognition targets. The process then moves on to step S728.

In step S728, the file control unit 43 generates an encrypted grid file that stores the divisional images in which any recognition target does not appear among the divisional images obtained by dividing the master image, and the encrypted divisional images generated in step S726 and associated with the encrypted encryption keys that have been generated in step S727 and correspond to the encrypted divisional images. The generation process then comes to an end.

Note that, in this example, common keys are generated for the respective recognition targets recognized by image recognition, and a divisional image showing a recognition target is encrypted with the common key for the recognition target. However, common keys can be generated for the respective divisional images showing the recognition targets recognized by image recognition, and a divisional image showing a recognition target can be encrypted with the common key for the divisional image, for example.

<Description of a Computer to which the Present Technology is Applied>

Next, a series of processes that are performed by the respective blocks forming the file control unit 43, the signal processing unit 13 (FIG. 1), and the like described above can be performed by hardware or by software. In a case where the series of processes is performed by software, the program that forms the software is installed into a computer or the like.

Figure 66:
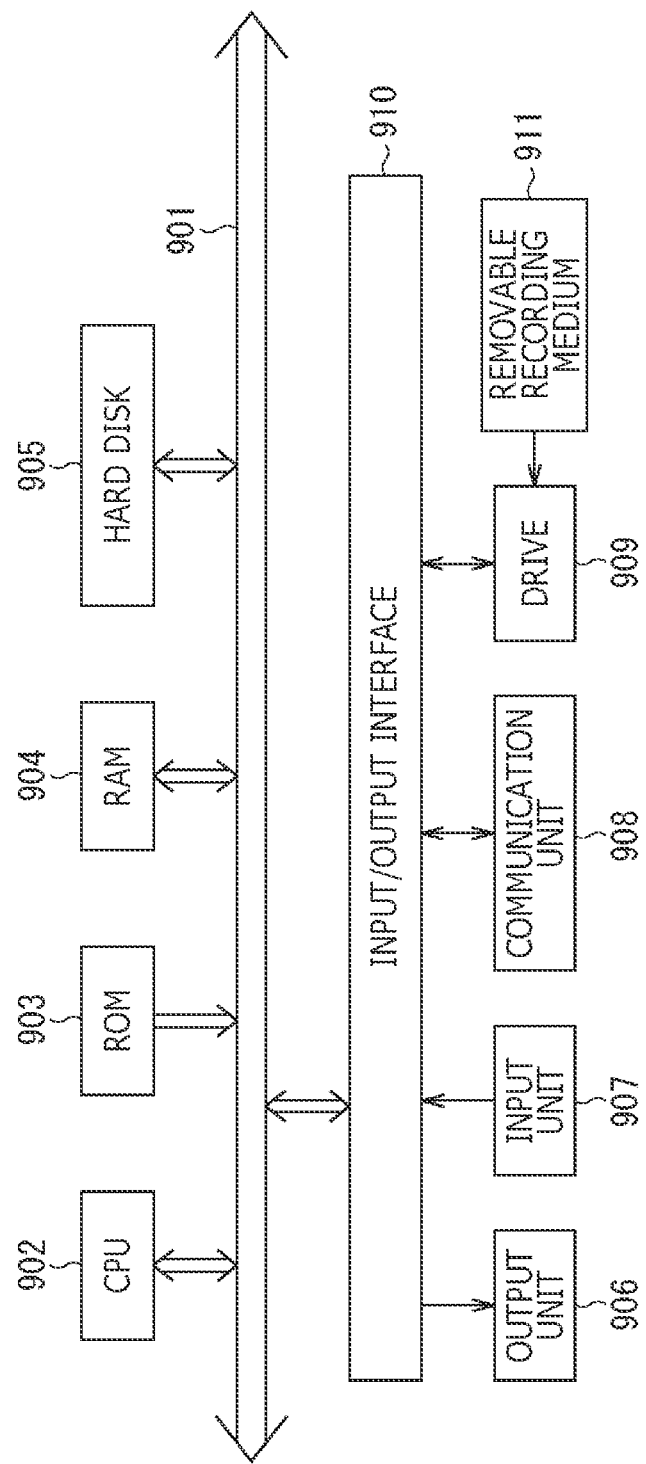
FIG. 66 is a block diagram showing an example configuration of an embodiment of a computer to which the present technology is applied.

FIG. 66 is a block diagram showing an example configuration of an embodiment of a computer into which the program for performing the above described series of processes is installed.

The program can be recorded beforehand in a hard disk 905 or a ROM 903 provided as a recording medium in the computer.

Alternatively, the program can be stored (recorded) in a removable recording medium 911 that is driven by a drive 909. Such a removable recording medium 911 can be provided as so-called packaged software. Here, the removable recording medium 911 may be a flexible disk, a compact disc read only memory (CD-ROM), a magneto-optical (MO) disk, a digital versatile disc (DVD), a magnetic disk, a semiconductor memory, or the like, for example.

Note that, the program can be installed into the computer from the above described removable recording medium 911, but can also be downloaded into the computer via a communication network or a broadcasting network and be installed into the internal hard disk 905. That is, the program can be wirelessly transferred from a download site, for example, to the computer via an artificial satellite for digital satellite broadcasting, or can be transferred by cable to the computer via a network such as a local area network (LAN) or the Internet.

The computer includes a central processing unit (CPU) 902, and an input/output interface 910 is connected to the CPU 902 via a bus 901.

When an instruction is input by a user operating an input unit 907 or the like via the input/output interface 910, the CPU 902 executes the program stored in the read only memory (ROM) 903 in accordance with the instruction. Alternatively, the CPU 902 loads the program stored in the hard disk 905 into a random access memory (RAM) 904, and executes the program.

By doing so, the CPU 902 performs the processes according to the above described flowcharts, or performs the processes with the components shown in the above described block diagrams. The CPU 902 then outputs the process results from an output unit 906 or transmits the process results from a communication unit 908 via the input/output interface 910, for example, and further stores the process results into the hard disk 905 or the like, as necessary.

Note that the input unit 907 is formed with a keyboard, a mouse, a microphone, and the like. Meanwhile, the output unit 906 is formed with a liquid crystal display (LCD), a speaker, and the like.

Here, in this specification, the processes to be performed by the computer in accordance with the program are not necessarily performed in chronological order according to the sequences shown in the flowcharts. That is, the processes to be performed by the computer in accordance with the program include processes to be performed in parallel or independently of one another (such as parallel processes or object-based processes, for example).

Also, the program may be executed by one computer (processor), or may be executed in a distributive manner by a plurality of computers. Further, the program may be transferred to a remote computer, and be executed therein.

Further, in this specification, a system means an assembly of a plurality of components (devices, modules (parts), and the like), and not all the components need to be provided in the same housing. In view of this, a plurality of devices that are housed in different housings and are connected to one another via a network forms a system, and one device having a plurality of modules housed in one housing is also a system.

Note that embodiments of the present technology are not limited to the above described embodiments, and various modifications may be made to them without departing from the scope of the present technology.

For example, the present technology may be embodied in a cloud computing configuration in which one function is shared among a plurality of devices via a network, and processing is performed by the devices cooperating with one another.

Further, the respective steps described with reference to the flowcharts described above can be carried out by one device or can be shared among a plurality of devices.

Furthermore, in a case where a plurality of processes is included in one step, the plurality of processes included in the one step can be performed by one device or can be shared among a plurality of devices.

Meanwhile, the advantageous effects described in this specification are merely examples, and the advantageous effects of the present technology are not limited to them and may include other effects.

Note that the present technology may also be embodied in the configurations described below.

<1>
A file processing device including
a file control unit that generates a file that stores
an encrypted image obtained by encrypting an image with a first encryption key, and
an encrypted encryption key obtained by encrypting the first encryption key with a second encryption key,
the encrypted image and the encrypted encryption key being associated with each other in the file.

<2>
The file processing device according to <1>, in which the first encryption key in plain text is further stored in the file.

<3>
The file processing device according to <1>, in which the encrypted encryption key is a specific-information-containing encryption key obtained by encrypting specific information and the first encryption key with the second encryption key, the specific information being for specifying external data, the external data being data outside the file and being associated with the image.

<4>
The file processing device according to <3>, in which the external data is encrypted with the first encryption key.

<5>
The file processing device according to <3> or <4>, in which
the specific information and the first encryption key in plain text are further stored in the file.

<6>
The file processing device according to <1> or <2>, in which
the encrypted image is an encrypted divisional image obtained by encrypting a divisional image obtained by dividing the image with the first encryption key.

<7>
The file processing device according to <6>, in which
the encrypted divisional image is encrypted with the first encryption key that varies with each object appearing in the corresponding divisional image, and
the first encryption key used in encryption of the divisional image is encrypted with the second encryption key that varies with each object.

<8>
The file processing device according to <6> or <7>, in which
the image is divided into the divisional image, in accordance with the object captured in the image.

<9>
The file processing device according to any one of <1> to <8>, in which
the first encryption key is a common key of a common key encryption scheme,
the second encryption key is a public key of a public key encryption scheme, and
the file is a high efficiency image file format (HEIF) file.

<10>
A file processing method including
generating a file that stores
an encrypted image obtained by encrypting an image with a first encryption key, and
an encrypted encryption key obtained by encrypting the first encryption key with a second encryption key,
the encrypted image and the encrypted encryption key being associated with each other in the file.

<11>
A file processing device including
a file control unit that decrypts an encrypted image into an image with a first encryption key, the first encryption key being obtained by decrypting an encrypted encryption key in a file, the file storing
the encrypted image obtained by encrypting the image with the first encryption key, and
the encrypted encryption key obtained by encrypting the first encryption key with a second encryption key,
the encrypted image and the encrypted encryption key being associated with each other in the file.

<12>
The file processing device according to <11>, in which, when the first encryption key in plain text is further stored in the file, the file control unit decrypts the encrypted image into the image with the first encryption key in the plain text, and, when the first encryption key in plain text is not stored in the file, the file control unit decrypts the encrypted encryption key into the first encryption key, and decrypts the encrypted image into the image with the first encryption key obtained by the decryption of the encrypted encryption key.

<13>
The file processing device according to <11>, in which the encrypted encryption key is a specific-information-containing encryption key obtained by encrypting specific information for specifying external data and the first encryption key with the second encryption key, the external data being data outside the file and being associated with the image, and
the file control unit decrypts the specific-information-containing encryption key into the specific information and the first encryption key, and acquires the external data specified by the specific information obtained by the decryption of the specific-information-containing encryption key.

<14>
The file processing device according to <13>, in which, when the external data is encrypted with the first encryption key, the file control unit decrypts the encrypted external data with the first encryption key.

<15>
The file processing device according to <13> or <14>, in which,
when the specific information and the first encryption key in plain text are further stored in the file, the file control unit acquires the external data specified by the specific information in the plain text, and,
when the specific information and the first encryption key in plain text are not stored in the file, the file control unit decrypts the specific-information-containing encryption key into the specific information and the first encryption key, and acquires the external data specified by the specific information obtained by the decryption of the specific-information-containing encryption key.

<16>
The file processing device according to <11> or <12>, in which
the encrypted image is an encrypted divisional image obtained by encrypting a divisional image obtained by dividing the image with the first encryption key, and
the file control unit decrypts the encrypted encryption key into the first encryption key, and decrypts the encrypted divisional image into the divisional image with the first encryption key obtained by the decryption of the encrypted encryption key.

<17>
The file processing device according to <16>, in which the encrypted divisional image is encrypted with the first encryption key that varies with each object appearing in the corresponding divisional image,
the first encryption key used in encryption of the divisional image is encrypted with the second encryption key that varies with each object, and
the file control unit decrypts the encrypted encryption key obtained by encrypting the first encryption key for an object of interest into the first encryption key, and decrypts the encrypted divisional image showing the object of interest into the divisional image with the first encryption key that has been obtained for the object of interest by the decryption of the encrypted encryption key.

<18>
The file processing device according to <16> or <17>, in which
the image is divided into the divisional image, in accordance with the object captured in the image.

<19>
The file processing device according to any one of <11> to <18>, in which
the first encryption key is a common key of a common key encryption scheme,
the second encryption key is a public key of a public key encryption scheme, and
the file is a high efficiency image file format (HEIF) file.

<20>
A file processing method including
decrypting an encrypted image into an image with a first encryption key, the first encryption key being obtained by decrypting an encrypted encryption key in a file, the file storing
the encrypted image obtained by encrypting the image with the first encryption key, and
the encrypted encryption key obtained by encrypting the first encryption key with a second encryption key,
the encrypted image and the encrypted encryption key being associated with each other in the file.

REFERENCE SIGNS LIST

10 Digital camera
11 Optical system
13 Signal processing unit
14 Medium
15, 16 Interface
17 Buttons/Keys
18 Touch panel
19 Liquid crystal panel
20 Viewfinder
21 Interface
41 Optical system/image sensor control unit
42 Coding control unit
43 File control unit
44 Media control unit
45 Operation control unit
46 Display control unit
47 UI control unit
901 Bus
902 CPU
903 ROM
904 RAM
905 Hard disk
906 Output unit
907 Input unit
908 Communication unit
909 Drive
910 Input/output interface
911 Removable recording medium

The invention claimed is:
1. A file processing device comprising:
a memory storing program code, and
a processor configured to execute the program code to perform operations comprising:
generating a file that stores an encrypted image obtained by encrypting an image with a first encryption key; and
obtaining an encrypted encryption key by encrypting the first encryption key with a second encryption key, wherein the encrypted image and the encrypted encryption key are associated with each other in the file, and the encrypted encryption key is a specific-information-containing encryption key obtained by encrypting specific information and the first encryption key with the second encryption key, the specific information being for specifying external data, the external data being data outside the file and being associated with the image.

2. The file processing device according to claim 1, wherein the first encryption key in plain text is stored in the file.

3. The file processing device according to claim 1, wherein the external data is encrypted with the first encryption key.

4. The file processing device according to claim 1, wherein the specific information and the first encryption key in plain text are further stored in the file.

5. A file processing device comprising:
a memory storing program code, and
a processor configured to execute the program code to perform operations comprising:
generating a file that stores an encrypted image obtained by encrypting an image with a first encryption key; and
obtaining an encrypted encryption key by encrypting the first encryption key with a second encryption key, wherein
the encrypted image and the encrypted encryption key are associated with each other in the file, and
the encrypted image is an encrypted divisional image obtained by encrypting a divisional image obtained by dividing the image with the first encryption key.

6. The file processing device according to claim 5, wherein
the encrypted divisional image is encrypted with the first encryption key that varies with each object appearing in a corresponding divisional image, and
the first encryption key used in encryption of the divisional image is encrypted with the second encryption key that varies with each object.

7. The file processing device according to claim 5, wherein the image is divided into the divisional image, in accordance with an object captured in the image.

8. The file processing device according to claim 1, wherein
the first encryption key is a common key of a common key encryption scheme,
the second encryption key is a public key of a public key encryption scheme, and
the file is a high efficiency image file format (HEIF) file.

9. A file processing device comprising:
a memory storing program code, and
a processor configured to execute the program code to perform operations comprising:
decrypting an encrypted image into an image with a first encryption key, the first encryption key being obtained by decrypting an encrypted encryption key in a file, wherein
the file stores the encrypted image obtained by encrypting the image with the first encryption key,
the file stores the encrypted encryption key obtained by encrypting the first encryption key with a second encryption key,
the encrypted image and the encrypted encryption key are associated with each other in the file, and
the encrypted encryption key is a specific-information-containing encryption key obtained by encrypting specific information for specifying external data and the first encryption key with the second encryption key, the external data being data outside the file and being associated with the image;
decrypting the specific-information-containing encryption key into the specific information and the first encryption key; and
acquiring the external data specified by the specific information obtained by the decryption of the specific-information-containing encryption key.

10. The file processing device according to claim 9, wherein, the operations further comprise:
when the first encryption key in plain text is further stored in the file, decrypting the encrypted image into the image with the first encryption key in the plain text, and,
when the first encryption key in plain text is not stored in the file, decrypting the encrypted encryption key into the first encryption key, and decrypting the encrypted image into the image with the first encryption key obtained by the decryption of the encrypted encryption key.

11. The file processing device according to claim 9, wherein,
when the external data is encrypted with the first encryption key, the encrypted external data is decrypted with the first encryption key.

12. The file processing device according to claim 9, wherein, the operations further comprise:
when the specific information and the first encryption key in plain text are further stored in the file, acquiring the external data specified by the specific information in the plain text, and,
when the specific information and the first encryption key in plain text are not stored in the file, decrypting the specific-information-containing encryption key into the specific information and the first encryption key, and acquiring the external data specified by the specific information obtained by the decryption of the specific-information-containing encryption key.

13. A file processing device comprising:
a memory storing program code, and
a processor configured to execute the program code to perform operations comprising:
decrypting an encrypted image into an image with a first encryption key, the first encryption key being obtained by decrypting an encrypted encryption key in a file, wherein
the file stores the encrypted image obtained by encrypting the image with the first encryption key,
the file stores the encrypted encryption key obtained by encrypting the first encryption key with a second encryption key,
the encrypted image and the encrypted encryption key are associated with each other in the file,
the encrypted image is an encrypted divisional image obtained by encrypting a divisional image obtained by dividing the image with the first encryption key, and
the encrypted encryption key is decrypted into the first encryption key, and the encrypted divisional image is decrypted into the divisional image with the first encryption key obtained by the decryption of the encrypted encryption key.

14. The file processing device according to claim 13, wherein
the encrypted divisional image is encrypted with the first encryption key that varies with each object appearing in a corresponding divisional image,
the first encryption key used in encryption of the divisional image is encrypted with the second encryption key that varies with each object, and wherein the operations further comprise
decrypting the encrypted encryption key obtained by encrypting the first encryption key for an object of interest into the first encryption key, and decrypting the encrypted divisional image showing the object of interest into the divisional image with the first encryption key that has been obtained for the object of interest by the decryption of the encrypted encryption key.

15. The file processing device according to claim 13, wherein the image is divided into the divisional image, in accordance with an object captured in the image.

16. The file processing device according to claim 9, wherein
the first encryption key is a common key of a common key encryption scheme,
the second encryption key is a public key of a public key encryption scheme, and
the file is a high efficiency image file format (HEIF) file.

17. A non-transitory computer readable medium storing program code for file processing, the program code being executable by a processor to perform operations comprising:
generating a file that stores an encrypted image obtained by encrypting an image with a first encryption key; and
obtaining an encrypted encryption key by encrypting the first encryption key with a second encryption key, wherein
the encrypted image and the encrypted encryption key are associated with each other in the file, and
the encrypted encryption key is a specific-information-containing encryption key obtained by encrypting specific information and the first encryption key with the second encryption key, the specific information being for specifying external data, the external data being data outside the file and being associated with the image.

18. A non-transitory computer readable medium storing program code for file processing, the program code being executable by a processor to perform operations comprising:
decrypting an encrypted image into an image with a first encryption key, the first encryption key being obtained by decrypting an encrypted encryption key in a file, wherein
the file stores the encrypted image obtained by encrypting the image with the first encryption key,
the file stores the encrypted encryption key obtained by encrypting the first encryption key with a second encryption key,
the encrypted image and the encrypted encryption key are associated with each other in the file,
the encrypted image is an encrypted divisional image obtained by encrypting a divisional image obtained by dividing the image with the first encryption key, and
the encrypted encryption key is decrypted into the first encryption key, and the encrypted divisional image is decrypted into the divisional image with the first encryption key obtained by the decryption of the encrypted encryption key.

* * * * *